US012773359B2

(12) United States Patent
Nahavandi et al.

(10) Patent No.: US 12,773,359 B2
(45) Date of Patent: Oct. 27, 2026

(54) PATIENT SUPPORT APPARATUS USER INTERFACES

(71) Applicant: Stryker Corporation, Kalamazoo, MI (US)

(72) Inventors: Kurosh Nahavandi, Portage, MI (US); Annie Desaulniers, Bothell, WA (US); Placide Nibakuze, Kalamazoo, MI (US); David James Buick, Portage, MI (US)

(73) Assignee: Stryker Corporation, Portage, MI (US)

( * ) Notice: Subject to any disclaimer, the term of this patent is extended or adjusted under 35 U.S.C. 154(b) by 1066 days.

(21) Appl. No.: 17/953,598

(22) Filed: Sep. 27, 2022

(65) Prior Publication Data

US 2023/0027244 A1 Jan. 26, 2023

Related U.S. Application Data

(60) Division of application No. 16/229,108, filed on Dec. 21, 2018, now Pat. No. 11,484,451, which is a (Continued)

(51) Int. Cl.
*A61G 7/018* (2006.01)
*A61G 7/005* (2006.01)
(Continued)

(52) U.S. Cl.
CPC ............. *A61G 7/018* (2013.01); *A61G 7/005* (2013.01); *A61G 7/012* (2013.01); *A61G 7/015* (2013.01);
(Continued)

(58) Field of Classification Search
CPC ........ A61G 7/018; A61G 7/005; A61G 7/012; A61G 7/015; A61G 13/02; A61G 13/04;
(Continued)

(56) References Cited

U.S. PATENT DOCUMENTS

| | | | |
|---|---|---|---|
| 5,113,214 | A | 5/1992 | Nagata et al. |
| 5,276,432 | A | 1/1994 | Travis |

(Continued)

FOREIGN PATENT DOCUMENTS

| | | | |
|---|---|---|---|
| CN | 101789230 | A | 7/2010 |
| DE | 19505162 | C1 | 3/1996 |

(Continued)

OTHER PUBLICATIONS

Apple, "Adjust the Brightness on you iPhone, IPad, or IPod Touch", https://support.apple.com/en-us/HT202613, 2018, 2 pages.

(Continued)

*Primary Examiner* — Robert G Santos
(74) *Attorney, Agent, or Firm* — Howard & Howard Attorneys PLLC

(57) ABSTRACT

A patient support apparatus comprising a patient support deck operatively attached to a base with a deck section arranged for movement between first and second positions determined by a deck sensor. A first user interface comprises a screen configured to display visual content including a content portion having first and second content states. A second user interface comprises an access panel including a panel portion with a light module having first and second illumination states. A controller is configured to display the content portion in the first content state and to control the light module in the first illumination state when the deck sensor determines the deck section is in the first section position, and to display the content portion on the screen in the second content state and to control the light module in the second illumination state when the deck section is in the second position.

17 Claims, 34 Drawing Sheets

Related U.S. Application Data continuation-in-part of application No. 16/020,003, filed on Jun. 27, 2018, now Pat. No. 11,202,729.

(60) Provisional application No. 62/525,373, filed on Jun. 27, 2017.

(51) Int. Cl.

| | |
|---|---|
| ***A61G 7/012*** | (2006.01) |
| ***A61G 7/015*** | (2006.01) |
| ***A61G 13/02*** | (2006.01) |
| ***A61G 13/06*** | (2006.01) |
| ***A61G 13/08*** | (2006.01) |
| ***G06F 3/0482*** | (2013.01) |
| ***G06F 3/0487*** | (2013.01) |
| ***G06F 3/0488*** | (2022.01) |

(52) U.S. Cl.
CPC ............. *A61G 13/02* (2013.01); *A61G 13/06* (2013.01); *A61G 13/08* (2013.01); *G06F 3/0482* (2013.01); *G06F 3/0488* (2013.01); *A61G 2203/20* (2013.01); *A61G 2203/42* (2013.01); *G06F 3/0487* (2013.01)

(58) Field of Classification Search
CPC .... A61G 13/06; A61G 13/08; A61G 2203/20; A61G 2203/42; A61G 2203/30; G06F 3/0482; G06F 3/0488; G06F 3/0487; G06F 3/0481
USPC ..................................... 5/600, 613, 616–618
See application file for complete search history.

(56) References Cited

U.S. PATENT DOCUMENTS 5,434,621 A 7/1995 Yu
5,640,953 A 6/1997 Bishop et al.
5,645,667 A 7/1997 Kusen
5,664,270 A 9/1997 Bell et al.
5,971,913 A 10/1999 Newkirk et al.
6,320,510 B2 11/2001 Menkedick et al.
6,340,977 B1 1/2002 Lui et al.
6,351,678 B1 2/2002 Borders
6,362,725 B1 3/2002 Ulrich et al.
6,396,224 B1 5/2002 Luff et al.
6,560,492 B2 5/2003 Borders
6,702,314 B1 3/2004 Crose
6,876,303 B2 4/2005 Reeder et al.
6,948,592 B2 9/2005 Kavounas
7,017,208 B2 3/2006 Weismiller et al.
7,038,588 B2 5/2006 Boone et al.
7,154,397 B2 12/2006 Zerhusen et al.
7,296,312 B2 11/2007 Menkedick et al.
7,319,386 B2 1/2008 Collins, Jr. et al.
7,336,187 B2 2/2008 Hubbard, Jr. et al.
7,389,552 B1 6/2008 Reed et al.
7,443,302 B2 10/2008 Reeder et al.
7,472,439 B2 1/2009 Lemire et al.
7,487,562 B2 2/2009 Frondorf et al.
7,490,021 B2 2/2009 Holland et al.
7,557,718 B2 7/2009 Petrosenko et al.
7,570,152 B2 8/2009 Smith et al.
7,690,059 B2 4/2010 Lemire et al.
7,702,481 B2 4/2010 Dionne et al.
7,747,644 B1 6/2010 Reihl et al.
7,888,901 B2 2/2011 Larson et al.
7,895,519 B1 2/2011 Allegrezza et al.
7,911,349 B2 3/2011 Zerhusen et al.
7,945,452 B2 5/2011 Fathallah et al.
7,973,666 B2 7/2011 Petrosenko et al.
8,069,157 B2 11/2011 Jam
8,117,701 B2 2/2012 Bobey et al.
8,121,856 B2 2/2012 Huster et al.
8,143,846 B2 3/2012 Herman et al.
8,165,908 B2 4/2012 Bolle et al.
8,209,608 B1 6/2012 Linyard et al.
8,266,742 B2 9/2012 Andrienko
8,308,237 B2 11/2012 Kunou
8,319,633 B2 11/2012 Becker et al.
8,334,779 B2 12/2012 Zerhusen et al.
8,341,777 B2 1/2013 Hensley et al.
8,344,860 B2 1/2013 Collins, Jr. et al.
8,410,943 B2 4/2013 Metz et al.
8,413,270 B2 4/2013 Turner et al.
8,413,271 B2 4/2013 Blanchard et al.
8,413,273 B2 4/2013 Hornbach et al.
8,432,287 B2 4/2013 O'Keefe et al.
8,442,738 B2 5/2013 Patmore
8,442,843 B2 5/2013 Kneuer et al.
8,464,380 B2 6/2013 Bobey et al.
8,525,682 B2 9/2013 Dixon et al.
8,544,126 B2 10/2013 Elliott et al.
8,552,880 B2 10/2013 Kopp et al.
8,566,118 B2 10/2013 Kneuer et al.
8,572,778 B2 11/2013 Newkirk et al.
8,604,917 B2 12/2013 Collins et al.
8,606,600 B2 12/2013 Kneuer et al.
8,641,301 B2 2/2014 Yang et al.
8,650,682 B2 2/2014 Herman
8,674,839 B2 3/2014 Zerhusen et al.
8,689,376 B2 4/2014 Becker et al.
8,706,527 B2 4/2014 Kneuer et al.
8,716,941 B2 5/2014 Kim
8,752,220 B2 6/2014 Soderberg et al.
8,756,078 B2 6/2014 Collins, Jr. et al.
8,768,520 B2 7/2014 Dexman et al.
8,789,102 B2 7/2014 Pickelsimer et al.
8,789,222 B2 7/2014 Blanchard et al.
8,844,078 B2 9/2014 Hornbach et al.
8,847,756 B2 9/2014 Tallent et al.
8,866,598 B2 10/2014 Collins, Jr. et al.
8,868,542 B2 10/2014 Kimball et al.
8,870,812 B2 10/2014 Alberti et al.
8,896,524 B2 11/2014 Birnbaum et al.
8,923,994 B2 12/2014 Laikari et al.
8,924,218 B2 12/2014 Corpier et al.
8,926,535 B2 1/2015 Rawls-Meehan
8,984,685 B2 3/2015 Robertson et al.
9,001,038 B2 4/2015 Kasahara
9,032,510 B2 5/2015 Sampathkumaran et al.
9,038,217 B2 5/2015 Elliot et al.
9,050,031 B2 6/2015 Collins, Jr. et al.
9,088,282 B2 7/2015 Holenarsipur et al.
9,104,789 B2 8/2015 Gross et al.
9,126,571 B2 9/2015 Lemire et al.
9,138,173 B2 9/2015 Penninger et al.
9,173,792 B2 11/2015 Goffer
9,186,113 B2 11/2015 Harper et al.
9,204,823 B2 12/2015 Derenne et al.
9,220,650 B2 12/2015 Bobey et al.
9,228,885 B2 1/2016 Zerhusen et al.
9,230,421 B2 1/2016 Reeder et al.
9,233,033 B2 1/2016 Valentino et al.
9,233,038 B2 1/2016 Gibson et al.
9,259,369 B2 2/2016 Derenne et al.
9,262,876 B2 2/2016 Wood et al.
9,320,664 B2 4/2016 Newkirk et al.
9,336,672 B2 5/2016 Collins, Jr. et al.
9,342,677 B2 5/2016 Ali et al.
9,358,168 B2 6/2016 Williamson et al.
9,381,125 B2 7/2016 Herbst et al.
9,424,699 B2 8/2016 Kusens et al.
9,456,938 B2 10/2016 Blickensderfer et al.
9,463,126 B2 10/2016 Zerhusen et al.
9,466,163 B2 10/2016 Kusens et al.
9,480,435 B2 11/2016 Olsen
9,486,084 B2 11/2016 Connell et al.
9,492,341 B2 11/2016 Uster et al.
9,569,591 B2 2/2017 Vanderpohl, III
9,593,833 B2 3/2017 McMannon et al.
9,613,445 B2 4/2017 Gilger et al.
9,618,383 B2 4/2017 Zerhusen et al.
9,655,798 B2 5/2017 Zerhusen et al.

(56) References Cited

U.S. PATENT DOCUMENTS 9,691,206 B2 6/2017 Kusens et al.
9,774,991 B2 9/2017 Kusens
9,782,005 B2 10/2017 Paul et al.
9,814,410 B2 11/2017 Kostic et al.
9,838,849 B2 12/2017 Kusens
9,844,275 B2 12/2017 Nunn et al.
9,849,051 B2 12/2017 Newkirk et al.
9,858,741 B2 1/2018 Kusens et al.
9,861,321 B2 1/2018 Collins, Jr. et al.
9,892,310 B2 2/2018 Kusens et al.
9,892,311 B2 2/2018 Kusens et al.
9,916,649 B1 3/2018 Kusens
9,934,427 B2 4/2018 Derenne et al.
9,940,810 B2 4/2018 Derenne et al.
9,984,521 B1 5/2018 Kusens et al.
9,998,857 B2 6/2018 Kusens
9,999,555 B2 6/2018 Magill et al.
10,004,654 B2 6/2018 Zerhusen et al.
10,034,979 B2 7/2018 Bechtel et al.
10,052,249 B2 8/2018 Elliott et al.
10,098,796 B2 10/2018 Valentino et al.
10,136,841 B2 11/2018 Alghazi
10,172,752 B2 1/2019 Goffer
10,176,608 B2 1/2019 Gilger et al.
10,188,569 B2 1/2019 Elku et al.
10,363,181 B2 7/2019 Williamson et al.
10,391,008 B2 8/2019 Zerhusen et al.
10,420,688 B2 9/2019 Furman et al.
10,561,552 B2 2/2020 Newkirk et al.
11,096,850 B2 * 8/2021 Bhimavarapu ........ A61G 7/018
11,160,514 B2 11/2021 Nahavandi et al.
11,202,729 B2 12/2021 Desaulniers
11,246,776 B2 2/2022 Moreno et al.
11,484,451 B1 11/2022 Nahavandi et al.
11,559,450 B2 * 1/2023 Desaulniers ........... A61G 13/06
12,377,005 B2 * 8/2025 Bhimavarapu ........ A61G 7/018
2002/0014951 A1 2/2002 Kramer et al.
2003/0183427 A1 10/2003 Tojo et al.
2004/0083394 A1 4/2004 Brebner et al.
2006/0077186 A1 4/2006 Park et al.
2006/0101581 A1 5/2006 Blanchard et al.
2006/0102392 A1 5/2006 Johnson et al.
2007/0163045 A1 7/2007 Becker et al.
2007/0219950 A1 9/2007 Crawford
2008/0141459 A1 6/2008 Hamberg et al.
2008/0172789 A1 7/2008 Elliot et al.
2008/0235872 A1 10/2008 Newkirk et al.
2009/0153370 A1 6/2009 Cooper et al.
2010/0039414 A1 2/2010 Bell
2010/0212087 A1 8/2010 Leib et al.
2011/0080421 A1 4/2011 Capener
2011/0144548 A1 6/2011 Elliott et al.
2011/0162067 A1 6/2011 Shuart et al.
2011/0169653 A1 7/2011 Wang et al.
2011/0214234 A1 9/2011 Herman
2012/0023670 A1 2/2012 Zerhusen et al.
2012/0089419 A1 4/2012 Huster et al.
2012/0124744 A1 5/2012 Hornbach
2012/0137436 A1 6/2012 Andrienko
2012/0215360 A1 8/2012 Zerhusen et al.
2012/0239173 A1 9/2012 Aikari et al.
2013/0096701 A1 4/2013 Suorajaervi et al.
2013/0138452 A1 5/2013 Cork et al.
2013/0142367 A1 6/2013 Berry et al.
2013/0219622 A1 8/2013 Hornbach et al.
2013/0227787 A1 9/2013 Herbst et al.
2013/0238991 A1 9/2013 Jung et al.
2013/0300867 A1 11/2013 Yoder
2013/0318716 A1 12/2013 Vanderpohl, III
2014/0076644 A1 3/2014 Derenne et al.
2014/0137025 A1 5/2014 Newkirk
2014/0259410 A1 9/2014 Zerhusen et al.
2014/0265181 A1 9/2014 Lambarth et al.
2014/0297327 A1 10/2014 Heil et al.
2014/0313700 A1 10/2014 Connell et al.
2014/0342330 A1 11/2014 Freeman et al.
2015/0002393 A1 1/2015 Cohen et al.
2015/0060162 A1 3/2015 Goffer
2015/0077534 A1 3/2015 Derenne et al.
2015/0109442 A1 4/2015 Derenne et al.
2015/0154002 A1 6/2015 Weinstein et al.
2015/0250669 A1 9/2015 Elliott et al.
2015/0317068 A1 11/2015 Marka et al.
2016/0012218 A1 1/2016 Perna et al.
2016/0022039 A1 1/2016 Paul et al.
2016/0038361 A1 2/2016 Bhimavarapu et al.
2016/0045382 A1 2/2016 Goffer
2016/0049028 A1 2/2016 Kusens et al.
2016/0050217 A1 2/2016 Mare et al.
2016/0065909 A1 3/2016 Derenne et al.
2016/0095774 A1 4/2016 Bobey et al.
2016/0140307 A1 5/2016 Brosnan et al.
2016/0180668 A1 6/2016 Kusens et al.
2016/0183864 A1 6/2016 Kusens et al.
2016/0193095 A1 7/2016 Roussy et al.
2016/0199240 A1 7/2016 Newkirk et al.
2016/0247342 A1 8/2016 Kusens et al.
2016/0296396 A1 10/2016 Kolar et al.
2016/0324705 A1 11/2016 Bach Castillo
2016/0338891 A1 11/2016 Agdeppa et al.
2016/0366327 A1 12/2016 Kusens
2016/0367420 A1 12/2016 Perhusen et al.
2016/0371786 A1 12/2016 Kusens et al.
2017/0027787 A1 2/2017 Huster et al.
2017/0027789 A1 2/2017 St.John et al.
2017/0049642 A9 2/2017 Valentino et al.
2017/0055113 A1 2/2017 Kusens
2017/0076526 A1 3/2017 Kusens et al.
2017/0094477 A1 3/2017 Kusens et al.
2017/0097800 A1 4/2017 Vanderpohl, III
2017/0098048 A1 4/2017 Brosnan et al.
2017/0109770 A1 4/2017 Kusens et al.
2017/0111770 A1 4/2017 Kusens
2017/0116790 A1 4/2017 Kusens et al.
2017/0124844 A1 5/2017 Huster et al.
2017/0128296 A1 5/2017 Kostic et al.
2017/0143565 A1 5/2017 Childs et al.
2017/0193177 A1 7/2017 Kusens
2017/0193180 A1 7/2017 Kusens et al.
2017/0193279 A1 7/2017 Kusens et al.
2017/0193772 A1 7/2017 Kusens et al.
2017/0195637 A1 7/2017 Kusens et al.
2017/0213445 A1 7/2017 Kusens
2017/0224562 A1 8/2017 Zerhusen et al.
2017/0229009 A1 8/2017 Foster et al.
2017/0259811 A1 9/2017 Coulter et al.
2017/0281440 A1 10/2017 Puvogel et al.
2017/0352212 A1 12/2017 Kusens et al.
2018/0008052 A1 1/2018 Krickeberg et al.
2018/0017945 A1 1/2018 Sidhu et al.
2018/0039743 A1 2/2018 Dixon et al.
2018/0040091 A1 2/2018 Kusens
2018/0041864 A1 2/2018 Kusens
2018/0055418 A1 3/2018 Kostic et al.
2018/0056985 A1 3/2018 Coulter et al.
2018/0084390 A1 3/2018 Kusens
2018/0096550 A1 4/2018 Kusens et al.
2018/0104122 A9 4/2018 Elliott et al.
2018/0104123 A1 4/2018 Newkirk et al.
2018/0110445 A1 4/2018 Bhimavarapu et al.
2018/0114053 A1 4/2018 Kusens et al.
2018/0137340 A1 5/2018 Kusens et al.
2018/0151010 A1 5/2018 Kusens et al.
2018/0161225 A1 6/2018 Zerhusen et al.
2018/0167816 A1 6/2018 Kusens et al.
2018/0184984 A1 7/2018 Zerhusen et al.
2018/0189946 A1 7/2018 Kusens et al.
2018/0211464 A1 7/2018 Kusens et al.
2018/0218489 A1 8/2018 Kusens
2018/0250177 A1 9/2018 Magill et al.
2018/0271286 A1 9/2018 Jacobs et al.
2018/0271287 A1 9/2018 Jacobs et al.
2018/0303687 A1 10/2018 Moreno et al.
2018/0369035 A1 12/2018 Bhimavarapu et al.

(56) References Cited

U.S. PATENT DOCUMENTS

| | | | |
|---|---|---|---|
| 2018/0369037 A1 | 12/2018 | Desaulniers et al. | |
| 2018/0369038 A1 | 12/2018 | Bhimavarapu et al. | |
| 2018/0369039 A1 | 12/2018 | Bhimavarapu et al. | |
| 2018/0374573 A1 | 12/2018 | Bhimavarapu et al. | |
| 2018/0374577 A1 | 12/2018 | Bhimavarapu | |
| 2019/0008708 A1 | 1/2019 | Moreno et al. | |
| 2019/0024882 A1 | 1/2019 | Jonsson et al. | |
| 2019/0046373 A1 | 2/2019 | Coulter et al. | |
| 2019/0262200 A1 | 8/2019 | Murai | |
| 2019/0336367 A1 | 11/2019 | Zerhusen et al. | |
| 2019/0378612 A1 | 12/2019 | Hosokawa et al. | |
| 2020/0121528 A1 | 4/2020 | Kaikenger et al. | |
| 2020/0188204 A1 | 6/2020 | Newkirk | |
| 2021/0251579 A1 | 8/2021 | Nahavandi et al. | |
| 2021/0346220 A1* | 11/2021 | Bhimavarapu | A61G 7/018 |
| 2022/0071823 A1 | 3/2022 | Desaulniers et al. | |
| 2023/0027244 A1* | 1/2023 | Nahavandi | A61G 7/012 |

FOREIGN PATENT DOCUMENTS

| | | | |
|---|---|---|---|
| EP | 0727298 | A1 | 8/1996 |
| EP | 2489341 | A2 | 8/2012 |
| EP | 2531159 | A2 | 12/2012 |
| EP | 2619724 | A2 | 7/2013 |
| EP | 2918255 | A1 | 9/2015 |
| JP | 2003140631 | A | 5/2003 |
| KR | 20130076922 | A | 7/2013 |
| WO | 0101913 | A1 | 1/2001 |
| WO | 2006089399 | A2 | 8/2006 |
| WO | 2011097569 | A2 | 8/2011 |
| WO | 2012040554 | A2 | 3/2012 |
| WO | 2014021873 | A1 | 2/2014 |
| WO | 2015148578 | A2 | 10/2015 |
| WO | 2015157402 | A1 | 10/2015 |
| WO | 2015171365 | A1 | 11/2015 |
| WO | 2016123595 | A1 | 8/2016 |
| WO | 2016196403 | A1 | 12/2016 |
| WO | 2016200556 | A1 | 12/2016 |
| WO | 2017027427 | A1 | 2/2017 |
| WO | 2017031111 | A1 | 2/2017 |
| WO | 2017061471 | A1 | 4/2017 |
| WO | 2017124056 | A1 | 7/2017 |
| WO | 2017201513 | A1 | 11/2017 |
| WO | 2018026979 | A1 | 2/2018 |
| WO | 2018154819 | A1 | 8/2018 |
| WO | 2018203476 | A1 | 11/2018 |
| WO | 2018216387 | A1 | 11/2018 |

OTHER PUBLICATIONS

Astral Healthcare, "Opthalmology Day Surgery Chair Webpage", Apr. 2018, http://astralhealthcare.com/?product=opthalmology-day-surgery-chair, 6 pages.
Campbell, Mikey, "Apple Expected to Replace Touch ID With Two-Step Facial, Fingerprint Bio-Recognition Tech", Apple Insider, Jan. 21, 2017, http://iphone.appleinsider.com/articles/17/01/21/apple-expected-to-replac-e-touch-id-with-two-step-facial-fingerprint-bio-recognition-tech, 4 pages.
Doge Medical, "DOC Classic—DOC Surgery Chairs Webpage", 2014, 2 pages, https://web.archive.org/web/20140214203605/http://www.dogemedical.com/pages/en/products/surgery-chairs/doc-classic.php?lang=EN.
English language abstract and machine-assisted English translation for CN 101789230 extracted from espacenet.com database on Aug. 30, 2018, 31 pages.
English language abstract and machine-assisted English translation for JP 2003-140631 extracted from espacenet.com database on Aug. 30, 2018, 19 pages.
English language abstract and machine-assisted English translation for KR 2013-0076922 A extracted from espacenet.com database on Aug. 16, 2018, 8 pages.
English language abstract and machine-assisted English translation for WO 2017/061471 extracted from espacenet.com database on Mar. 25, 2019, 26 pages.
English language abstract and machine-assisted English translation for WO 2018/154819 extracted from espacenet.com database on Mar. 25, 2019, 35 pages.
English language abstract and machine-assisted English translation for WO 2018/203476 extracted from espacenet.com database on Mar. 25, 2019, 37 pages.
English language abstract and machine-assisted English translation for WO 2018/216387 extracted from espacenet.com database on Mar. 25, 2019, 43 pages.
English language abstract for DE 195 05 162 C1 extracted from espacenet.com database on Aug. 16, 2018, 1 page.
English language abstract for EP 0 727 298 A1 extracted from espacenet.com database on Aug. 16, 2018, 1 page.
English language abstract for EP 0 727 298 B1 extracted from espacenet.com database on Aug. 16, 2018, 1 page.
Hall, Stephen, "Nest's 3rd Generation Thermostat Gets Some New Views for Its Farsight Feature", 9 to 5 Google, Jun. 14, 2016, https://9to5google.com/2016/06/14/nest-3rd-gen-thermostat-views-farsight/- , 4 pages.
Hill-Rom, "Centralia Smart+Bed Brochure" 2017, 11 pages.
More, "How to Use Night Shift on your iPhone or iPad", video also found at https://www.imore.com/night-shift, Nov. 1, 2017, 12 pages.
Recliners.LA "Stellar 550 Large Lift Chair Recliner Webpage", Apr. 2018, https://www.recliners.la/products/ultra-comfort-stellar-550-large-lift-ch- air, 4 pages.
Stryker Medical, "EPIC II Critical Care Bed, Model 2030 Operations Manual", 2030-309-001 Rev A, Nov. 2007, 53 pages.
Stryker Medical, "InTouch Critical Care Bed Operations Manual", Aug. 2014, 125 pages.
Stryker, "InTouch Critical Care Bed Model FL27 (2130/2140) Operations Manual-Optional Pendant Control", 2130-009-001 Rev C, Apr. 2008, p. 25.
Supportec-Trade, "Portfolilio Webpage", 2017, https://supportec-trade.nl/en, 2 pages.
U.S. Appl. No. 16/019,973, filed Jun. 27, 2018, 90 pages.
U.S. Appl. No. 16/019,986, filed Jun. 27, 2018, 57 pages.
U.S. Appl. No. 16/020,003, filed Jun. 27, 2018, 37 pages.
U.S. Appl. No. 16/020,052, filed Jun. 27, 2018, 48 pages.
U.S. Appl. No. 16/020,068, filed Jun. 27, 2018, 125 pages.
U.S. Appl. No. 16/020,085, filed Jun. 27, 2018, 67 pages.
U.S. Appl. No. 62/525,359, filed Jun. 27, 2017.
U.S. Appl. No. 62/525,363, filed Jun. 27, 2017.
U.S. Appl. No. 62/525,368, filed Jun. 27, 2017.
U.S. Appl. No. 62/525,373, filed Jun. 27, 2017.
U.S. Appl. No. 62/525,377, filed Jun. 27, 2017.
U.S. Appl. No. 62/783,442, filed Dec. 21, 2018.
U.S. Appl. No. 62/783,445, filed Dec. 21, 2018.
Umano Medical Inc., "The Ook Snow Bed Webpages and Video", https://www.umanomedical.com/en-us/beds/ook-snow?showall=1, 2019, 6 pages.
Non-Provisional U.S. Appl. No. 16/229,108, filed Dec. 21, 2018.
Youtube, "Memory Seat Escape Video", Nov. 4, 2013, https://www.youtube.com/watch?v=xlghNmAK-7A, 1 page.
Youtube, "Microsoft Hololens: Partner Spotlight with Stryker Communications Video", Feb. 21, 2017, https://www.youtube.com/watch?v=FTPxUGRGpnA, 3 pages.
Youtube, "Scion xB 2010 Premium Head Unit with Video", https://www.youtube.com/watch?v=HHQ9pKUEWvw, Jun. 19, 2010, 2 pages.
Youtube, "Umano Medical Ook Snow New Hospital Bed (US Version) Video", Apr. 6, 2015, https://www.youtube.com/watch?v=MEnRNsVFqz0, 1 page.

* cited by examiner

PATIENT SUPPORT APPARATUS USER INTERFACES

CROSS-REFERENCE TO RELATED APPLICATIONS

The subject patent application is a Divisional of U.S. patent application Ser. No. 16/229,108, filed on Dec. 21, 2018 and issued as U.S. Pat. No. 11,484,451 on Nov. 1, 2022, which is a Continuation-In-Part of U.S. patent application Ser. No. 16/020,003, filed on Jun. 27, 2018 and issued as U.S. Pat. No. 11,202,729 on Dec. 21, 2021, which claims priority to and all the benefits of U.S. Provisional Patent Application No. 62/525,373, filed on Jun. 27, 2017, the disclosures of which are each hereby incorporated by reference in their entirety.

TECHNICAL FIELD

The present disclosure relates, generally, to patient support apparatuses and, more specifically, to patient support apparatus user interfaces.

BACKGROUND

Patient support apparatuses, such as hospital beds, stretchers, cots, tables, wheelchairs, and chairs are used to help caregivers facilitate care of patients in a health care setting. Conventional patient support apparatuses generally comprise a base and a patient support surface upon which the patient is supported. Often, these patient support apparatuses have one or more powered devices with motors to perform one or more functions, such as lifting and lowering the patient support surface, articulating one or more deck sections, raising a patient from a slouched position, turning a patient, centering a patient, extending a length or width of the patient support apparatus, and the like. Furthermore, these patient support apparatuses typically employ one or more sensors arranged to detect patient movement, monitor patient vital signs, and the like.

When a caregiver wishes to perform an operational function, such as operating a powered device that adjusts the patient support surface relative to the base, the caregiver actuates an input device of a user interface, often in the form of a touchscreen or a button on a control panel. Here, the user interface may also employ a screen to display visual content to the caregiver, such as patient data and operating or status conditions of the patient support apparatus. The visual content may further comprise various graphical menus, buttons, indicators, and the like, which may be navigated via the input device. Certain operational functions or features of the patient support apparatus may also be accessible to and adjustable by the patient. Here, the user interface may allow the patient to adjust the patient support surface between various positions or configurations, view and navigate visual content displayed on a screen (for example, a television program), adjust audio output (for example, volume), and the like.

As the number and complexity of functions integrated into conventional patient support apparatuses has increased, the associated user interfaces have also become more complex and expensive to manufacture. While conventional patient support apparatuses have generally performed well for their intended purpose, there remains a need in the art for a patient support apparatus which overcomes the disadvantages in the prior art and which affords caregivers and patients with improved usability and functionality in a number of different operating conditions.

DETAILED DESCRIPTION OF THE EMBODIMENTS

Figure 1A:
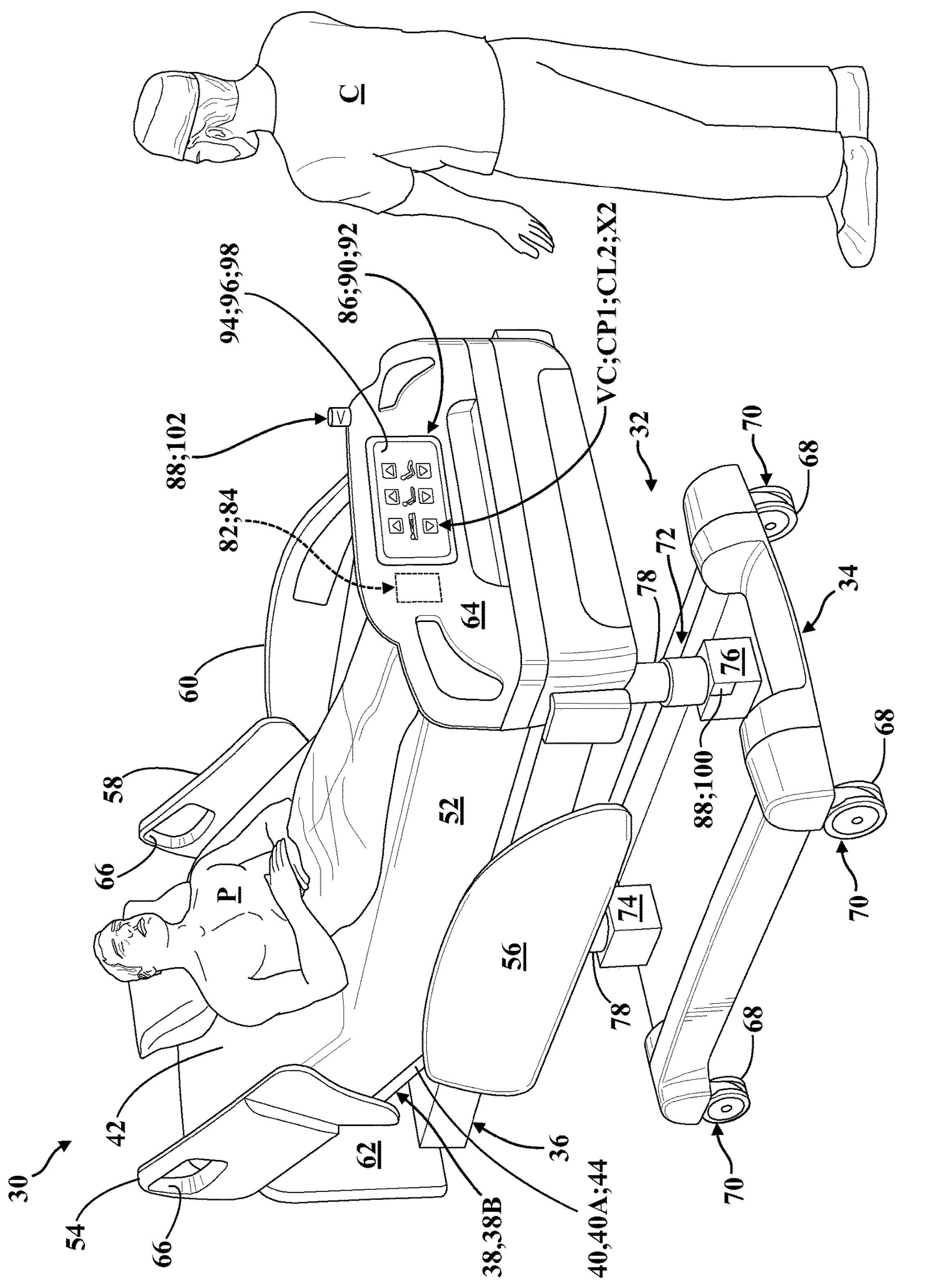
FIG. 1A is a perspective view of a patient support apparatus according to the present disclosure shown having a base, a patient support deck supporting a patient, a lift mechanism interposed between the base and the patient support deck supporting the patient support deck in a second vertical configuration relative to the base, and a user interface coupled to the patient support deck and arranged for use by a caregiver, the user interface shown having a screen displaying visual content in a second content layout.

Referring to FIGS. 1A-4B, an embodiment of a patient support apparatus 30 is shown for supporting a patient P in a health care setting. The patient support apparatus 30 illustrated throughout the drawings is realized as a hospital bed. In other embodiments, however, the patient support apparatus 30 may be a stretcher, a cot, a table, a wheelchair, a chair, or a similar apparatus utilized in the care of patients.

A support structure 32 provides support for the patient P. In the representative embodiment illustrated herein, the support structure 32 comprises a base 34, an intermediate frame 36, and a patient support deck 38. The intermediate frame 36 and the patient support deck 38 are spaced above the base 34 in FIGS. 1A-1B. As is described in greater detail below, the intermediate frame 36 and the patient support deck 38 are arranged for movement relative to the base 34 between a plurality of vertical configurations 38A, 38B, 38C, 38D (compare FIGS. 1A-1B; see also FIGS. 10A-10D).

Figure 3A:
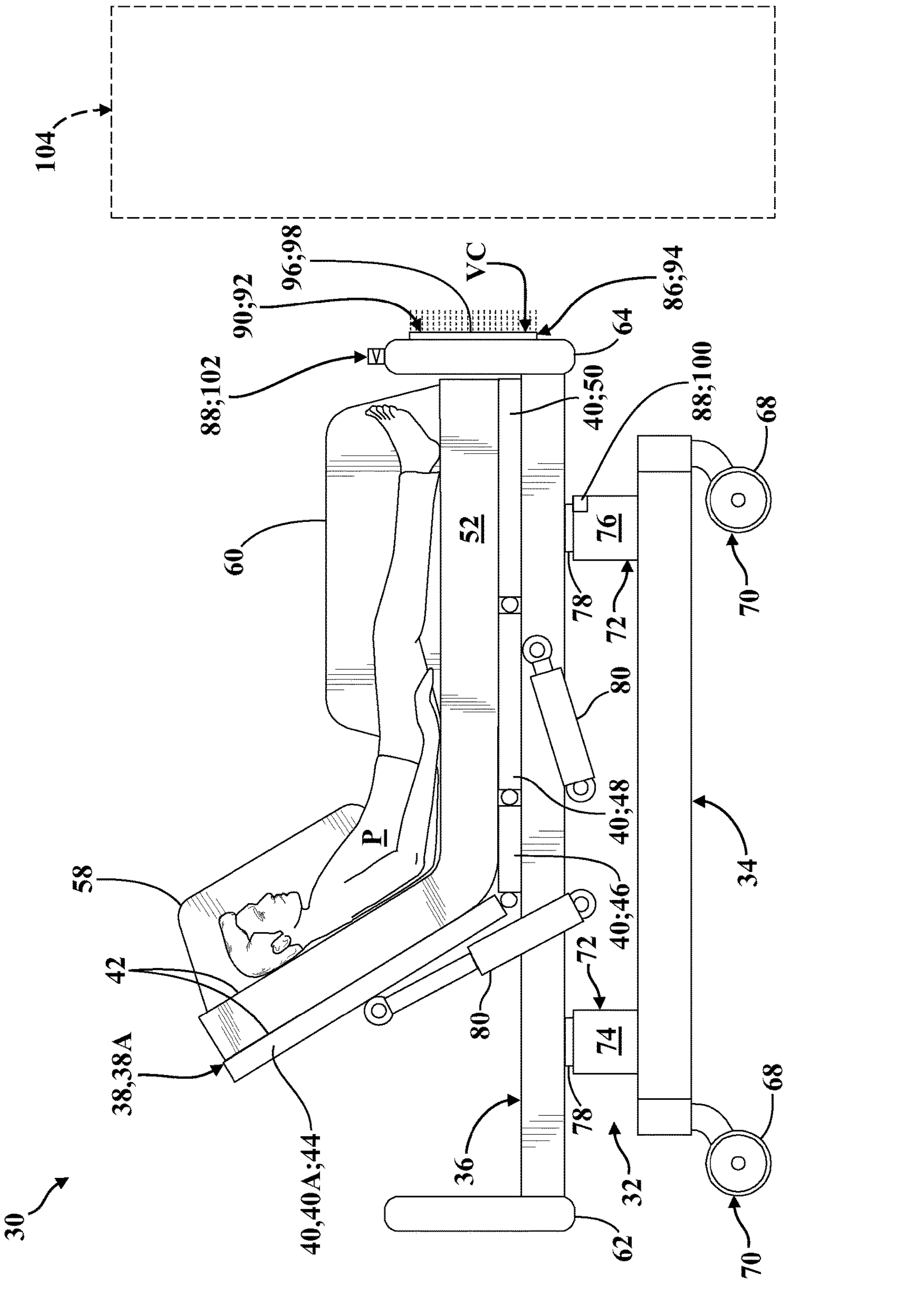
FIG. 3A is a right-side view of the patient support apparatus of FIGS. 1A-1B, shown with the patient support deck having a deck section arranged in a first section position, and with a proximity sensor shown operating to sense movement within an envelope adjacent to the caregiver-accessible user interface.
Figure 3B:
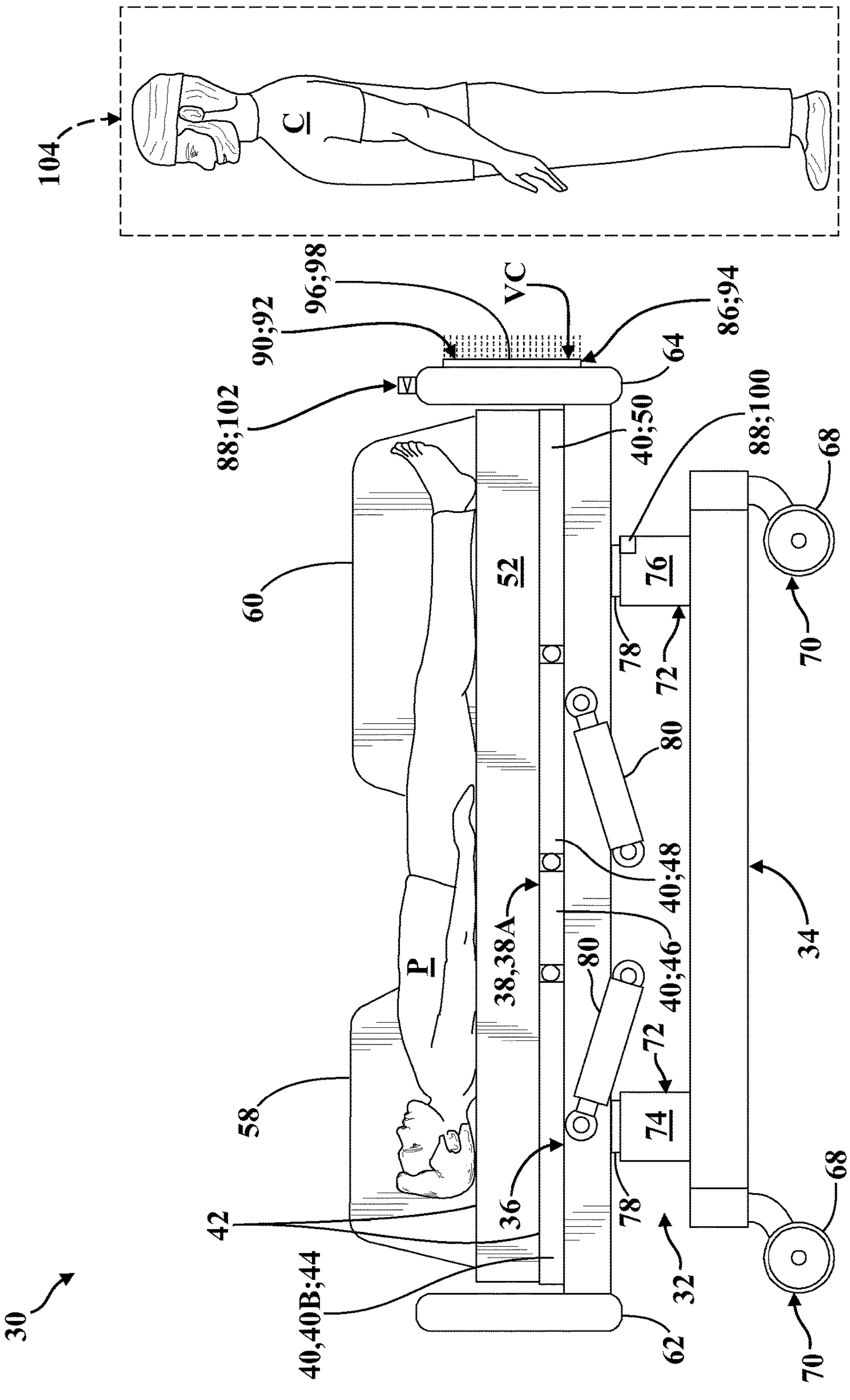
FIG. 3B is another right-side view of the patient support apparatus of FIG. 3A, shown with the deck section arranged in a second section position, and shown with a caregiver positioned within the envelope sensed by the proximity sensor.
Figure 7A:
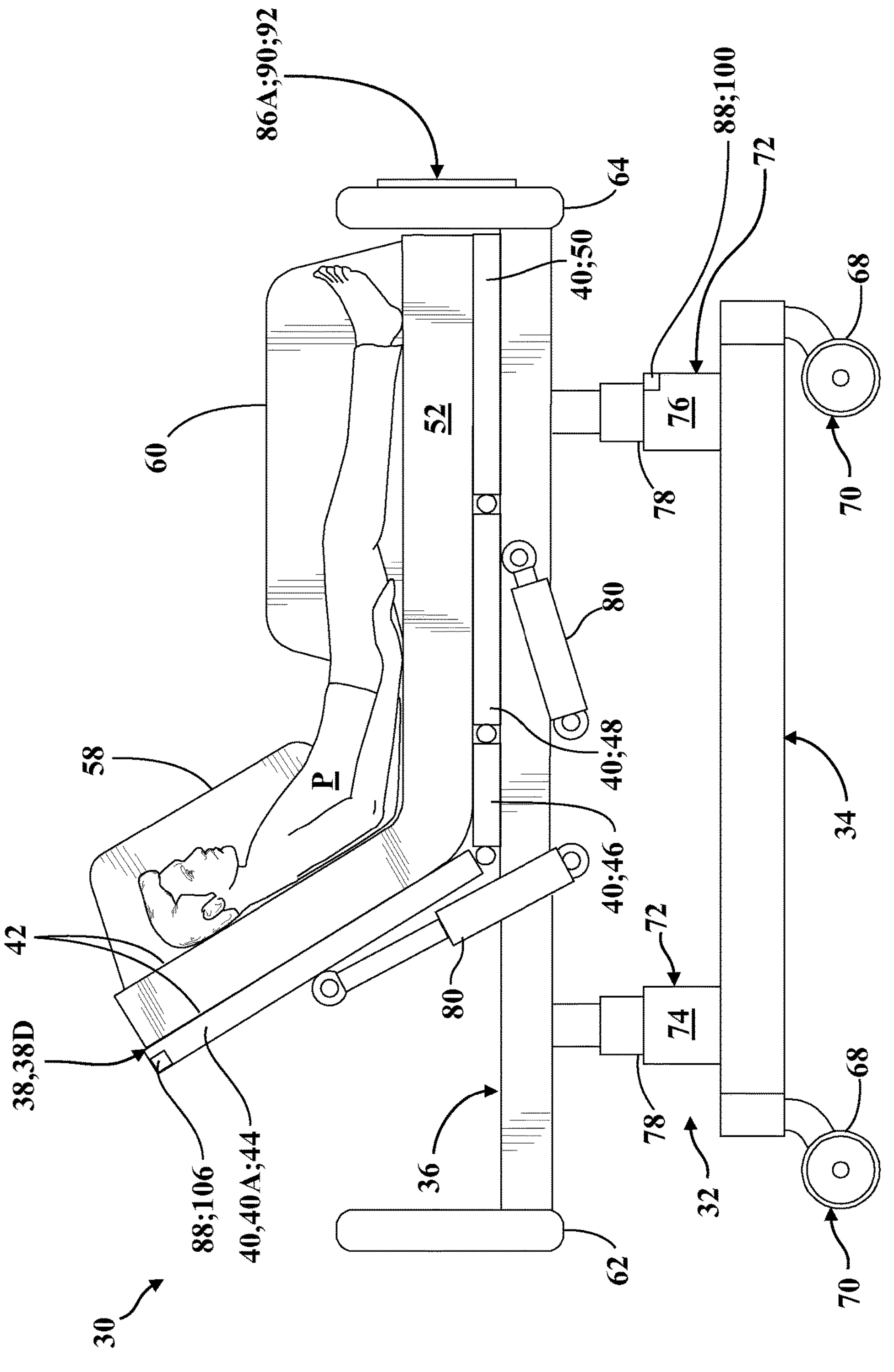
FIG. 7A is a partial right-side view of the patient support apparatus of FIG. 5, shown with the deck section of the patient support deck arranged in the first section position.
Figure 7B:
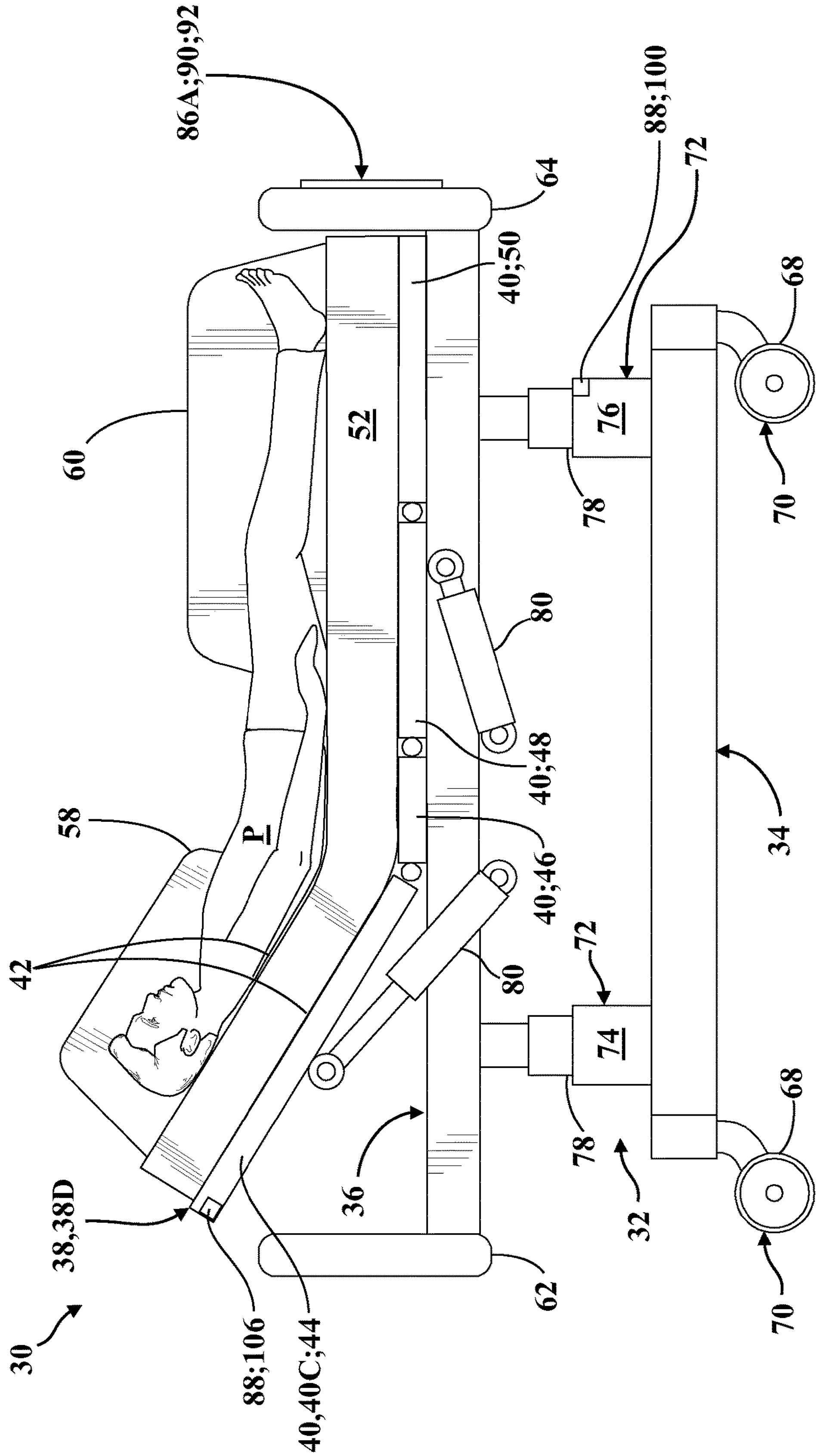
FIG. 7B is another partial right-side view of the patient support apparatus of FIG. 7A, shown with the deck section arranged in an intermediate section position.
Figure 7C:
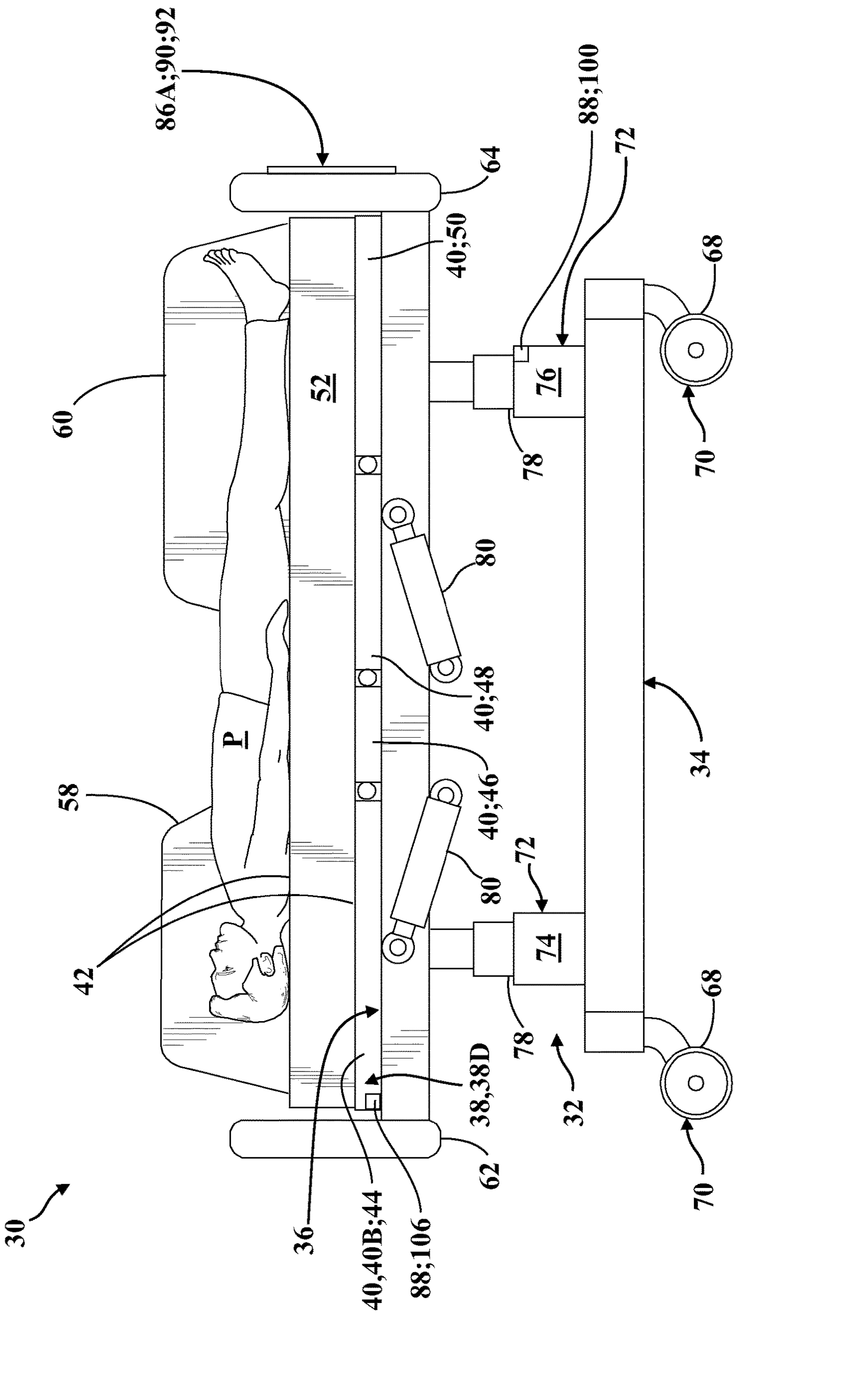
FIG. 7C is another partial right-side view of the patient support apparatus of FIG. 7A, shown with the deck section arranged in a second section position.

As is best depicted in FIGS. 3A-3B, the patient support deck 38 has at least one deck section 40 arranged for movement relative to the intermediate frame 36 between a plurality of section positions 40A, 40B, 40C (see also FIGS. 7A-7C). The deck sections 40 of the patient support deck 38 provide a patient support surface 42 upon which the patient P is supported. More specifically, in the representative embodiments of the patient support apparatus 30 illustrated herein, the patient support deck 38 has four deck sections 40 which cooperate to define the patient support surface 42: a back section 44, a seat section 46, a leg section 48, and a foot section 50. Here, the seat section 46 is fixed to the intermediate frame 36 and is not arranged for movement relative thereto. However, it will be appreciated that the seat section 46 could be movable relative to other deck sections 40 in some embodiments. However, it will be appreciated that the seat section 46 could be movable relative to other deck sections 40 in some embodiments. Conversely, the back section 44 and the leg section 48 are arranged for independent movement relative to each other and to the intermediate frame 36, as described in greater detail below, and the foot section 50 is arranged to move partially concurrently with the leg section 48. Other configurations and arrangements are contemplated.

A mattress 52 is disposed on the patient support deck 38 during use. The mattress 52 comprises a secondary patient support surface 42 upon which the patient P is supported. The base 34, the intermediate frame 36, and the patient support deck 38 each have a head end and a foot end corresponding to designated placement of the patient's P head and feet on the patient support apparatus 30. It will be appreciated that the specific configuration of the support structure 32 may take on any known or conventional design, and is not limited to that specifically illustrated and described herein. In addition, the mattress 52 may be omitted in certain embodiments, such that the patient P can rest directly on the patient support surface 42 defined by the deck sections 40 of the patient support deck 38.

Side rails 54, 56, 58, 60 are coupled to the support structure 32 and are supported by the base 34. A first side rail 54 is positioned at a right head end of the intermediate frame 36. A second side rail 56 is positioned at a right foot end of the intermediate frame 36. A third side rail 58 is positioned at a left head end of the intermediate frame 36. A fourth side rail 60 is positioned at a left foot end of the intermediate frame 36. The side rails 54, 56, 58, 60 are advantageously movable between a raised position in which they block ingress and egress into and out of the patient support apparatus 30, one or more intermediate positions, and a lowered position in which they are not an obstacle to such ingress and egress. It will be appreciated that there may be fewer side rails for certain embodiments, such as where the patient support apparatus 30 is realized as a stretcher or a cot. Moreover, it will be appreciated that in certain configurations the patient support apparatus 30 may not include any side rails. Similarly, it will be appreciated that side rails may be attached to any suitable component or structure of the patient support apparatus 30. Furthermore, in certain embodiments the first and third side rails 54, 58 are coupled to a deck section 40 for concurrent movement between section positions 40A, 40B (for example, see FIGS. 3A-3B). In FIGS. 3A-3B, 7A-7C, and 10A-10D, which each depict right-side views of the patient support apparatus 30, the first and second side rails 54, 56 are omitted for clarity.

Figure 1B:
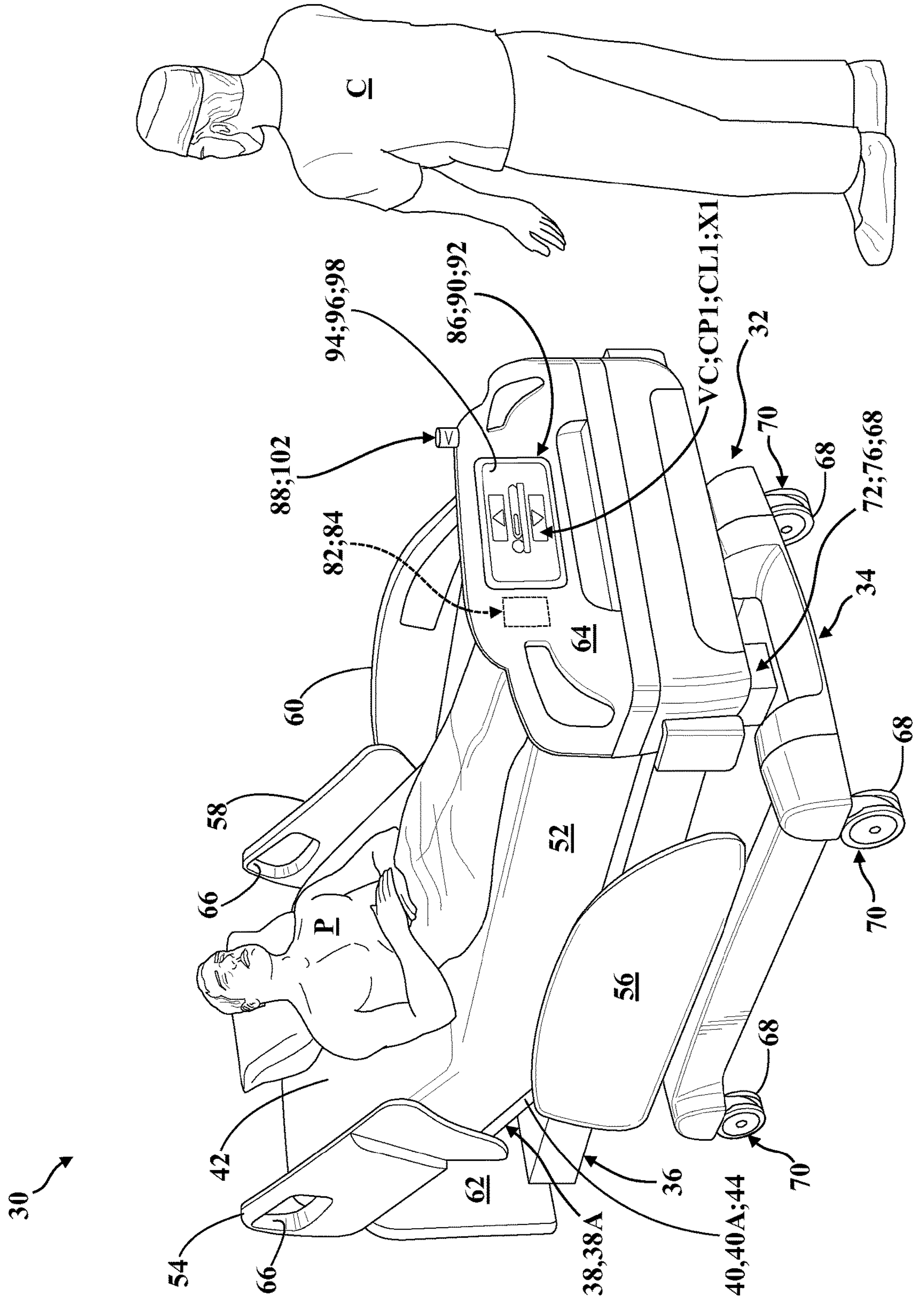
FIG. 1B is another perspective view of the patient support apparatus of FIG. 1A, shown with the lift mechanism supporting the patient support deck in a first vertical configuration relative to the base, and shown with the screen of the caregiver-accessible user interface displaying visual content in a first content layout.

As shown in FIGS. 1A-1B, a headboard 62 and a footboard 64 are coupled to the intermediate frame 36 of the support structure 32. However, it will be appreciated that the headboard 62 and/or footboard 64 may be coupled to other locations on the patient support apparatus 30, such as the base 34, or may be omitted in certain embodiments.

One or more caregiver interfaces 66, such as handles, are shown in FIGS. 1A-1B as being integrated into the first and third side rails 54, 58 to facilitate movement of the patient support apparatus 30. Additional caregiver interfaces 66 may be integrated into the headboard 62, the footboard 64, and/or other components of the patient support apparatus 30, such as the second and/or fourth side rails 56, 60, the intermediate frame 36, and the like. The caregiver interfaces 66 are shaped so as to be grasped by a caregiver as a way to position or otherwise manipulate the patient support apparatus 30 for movement. It will be appreciated that the caregiver interfaces 66 could be integrated with or operatively attached to any suitable portion of the patient support apparatus 30, or may be omitted in certain embodiments.

Wheels 68 are coupled to the base 34 to facilitate transportation over floor surfaces. The wheels 68 are arranged in each of four quadrants of the base 34, adjacent to corners of the base 34. In the embodiments shown, the wheels 68 are caster wheels able to rotate and swivel relative to the support structure 32 during transport. Here, each of the wheels 68 forms part of a caster assembly 70 mounted to the base 34. It should be understood that various configurations of the caster assemblies 70 are contemplated. In addition, in some embodiments, the wheels 68 may not be caster wheels. Moreover, it will be appreciated that the wheels 68 may be non-steerable, steerable, non-powered, powered, or combinations thereof. While the representative embodiment of the patient support apparatus 30 illustrated herein employs four wheels 68, additional wheels are also contemplated. For example, the patient support apparatus 30 may comprise four non-powered, non-steerable wheels, along with one or more additional powered wheels. In some cases, the patient support apparatus 30 may not include any wheels. In other embodiments, one or more auxiliary wheels (powered or non-powered), which are movable between stowed positions and deployed positions, may be coupled to the support structure 32. In some cases, when auxiliary wheels are located between caster assemblies 70 and contact the floor surface in the deployed position, they may cause two of the caster assemblies 70 to be lifted off the floor surface, thereby shortening a wheel base of the patient support apparatus 30. A fifth wheel may also be arranged substantially in a center of the base 34. Other configurations are contemplated.

The patient support apparatus 30 further comprises a lift mechanism, generally indicated at 72, which operates to lift and lower the intermediate frame 36 relative to the base 34 which, in turn, moves the patient support deck 38 between a first vertical configuration 38A (for example, a “lowered” vertical position as depicted in FIGS. 1B and 3A-3B), a second vertical configuration 38B (for example, a “raised” vertical position as depicted in FIGS. 1A, 4A-4B, and 10A), or to any desired intermediate vertical position in between. As is described in greater detail below in connection with the embodiment illustrated in FIGS. 5-12E, the lift mechanism 72 may also be configured to move the intermediate frame 36 to a first intermediate vertical configuration 38C (see FIG. 10C) defined between the first and second vertical configurations 38A, 38B, and a second intermediate vertical configuration 38D (see FIG. 10D) defined between the first intermediate vertical configuration 38C and the second vertical configuration 38B. Other configurations, and other intermediate vertical configurations, are contemplated by the present disclosure.

The illustrated lift mechanism 72 generally comprises a head end lift member 74 and a foot end lift member 76, which are each arranged to facilitate movement of the intermediate frame 36 with respect to the base 34 using one or more lift actuators 78 (see FIGS. 1A and 2-4B; not shown in detail). The lift actuators 78 may be realized as linear actuators, rotary actuators, or other types of actuators, and may be electrically operated and/or may be hydraulic. It is contemplated that, in some embodiments, only one lift member and one associated lift actuator may be employed, e.g., to raise only one end of the intermediate frame 36, or one central lift actuator to raise and lower the intermediate frame 36. The construction of the lift mechanism 72, the head end lift member 74, and/or the foot end lift member 76 may take on any known or conventional design, and is not limited to that specifically illustrated. By way of non-limiting example, the lift mechanism 72 could comprise a “scissor” linkage arranged between the base 34 and the intermediate frame 36 with one or more actuators configured to facilitate vertical movement of the patient support deck 38.

As noted above, the patient support deck 38 is operatively attached to the intermediate frame 36, and the deck section 40 is arranged for movement between a first section position 40A (see FIG. 3A), a second section position 40B (see FIG. 3B). To this end, one or more deck actuators 80 are interposed between the deck section 40 and the intermediate frame 36 to move the deck section 40 between the first section position 40A (see FIG. 3A), the second section position 40B (see FIG. 3B), and any other suitable section position. In the representative embodiments illustrated herein, the deck actuator 80 is realized as a linear actuator disposed in force-translating relationship between the deck section 40 and the intermediate frame 36. More specifically, one deck actuator 80 is provided between the intermediate frame 36 and the back section 44, and another deck actuator 80 is provided between the intermediate frame 36 and the leg section 48, and each of the deck actuators 80 is arranged for independent movement to position the respective deck sections 40 to adjust the shape of the patient support surface 42 between a plurality of patient support configurations (for example, a flat configuration, a raised fowler configuration, a seated configuration, etc.).

Those having ordinary skill in the art will appreciate that the patient support apparatus 30 could employ any suitable number of deck actuators 80, of any suitable type or configuration sufficient to effect selective movement of the deck section 40 relative to the support structure 32. By way of non-limiting example, the deck actuator 80 could be a linear actuator or one or more rotary actuators driven electronically and/or hydraulically, and/or controlled or driven in any suitable way. Moreover, the deck actuator 80 could be mounted, secured, coupled, or otherwise operatively attached to the intermediate frame 36 and to the deck section 40, either directly or indirectly, in any suitable way. In addition, one or more of the deck actuators 80 could be omitted for certain applications.

Figure 2:
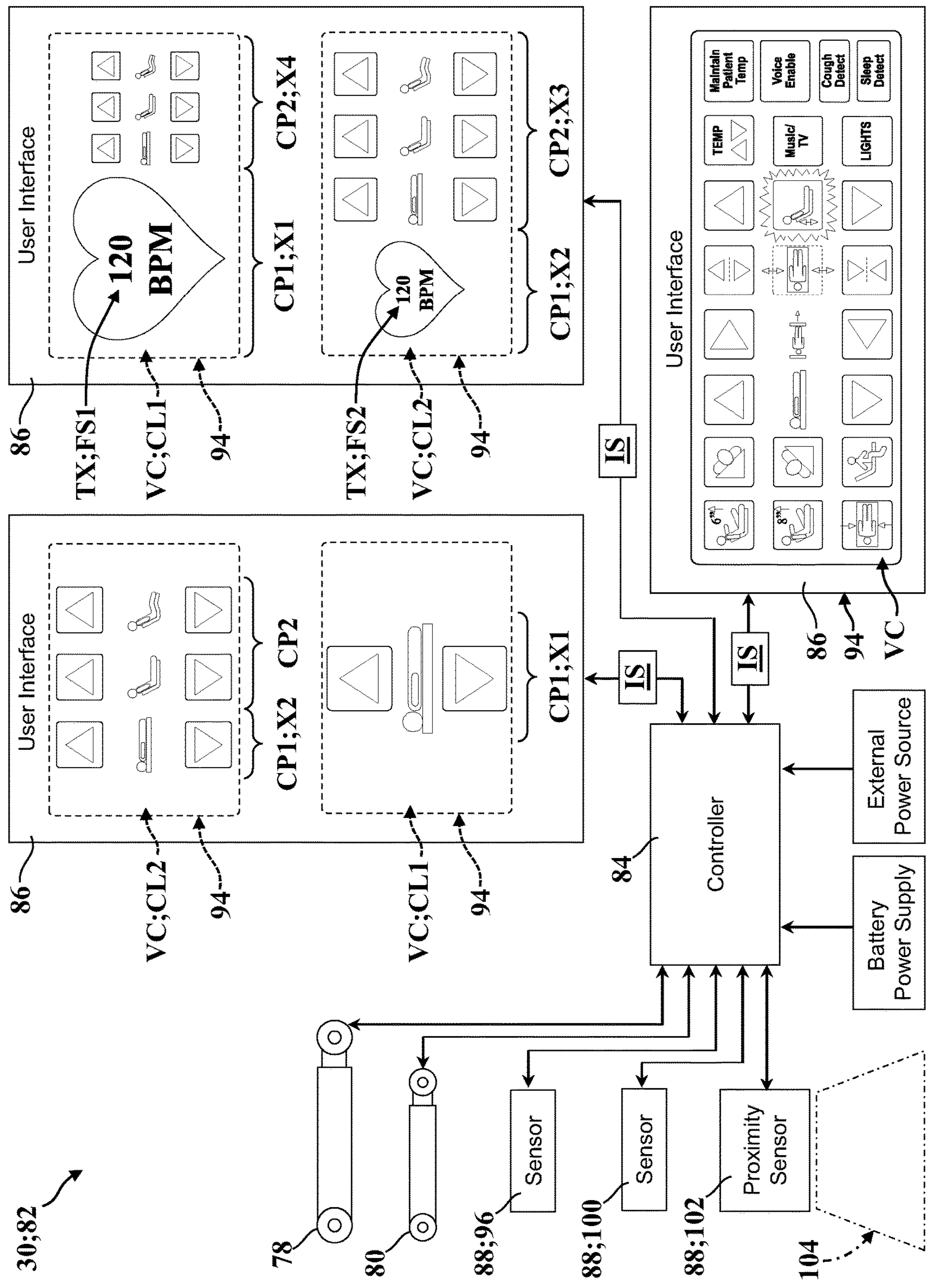
FIG. 2 is a partial schematic view of a control system of the patient support apparatus of FIGS. 1A-1B, the control system shown comprising a controller disposed in communication with embodiments of user interfaces displaying different visual content, and disposed in communication with actuators and sensors, including a proximity sensor schematically depicted as operating to sense movement within an envelope adjacent to the proximity sensor.

Referring now to FIGS. 1A-2, the patient support apparatus 30 employs a control system, generally indicated at 82, to effect operation of various functions of the patient support apparatus 30, as described in greater detail below. To this end, and as is best shown schematically in FIG. 2, the control system 82 generally comprises a controller 84 disposed in communication with one or more user interfaces 86 adapted for use by the patient P and/or a caregiver C to facilitate operation of one or more functions of the patient support apparatus 30. In certain embodiments, the controller 84 is also disposed in communication with the lift actuators 78, the deck actuators 80, and/or one or more sensors 88. Each of these components will be described in greater detail below.

As noted above, the controller 84 is best depicted schematically FIG. 2, and has been omitted from certain drawings for the purposes of clarity and consistency. It will be appreciated that the controller 84 and/or the control system 82 can be configured or otherwise arranged in a number of different ways. The controller 84 may have one or more microprocessors for processing instructions or for processing an algorithm stored in memory to control operation of the actuators 78, 80, generation or interpretation of an input signal IS, communication with the user interfaces 86, and the like. Additionally or alternatively, the controller 84 may comprise one or more microcontrollers, field programmable gate arrays, systems on a chip, discrete circuitry, and/or other suitable hardware, software, or firmware that is capable of carrying out the various functions and operations described herein. The controller 84 may be carried on-board the patient support apparatus 30, such as on the base 34, or may be remotely located. The controller 84 may comprise one or more subcontrollers configured to control all of the actuators 78, 80 and/or user interfaces 86 or one or more subcontrollers for each actuator 78, 80 and/or user interface 86. The controller 84 may communicate with the actuators 78, 80 and/or the user interfaces 86 via wired or wireless connections.

In the representative embodiment illustrated in FIGS. 1A-1B, the patient support apparatus 30 comprises one or more user interfaces 86 which may be accessible by the patient P, the caregiver C, or by both the caregiver C and the patient P. The user interface 86 of the patient support apparatus 30 generally comprises an input device 90 configured to generate an input signal IS in response to activation by a user which, in turn, is communicated to the controller 84. The controller 84, in turn, is responsive to the input signal IS and can control or otherwise carry out one or more functions of the patient support apparatus 30 in response to receiving the input signal IS. Put differently, the controller 84 is configured to perform a function of the patient support apparatus 30 in response to receiving the input signal IS from the input device 90. By way of non-limiting example, the input device 90 could be realized as a "lift bed" button, activation of which causes the controller 84 to drive the lift actuators 78 to move the patient support deck 38 and the intermediate frame 36 from the first vertical configuration 38A (see FIG. 1B) vertically away from the base 34 towards the second vertical configuration 38B (see FIG. 1A). Moreover, in some embodiments, the controller 84 may be configured to facilitate navigation of visual content VC of the user interface 86 in response to receiving the input signal IS from the input device 90. Thus, it will be appreciated that the user interface 86 could be configured in a number of different ways sufficient to generate the input signal IS. As such, it will be appreciated that the user interfaces 86 could be of a number of different styles, shapes, configurations, and the like.

In the representative embodiment illustrated in connection with FIGS. 1A-4B, the user interface 86 is realized as a touchscreen 92 comprising a screen 94 and a touch sensor 96. As is described in greater detail below, the screen 94 is configured to display visual content VC to the user, and may be of any suitable size, shape, and/or orientation sufficient to display visual content VC. By way of non-limiting example, the screen 94 could be realized as a curved LCD panel extending along the length or width of the patient support apparatus 30. The touch sensor 96 is operatively attached to the screen 94, and defines an input surface 98 arranged adjacent to the screen 94 that is adapted for interaction with the user (e.g., the caregiver C and/or the patient P). Thus, the screen 94 generally forms part of one or more of the user interfaces 86 for operating the patient support apparatus 30, such as where activation or manipulation of the input device 90 (for example, a touch sensor 96 operatively attached to the screen 94) generates the input signal IS used by the controller 84 to facilitate navigation and/or activation of the visual content VC (e.g., by navigating menus and/or actuating virtual buttons represented as visual content VC on the screen 94 by engaging the touch sensor 96).

As shown in FIGS. 1A-1C, the screen 94 is operatively attached to the patient support apparatus 30 for concurrent movement. More specifically, the screen 94 is coupled to the footboard 64 for concurrent movement with the patient support deck 38 between the vertical configurations 38A, 38B via the lift mechanism 72, as noted above (compare FIGS. 1A-1B). However, it will be appreciated that the screen 94 could be located remotely from the input device 90. In some embodiments, the user interface 86 is configured to generate a haptic signal, such as vibration from a motor adjacent to the screen 94, in response to activation of the input device 90. Other arrangements and configurations are contemplated.

In some embodiments, the patient support apparatus 30 further comprises a lift sensor, generally indicated at 100, to determine movement of the patient support deck 38 between the vertical configurations 38A, 38B via the lift mechanism 72 (compare FIGS. 1A-1B). Here, the lift sensor 100 is disposed in communication with the controller 84 which, in turn, is configured to display visual content VC on the screen 94 in different ways based on the position of the patient support deck 38 relative to the base 34 determined (or "sensed") via the lift sensor 100, as is described in greater detail below in connection with FIGS. 1A-2.

Those having ordinary skill in the art will appreciate that the lift sensor 100 could be realized in a number of different ways. By way of non-limiting example, the lift sensor 100 could be realized as one or more discrete components, such as a linear potentiometer, a range sensor, a hall-effect sensor, a limit switch, an accelerometer, a gyroscope, and the like generally configured or arranged to measure position, height, and/or movement. Further, the lift sensor 100 could be an encoder, a current sensor, and the like coupled to or in communication with one of the lift actuators 78. Moreover, the functionality afforded by the lift sensor 100 could be entirely or partially realized with software or code for certain applications. Other configurations are contemplated.

In some embodiments, the patient support apparatus 30 further comprises a proximity sensor, generally indicated at 102, to determine movement occurring within an envelope 104 defined adjacent to a caregiver-accessible user interface 86 coupled to the footboard 64 of the patient support apparatus 30 (see FIGS. 2-4B). Here, the proximity sensor 102 is disposed in communication with the controller 84 which, in turn, is configured to display visual content VC on the screen 94 in different ways based on the presence or absence of movement occurring within the envelope 104 determined (or "sensed") by the proximity sensor 102, as is described in greater detail below in connection with FIGS. 2-4B.

Those having ordinary skill in the art will appreciate that the proximity sensor 102 could be realized in a number of different ways. By way of non-limiting example, the proximity sensor 102 could be realized as one or more discrete components, such as a photoelectric emitter/sensor, a photodetector sensor, a laser rangefinder, a passive charge-coupled device (e.g., a digital camera), a passive thermal infrared sensor (e.g., a forward-looking infrared camera), a radar transmitter/sensor, a sonar transmitter/sensor, and the like generally configured or arranged to detect changes in heat, air pressure, and/or position and/or movement. The proximity sensor 102 could also be realized as a detector configured to respond to the presence or absence of a token, tracker, badge, portable electronic device, and the like carried by the caregiver (e.g., via radio-frequency identification, near-field communication, global positioning satellites, Bluetooth®, Wi-Fi™, and the like). Further, the proximity sensor 102 could be realized as a part of the touchscreen 92 in some embodiments, such as based on electrostatic fields generated with a capacitive-type touch sensor 96. Here too, the functionality afforded by the proximity sensor 102 could be entirely or partially realized with software or code for certain applications. Other configurations are contemplated.

As noted above, in the representative embodiment illustrated in FIGS. 1A-2, the screen 94 forms part of a caregiver-accessible user interface 86 which presents visual content VC to the caregiver C in different ways based on or otherwise corresponding to the arrangement of the patient support deck 38 relative to the base 34. To this end, the controller 84 employs the lift sensor 100 to determine the relative position of the patient support deck 38 between and/or in the first and second vertical configurations 38A, 38B, displays visual content VC on the screen 94 in a first content layout CL1 when the patient support deck 38 is in the first vertical configuration 38A (see FIG. 1B), and displays visual content VC on the screen 94 in a second content layout CL2 when the patient support deck 38 is in the second vertical configuration 38B (see FIG. 1A). The visual content VC and first and second content layouts CL1, CL2 will be described in greater detail below.

It will be appreciated that multiple lift sensors 100 could be employed by the controller 84 in certain embodiments, such as to facilitate differentiating the respective heights of the head-end and the foot-end of the patient support deck 38. This differentiation may be used to adjust, optimize, or otherwise change how visual content VC is presented on the screen 94 in some embodiments. Here, it will be appreciated that the specific position and/or orientation of the screen 94 may change relative to the caregiver C based on how the patient support deck 38 is orientated because the screen 94 is coupled to the footboard 64 in the illustrated embodiment. Thus, in embodiments of the patient support apparatus 30 where the head end lift member 74 and the foot end lift member 76 can be driven or otherwise actuated independently (e.g., to place the patient support deck 38 in a Trendelenburg position), the controller 84 could be configured to display visual content VC in different ways based on the orientation and/or position of the screen 94 relative to the base 34 (e.g., using one or more accelerometers, gyroscopes, inertial sensors, and the like). To this end, and by way of non-limiting example, the controller 84 could accommodate changes in the orientation of the screen 94 by presenting, rendering, or otherwise displaying different types of visual content VC, by scaling visual content VC, and/or by otherwise modifying visual content VC as the lift members 74, 76 move the patient support deck 38 to and between different configurations. Other embodiments are contemplated.

As will be appreciated from the subsequent description of the control system 82 in connection with FIG. 2 below, in some embodiments, the visual content VC represents a navigable graphical interface which serves as part of the user interface 86 employed to control the patient support apparatus 30. Here, because the screen 94 moves currently with the patient support deck 38 to and between the vertical configuration 38A, 38B as noted above, the screen 94 is necessarily further away from the caregiver's C eyes in the first vertical configuration 38A (see FIG. 1B) than in the second vertical configuration 38B (see FIG. 1A). Thus, the visual content VC displayed by the screen 94 in the first content layout CL1 may be scaled, arranged, or otherwise configured differently from the second content layout CL2 in some embodiments so as to improve visibility and functionality when the screen 94 is positioned further away from the caregiver C.

With continued reference to the embodiment illustrated in FIGS. 1A-1B, the visual content VC comprises a first content portion CP1, the first content layout CL1 comprises a first scaling factor X1 which is associated with the first content portion CP1, and the second content layout CL2 comprises a second scaling factor X2 which is likewise associated with the first content portion CPL. Here, the first scaling factor X1 is greater than the second scaling factor X2 such that at least the first content portion CP1 of the visual content VC displayed by the screen 94 is "larger" when the patient support deck 38 is in the first vertical configuration 38A (see FIG. 1B) compared to when the patient support deck 38 is in the second vertical configuration 38B (see FIG. 1A). In some embodiments, the visual content VC further comprises a second content portion CP2 (see FIGS. 2 and 4A-4B) which is distinguishable from the first content portion CP1.

Those having ordinary skill in the art will appreciate that the visual content VC can be delineated in a number of different ways, and may comprise any suitable number of content portions CP1, CP2 which may be distinguishable from each other (e.g., discrete icons, menus, graphics, symbols, buttons, and the like). Thus, in some embodiments, discrete portions of the same content portion may change in different ways. By way of non-limiting example, and as is described in greater detail below in connection with the embodiment depicted in FIGS. 4A-4B, the first content portion CP1 may comprises graphics which change between the first and second content layouts CL1, Cl2 based on the first and second scaling factors X1, X2, and the first content portion CP1 may also comprise text TX which changes between first and second font sizes FS1, FS2. Thus, it will be appreciated that sub-portions of one content portion may change relative to each other (e.g., the graphics and text TX of the first content portion CP1) and/or relative to a different content portion (e.g., CP2) as the screen 94 displays different content layouts CL1, CL2.

As will be appreciated from the subsequent description below, the first and/or the second content layouts CL1, CL2 can be configured in a number of different ways so as to optimize the functionality and visibility of the visual content VC based on changes between the vertical configurations 38A, 38B (and/or based on other parameters associated with utilization of the patient support apparatus 30 as described in greater detail below). By way of non-limiting example, the second content layout CL2 shown in FIG. 1A includes a total of six virtual "buttons" which may be used to control three exemplary features of the patient support apparatus 30, while the first content layout CL1 shown in FIG. 1B includes two larger virtual "buttons" for controlling one of these three exemplary features of the patient support apparatus 30. In this representative embodiment, these two "buttons" are associated with the first content portion CP1 and are provided for lifting and/or lowering the patient support deck 38. Here, it will be appreciated that by increasing the size of the first content portion CP1 when the patient support deck 38 is positioned closer to the base 34 the caregiver C is presented with larger virtual "buttons" which afford improved visibility and ease of engagement under certain operating conditions of the patient support apparatus (e.g., when the screen 94 of the user interface 86 is closer to the floor).

Furthermore, it will be appreciated that the visual content VC could dynamically change between the content layouts CL1, CL2 as the patient support deck 38 moves between the vertical configurations 38A, 38B. By way of non-limiting example, the controller 84 could linearly scale the first content portion CP1 of the visual content VC, such as by using the scaling factors X1, X2 as respective end-points between the vertical configurations 38A, 38B, to display visual content VC at an intermediate content layout CL1.5 with an intermediate scaling factor X1.5 when the patient support deck 38 is between the first and second vertical configurations 38A, 38B (not shown in connection with this embodiment). In addition, it will be appreciated that the controller 84 can display visual content VC in different ways, based such as on which direction the patient support deck 38 is moving. By way of non-limiting example, when the patient support deck 38 is moved towards the floor as the caregiver C actuates a "lower bed" button, the content layout could dynamically change to increase the size of the "lower bed" button as the patient support deck 38 moves closer to the floor. In some embodiments, one or more content portions CP1, CP2 of the visual content VC may change concurrently or separately in ways other than by resizing graphics and text TX based on the scaling factors X1, X2. By way of non-limiting example, as the "lower bed" button associated with the first content portion CP1 is scaled up in size in response to movement toward the first vertical configuration 38A, other buttons, controls, or information (e.g., associated with the second content portion CP2 or another content portion) could be hidden, moved off-screen, and the like. In some embodiments, once the patient support deck 38 has been positioned as close to the floor as possible in the first vertical configuration 38A, the controller 84 could hide everything associated with the first content portion CP1 except for a large "bed up" button used to subsequently move the patient support deck 38 away from the floor. Here in this embodiment, after the "bed up" button has actuated by the caregiver C, the "bed up" button could remain unchanged in size until released, and then the controller 84 could subsequently display different visual content VC (e.g., the first content portion CP1 depicted in FIG. 1A) based on the current position of the patient support deck 38. Other embodiments and configurations are contemplated.

Referring now to FIGS. 2-4B, as noted above, the illustrated embodiment of the patient support apparatus 30 employs the controller 84 to adjust visual content VC displayed on the screen 94 based on movement within the envelope determined via the proximity sensor 102. To this end, the controller 84 is configured to display visual content VC in the first content layout CL1 during an absence of movement occurring within the envelope 104 sensed by the proximity sensor 102 (see FIGS. 2, 3A, and 4A), and to display visual content VC in the second content layout CL2 in response to movement occurring within the envelope 104 sensed by the proximity sensor 102. Here, one or more of the first content portion CP1, the second content portion CP2, other content portions, or sub-portions of content portions of the visual content VC may change in various ways depending on how the patient support apparatus 30 utilizes the proximity sensor 102.

Figure 4A:
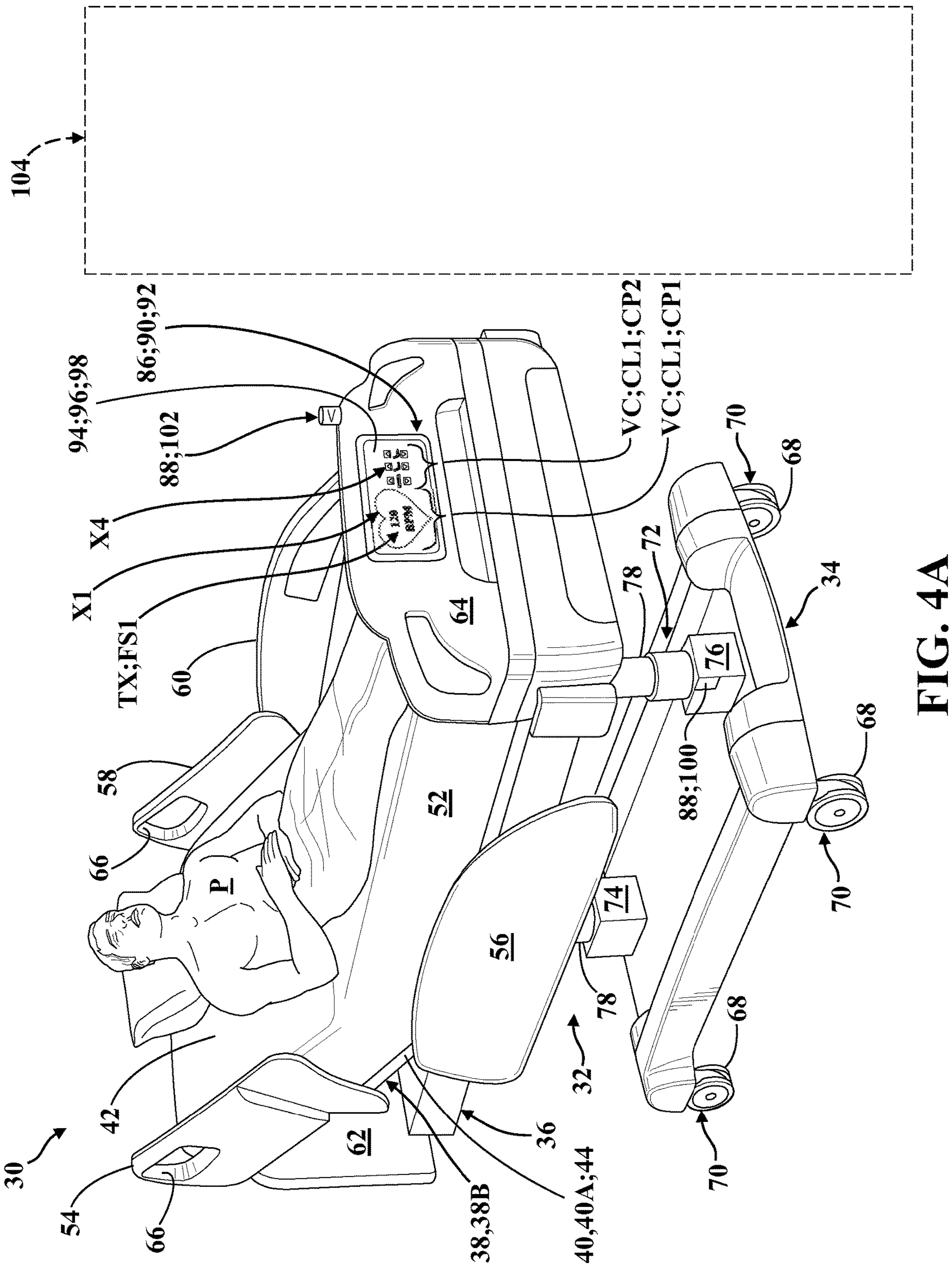
FIG. 4A is a perspective view of another embodiment of a patient support apparatus according to the present disclosure, shown with a user interface coupled arranged for use by a caregiver and having a screen displaying visual content in a first content layout, and with a proximity sensor shown operating to sense movement within an envelope adjacent to the caregiver-accessible user interface.
Figure 4B:
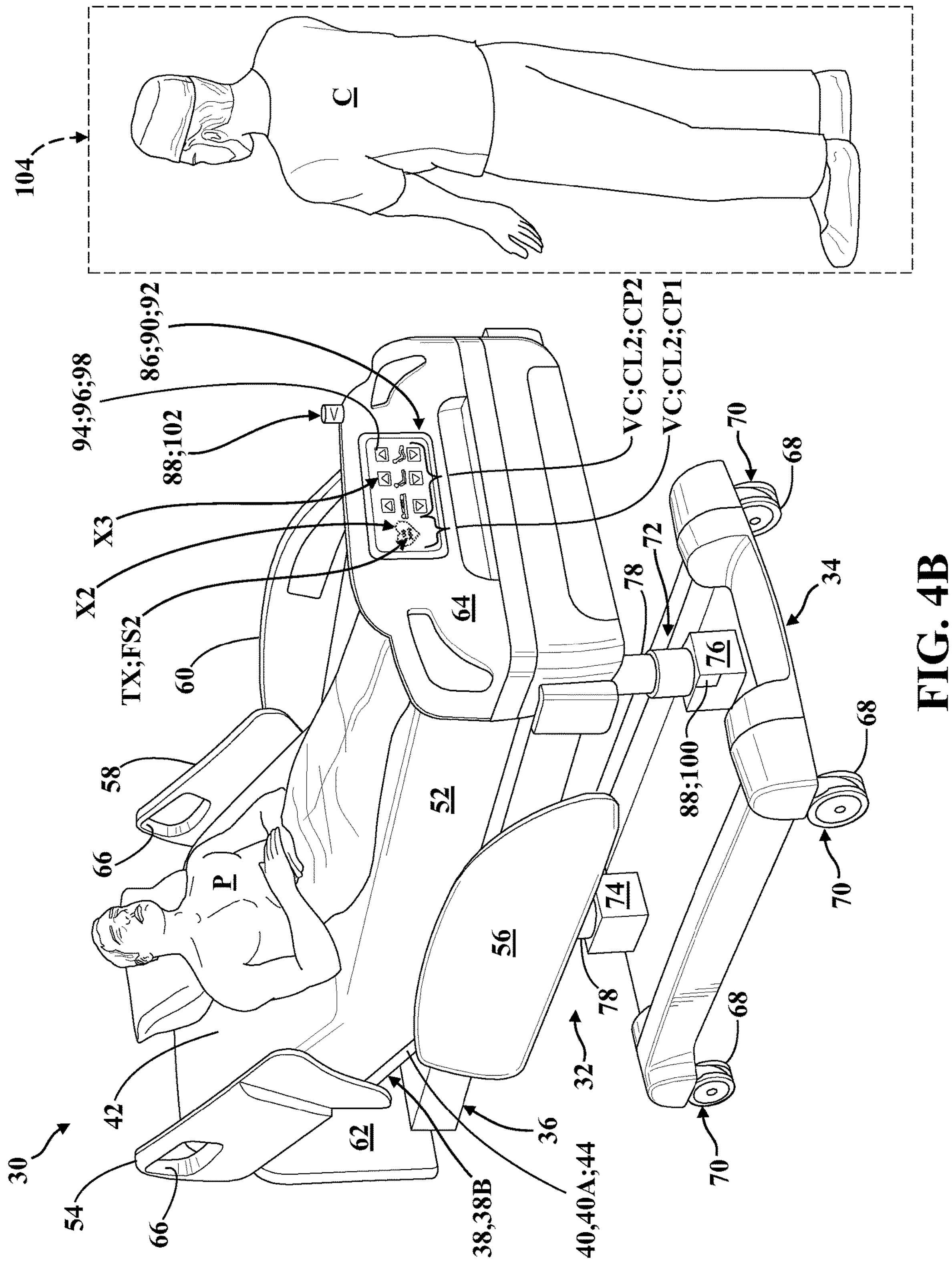
FIG. 4B is another perspective view of the patient support apparatus of FIG. 4A, shown with the screen of the caregiver-accessible user interface displaying visual content in a second content layout, and shown with a caregiver positioned within the envelope sensed by the proximity sensor.

In the representative embodiment depicted in FIGS. 4A-4B (see also FIG. 2), the proximity sensor 102 is coupled to the footboard 64 adjacent to and spaced from the screen 94 of the caregiver-accessible user interface 86. As is depicted in FIGS. 3A-4B, this arrangement positions the envelope 104 adjacent to the foot-end of the patient support apparatus 30 such that when movement is sensed by the proximity sensor nearby the foot-end of the patient support apparatus 30, the controller 84 adjusts, alters, or otherwise changes the visual content VC displayed on the screen 94 from the first content layout CL1 (see FIG. 4A) to the second content layout CL2 (see FIG. 4B). Put differently, the arrangement of the proximity sensor 102 described above allows the caregiver C to view visual content VC in different ways based on their distance from (or proximity to) the patient support apparatus.

Those having ordinary skill in the art will appreciate that this configuration affords the caregiver C with the ability to view visual content VC from a distance and without necessarily approaching the patient support apparatus 30. This can be advantageous in situations where the caregiver C wants to observe certain types of relevant visual content VC displayed on the screen 94 without disturbing the patient P, such as when the patient P is resting or asleep. In addition, it will be appreciated that this configuration also affords the caregiver C with the ability to automatically transition to visual content VC which is more relevant when viewed closer to the screen 94.

By way of non-limiting example, in the representative embodiment illustrated in FIGS. 4A-4B (see also FIG. 2), the visual content VC comprises first and second content portions CP1, CP2 which are similar to but different from the embodiment described above in connection with FIGS. 1A-1B. In this embodiment, the second content portion CP2 comprises the six virtual "buttons" described above, and the first content portion CP1 comprises a graphical representation of a heart in which text TX, representing the patient's P current heartrate, is displayed (determined such as with a patient monitoring system, one or more patient sensors, and the like).

As shown in FIGS. 2 and 4A-4B, both the text TX and the graphical representation of the heart, which together comprise the first content portion CP1 in this embodiment, are associated with and sized according to the first scaling factor X1 when the controller 84 displays the first content layout CL1 on the screen 94 (see FIG. 4A), and are associated with and sized according to the second scaling factor X2 when the controller 84 displays the second content layout CL2 on the screen 94 (see FIG. 4B). Here too, the first scaling factor X1 is greater than the second scaling factor X2 (compare FIGS. 4A-4B; see also FIG. 2). Furthermore, as noted above, sub-portions of the same content portion of the visual content VC can be displayed on the screen 94 in different ways relative to, or independent of, one another in certain embodiments. Here and to this end, the text TX of the first content portion CP1 (which represents the patient's current heartrate in this embodiment) comprises a first font size FS1 (see FIGS. 2 and 4A) associated with the first scaling factor X1, and a second font size FS2 (see FIGS. 2 and 4B) associated with the second scaling factor X2. In this embodiment, the font sizes FS1, FS2 correlate directly with (and proportional to) the scaling factors X1, X2 such that the first font size FS1 is larger than the second font size FS2. However, other configurations and relationships are contemplated (e.g., non-proportional relationships and/or inverse relationships such as those that would decrease the font size as the scaling factor increases). Thus, in this embodiment, each of the sub-portions of the first content portion CP1 are sized larger in the first content layout CL1 than they are sized in the second content layout CL2 (compare FIGS. 4A-4B; see also FIG. 2).

With continued reference to FIGS. 2 and 4A-4B, in this embodiment, the second content portion CP2 comprising the six virtual "buttons" described above is associated with and sized according to a third scaling factor X3 when the controller 84 displays the second content layout CL2 on the screen 94 (see FIG. 4B), and is associated with and sized according to a fourth scaling factor X4 when the controller 84 displays the first content layout CL1 on the screen 94 (see FIG. 4A). Here, the third scaling factor X3 is greater than the fourth scaling factor X4 (compare FIGS. 4A-4B; see also FIG. 2). Thus, in this embodiment, each of the sub-portions of the second content portion CP2 are sized smaller in the first content layout CL1 than they are sized in the second content layout CL2 (compare FIGS. 4A-4B; see also FIG. 2).

As noted above, when visual content VC is displayed in the first content layout CL1, the sub-portions of the first content portion CP1 are scaled larger than they are scaled when in the second content layout CL2, whereas the sub-portions of the second content portion CP2 are scaled smaller (see FIGS. 2 and 4A). Conversely, when visual content VC is displayed in the second content layout CL2, the sub-portions of the first content portion CP1 are scaled smaller than they are scaled when in the first content layout CL1, whereas the sub-portions of the second content portion CP2 are scaled larger (see FIGS. 2 and 4B).

Because the controller 84 is configured to display visual content VC on the screen 94 in the first content layout CL1 during an absence of movement occurring within the envelope 104 in this embodiment, the caregiver C is able to observe visual content VC on the screen 94 which reflects the patient's P heartrate in a larger size than virtual "buttons" of the user interface 86 while they are positioned away from the patient support apparatus 30. This allows the caregiver C to view the patient's P heartrate from a distance and without necessarily requiring that the caregiver C come into close proximity with the patient support apparatus 30 (e.g., with a quick glance into the patient's P room while making rounds so as not to disturb to the patient P). Moreover, while it is contemplated that the second content portion CP2 of the visual content VC could be displayed or otherwise adjusted in ways other than by scaling as noted above (e.g., by hiding one or more sub-portions of the second content portion CP2), it may be advantageous in certain applications for one or more virtual "buttons" to remain displayed on the screen 94 in a smaller size alongside the larger heartrate text TX. Here, the continued presence of the second content portion CP2 in the first content layout CL1, even with a smaller size when viewed from a distance, may communicate useful status information about the patient support apparatus 30. By way of example, status information communicated by the smaller sized second content portion CP2 could assure the caregiver that certain features of the patient support apparatus 30 remained "locked," that one or more of the deck sections 40 haven't been adjusted recently, that the patient P hasn't attempted to exit the patient support apparatus 30 without assistance, and the like. Other configurations are contemplated.

Furthermore, because the controller 84 is configured to display visual content VC on the screen 94 in the second content layout CL2 in response to movement occurring within the envelope 104 in this embodiment, the caregiver C is able to observe visual content VC on the screen 94 which reflects the patient's P heartrate in a smaller size than virtual "buttons" of the user interface 86 while they are positioned nearby the patient support apparatus 30. This allows the caregiver C to continue viewing the patient's P heartrate on the screen 94 in a smaller size as they approach the patient support apparatus 30, while simultaneously improving their ability to view the virtual "buttons" of the user interface 86 by scaling the second content portion CP2 to a larger size. Put differently, because the embodiments of the present disclosure allow visual content VC to be presented to the caregiver C in different ways based on their proximity to the patient P and/or to the patient support apparatus 30, visual content VC which is relevant when the caregiver C is standing next to the patient support apparatus 30 (e.g., virtual "buttons" of the user interface 86 that raise or lower the patient support deck 38) can automatically be presented on the screen 94 more prominently than when they the caregiver C is further away from the patient support apparatus 30, where different visual content VC be more relevant to the caregiver C (e.g., large text TX representing the patient's P current heartrate).

Like the embodiment described above in connection with FIGS. 1A-2, changes in the visual content VC may occur in a number of different ways, including where changing between the first and second content layouts CL1, CL2 occurs in "steps" (e.g., with or without an intermediate content layout CL1.5), or where changing between the first and second content layouts CL1, CL2 occurs progressively and/or dynamically. Furthermore, it will be appreciated that the examples described above represent illustrative examples of certain implementations of the embodiments of the present disclosure which have been described separately herein for the purposes of clarity and consistency. Other configurations are contemplated herein, including without limitation utilizing the controller 84 to adjust, change, or otherwise present visual content VC displayed in the screen 94 in different ways to differentiate between correspondingly different modes, states, conditions, and/or use of the patient support apparatus 30, with or without the use of additional (and/or different types of) sensors 88.

As noted above, another embodiment of the patient support apparatus 30 is depicted in FIGS. 5-12E. As will be appreciated from the subsequent description below, this embodiment is substantially similar to the embodiment illustrated in FIGS. 1A-4B. Accordingly, the forgoing description of the embodiment illustrated in FIGS. 1A-4B also applies to the embodiment illustrated in FIGS. 5-12E, and the specific differences between these embodiments will be described in detail.

Figure 5:
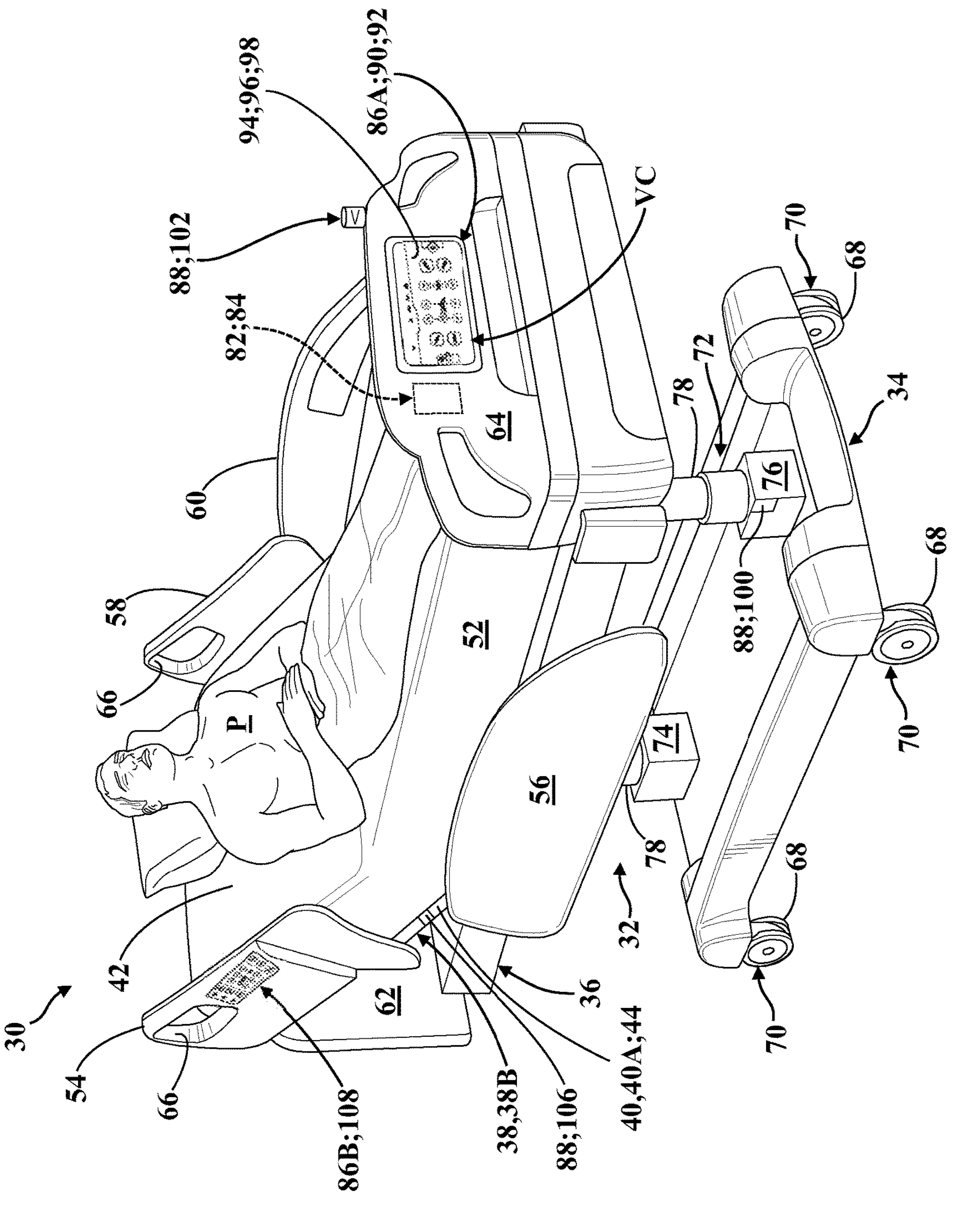
FIG. 5 is a perspective view of another patient support apparatus according to the present disclosure shown having a base, a patient support deck supporting a patient and having a deck section arranged in a first section position, a lift mechanism interposed between the base and the patient support deck supporting the patient support deck in an intermediate vertical configuration relative to the base, and first and second user interfaces each arranged for use by a caregiver.

Referring now to FIGS. 5-12E, in the illustrated embodiment, the patient support apparatus 30 comprises first and second user interfaces 86A, 86B coupled, respectively, to the footboard 64 and the first side rail 54 (see FIG. 5). In this embodiment, the control system 82 of the patient support apparatus 30 employs the lift sensor 100 to determine movement of the patient support deck 38 from and between the first vertical configuration 38A (see FIG. 10D), the first intermediate vertical configuration 38C (see FIG. 10C), the second intermediate vertical configuration 38D (see FIG. 10B), and the second vertical configuration 38B (see FIG. 10A) via the one or more lift actuators 78. Here, the first vertical configuration 38A represents a "fully lowered bed," the second vertical configuration 38B represents a "fully raised bed," and the intermediate vertical configurations 38C, 38D represent arbitrary positions between the first and second vertical configurations 38A, 38B.

In this embodiment, the control system 82 also employs a deck sensor, generally indicated at 106 (depicted schematically in FIG. 6) disposed in communication with the controller 84 such as via wired or wireless communication. Here, the deck sensor 106 is used to determine movement of the deck section 40 (specifically, the back section 44 in the illustrated embodiment) from and between the first section position 40A (see FIG. 7A), the second section position 40B (see FIG. 7C), and one or more intermediate section positions 40C (see FIG. 7B) between the first and second section positions 40A, 40B via the one or more deck actuators 80. As will be appreciated from the subsequent description below, the deck sensor 106 could be realized in a number of different ways. By way of non-limiting example, the deck sensor 106 could be realized as a discrete component such as a rotary potentiometer, a range sensor, a hall-effect sensor, a limit switch, an accelerometer, a gyroscope, and the like generally configured or arranged to measure position, height, or movement. Further, the deck sensor 106 could be an encoder, a current sensor, and the like coupled to or in communication with the deck actuator 80. Moreover, the functionality afforded by the deck sensor 106 could be entirely or partially realized with software or code for certain applications.

In the embodiment illustrated in FIGS. 5-12E, the first user interface 86A is likewise configured to operate the patient support apparatus 30 and comprises the screen 94 to display visual content VC and the touch sensor 96 to generate the input signal IS. As described in greater detail below, in this embodiment, the visual content VC comprises a graphical user interface with a plurality of content portions, many of which each have respective content states, such as a first content portion CP1 that has a first content state CS1 (see FIG. 8A) and a second content state CS2 (see FIG. 8C). The second user interface 86B is different from the first user interface 86A and is also configured to operate the patient support apparatus 30. However, rather than displaying visual content VC, the second user interface 86B comprises an access panel 108 that includes a plurality of panel portions, many of which are each associated with a button or a symbol formed in or otherwise defined by the access panel 108, where the panel portions are arranged adjacent to a light module having respective illumination states, such as a first panel portion PP1 associated with a symbol adjacent to a light module that is operable by the controller 84 between a first illumination state IS1 (see FIG. 9A) and a second illumination state IS2 (see FIG. 9C). The first and second user interface 86A, 86B will each be described in greater detail below.

Referring now to FIGS. 8A-8D and 11A-11E, visual content VC displayed on the screen 94 of the first user interface 86A is shown with various content portions presented in content states corresponding to the configuration of the patient support apparatus 30, as noted above and as is described in greater detail below. For illustrative and exemplary purposes, this visual content VC has been delineated into specific content portions CP for illustrative purposes, including without limitation: a first content portion CP1 that comprises a first virtual icon 110, a second content portion CP2 that comprises a first virtual button 112, a third content portion CP3 that comprises a second virtual button 114, a fourth content portion CP4 that comprises a second virtual icon 116, a fifth content portion CP5 that comprises a third virtual button 118, a sixth content portion CP6 that comprises a fourth virtual button 120, and a seventh content portion CP7 that comprises a third virtual icon 122. As is described in greater detail below, the content portions CP1, CP2, CP3, CP4, CP5, CP6, CP7 each have respective first and second content states CS1, CS2 (and, in some embodiments, respective third content states CS3) which are used to communicate different conditions, states, statuses, and the like of the portion of the patient support apparatus 30 to which they are attributed. It will be appreciated that the terms "first," "second," "third," and so on are used herein for the non-limiting illustrative purposes of clarity and consistency unless otherwise noted.

Referring now to FIGS. 9A-9D and 12A-12E, the access panel 108 of the second user interface 86B is shown with various panel portions and their respective light modules presented in illumination states corresponding to the configuration of the patient support apparatus 30, as noted above and as is described in greater detail below. For illustrative and exemplary purposes, the access panel 108 has been delineated into a first panel portion PP1 that comprises a first symbol 124, a second panel portion PP2 that comprises a first button 126, a third panel portion PP3 that comprises a second button 128, a fourth panel portion PP4 that comprises a third button 130, and a fifth panel portion PP5 that comprises a fourth button 132. Here, the first panel portion PP1 is arranged adjacent to a first light module 134, the second panel portion PP2 is arranged adjacent to a second light module 136, the third panel portion PP3 is arranged adjacent to a third light module 138, the fourth panel portion PP4 is arranged adjacent to a fourth light module 140, and the fifth panel portion PP5 is arranged adjacent to a fifth light module 142. As is described in greater detail below, the light modules 134, 136, 138, 140, 142 each have respective first and second illumination states IS1, IS2 (and, in some embodiments, respective third illumination states IS3) which are used to communicate different conditions, states, statuses, and the like of the portion of the patient support apparatus 30 to which they are attributed. Here too, it will be appreciated that the terms "first," "second," "third," and so on are used herein for the non-limiting illustrative purposes of clarity and consistency unless otherwise noted.

Figure 6:
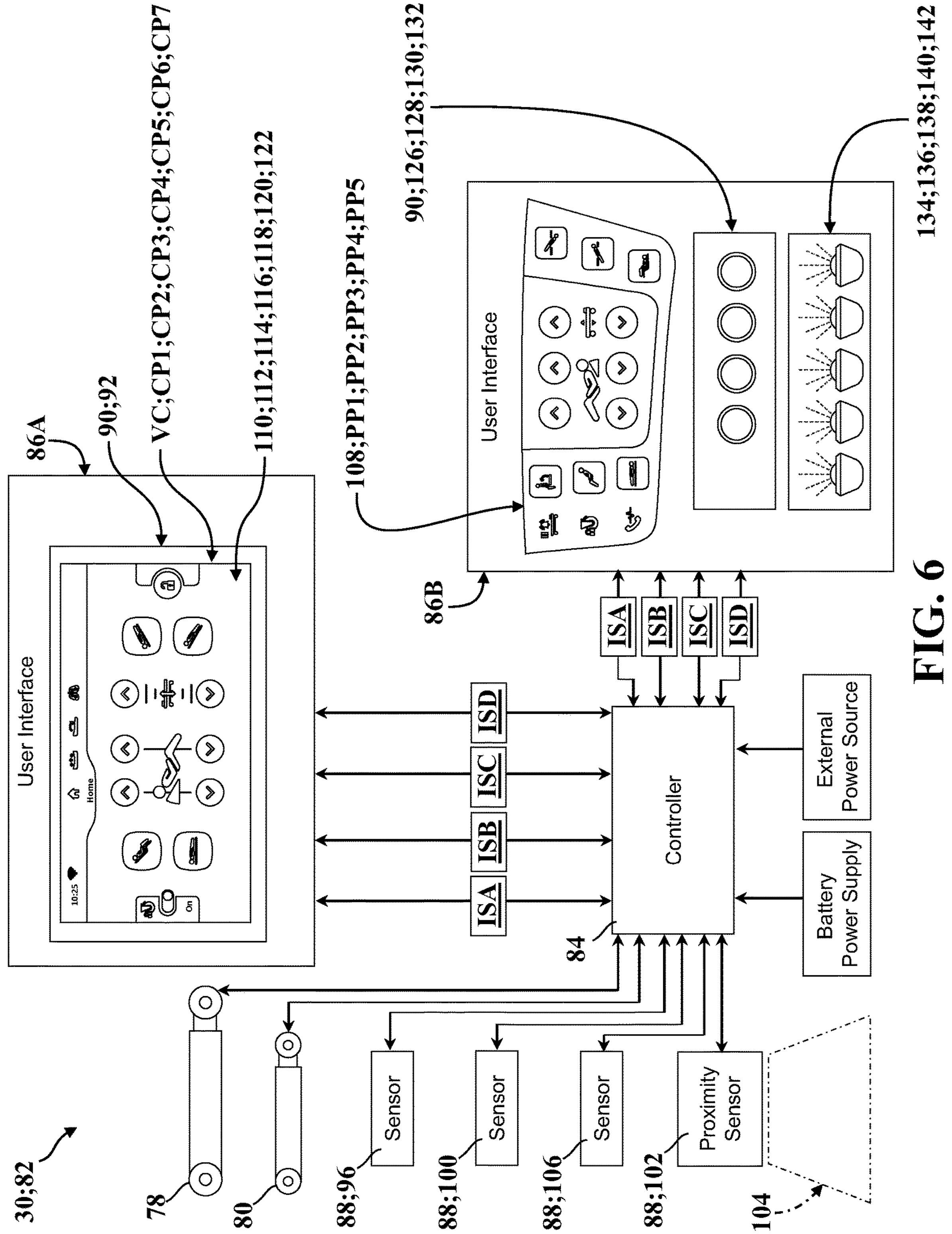
FIG. 6 is a partial schematic view of a control system of the patient support apparatus of FIG. 5, the control system shown comprising a controller disposed in communication with the first and second user interfaces, and disposed in communication with actuators and sensors.

Referring now to FIG. 6, the control system 82 for this embodiment of the patient support apparatus 30 is depicted schematically. Here, the controller 84 is disposed in communication (e.g., via wired or wireless electrical communication) with the one or more lift actuators 78, the one or more deck actuators 80, the sensors 88 including the lift sensor 100 and the deck sensor 106, and the input devices 90 of the first and second user interfaces 86A, 86B. More specifically, in this embodiment, the controller 84 is disposed in communication with the touchscreen 92 (including the screen 94 and the touch sensor 96) of the first user interface 86A, and with the buttons 126, 128, 130, 132 and the light modules 134, 136, 138, 140, 142 of the second user interface 86B. As is described in greater detail below, the user interfaces 86A, 86B are configured to generate one or more input signals IS (e.g., first, second, third, and fourth input signals ISA, ISB, ISC, ISD) in response to engagement by the user with one or more input devices 90 defined by the virtual buttons 112, 114, 118, 120 of the first user interface 86A and/or the buttons 126, 128, 130, 132 of the second user interface 86B.

It will be appreciated that the first, second, third, and fourth input signals ISA, ISB, ISC, ISD are used herein to describe signals received by the controller 84 from either of the first and second user interfaces 86A, 86B that are associated with performing a specific function of the patient support apparatus 30. Thus, while both the first and second user interfaces 86A, 86B can generate the first input signal ISA in certain embodiments and under certain operating conditions, each respective user interface 86A, 86B may generate signals of different respective types that are nevertheless interpreted as or otherwise understood by the controller 84 to be associated with the first input signal ISA. Other configurations are contemplated.

The controller 84 is also configured to display, render, or otherwise present the content portions CP1, CP2, CP3, CP4, CP5, CP6, CP7 on the screen 94 in the respective first or second content states CS1, CS2 (or, in some embodiments, the respective third content state CS3) depending on the configuration and/or arrangement of one or more components of the patient support apparatus 30, as described in greater detail below. Similarly, the controller 84 is configured to drive, actuate, control, or otherwise operate the light modules 134, 136, 138, 140, 142 in the respective first or second illumination states IS1, IS2 (or, in some embodiments, the respective third illumination state IS3) depending on the configuration and/or arrangement of one or more components of the patient support apparatus 30, as described in greater detail below.

In the illustrated embodiment, the access panel 108 of the second user interface 86B is configured such that the light modules 134, 136, 138, 140, 142 can emit light through at least a portion of the respective panel portions PP1, PP2, PP3, PP4, PP5 under certain operating conditions. Thus, the first symbol 124 and the buttons 126, 128, 130, 132 are configured such that light emitted by the light modules 134, 136, 138, 140, 142 at least partially illuminates the respective panel portions PP1, PP2, PP3, PP4, PP5 (e.g., as "backlights"). It will be appreciated that the light modules 134, 136, 138, 140, 142 can be of a number of different types, styles, configurations, and the like (e.g., light emitting diodes LEDs) without departing from the scope of the present disclosure. Similarly, it will be appreciated that the buttons 126, 128, 130, 132 can be of different types, styles, configurations, and the like (e.g., capacitive touch sensors) without departing from the scope of the present disclosure.

Referring now to FIGS. 7A-9D, one aspect of the patient support apparatus 30 is illustrated in connection with the first virtual icon 110 associated with the first content portion CP1 of the first user interface 86A and the first symbol 124 associated with the first panel portion PP1 and the first light module 134 of the second user interface 86B. In this embodiment, when the deck sensor 106 determines that the deck section 40 (e.g., the back section 44) is in the first section position 40A (see FIG. 7A), the controller 84 is configured to display the first content portion CP1 of the visual content VC on the screen 94 in the first content state CS1 (see FIG. 8A), and to control the first light module 134 in the first illumination state IS1 (see FIG. 9A). However, when the deck sensor 106 determines that the deck section 40 is in the second section position 40B (see FIG. 7C), the controller 84 is configured to display the first content portion CP1 of the visual content VC on the screen 94 in the second content state CS2 (see FIG. 8D), and to control the first light module 134 in the second illumination state IS2 (see FIG. 9D).

Figure 8B:
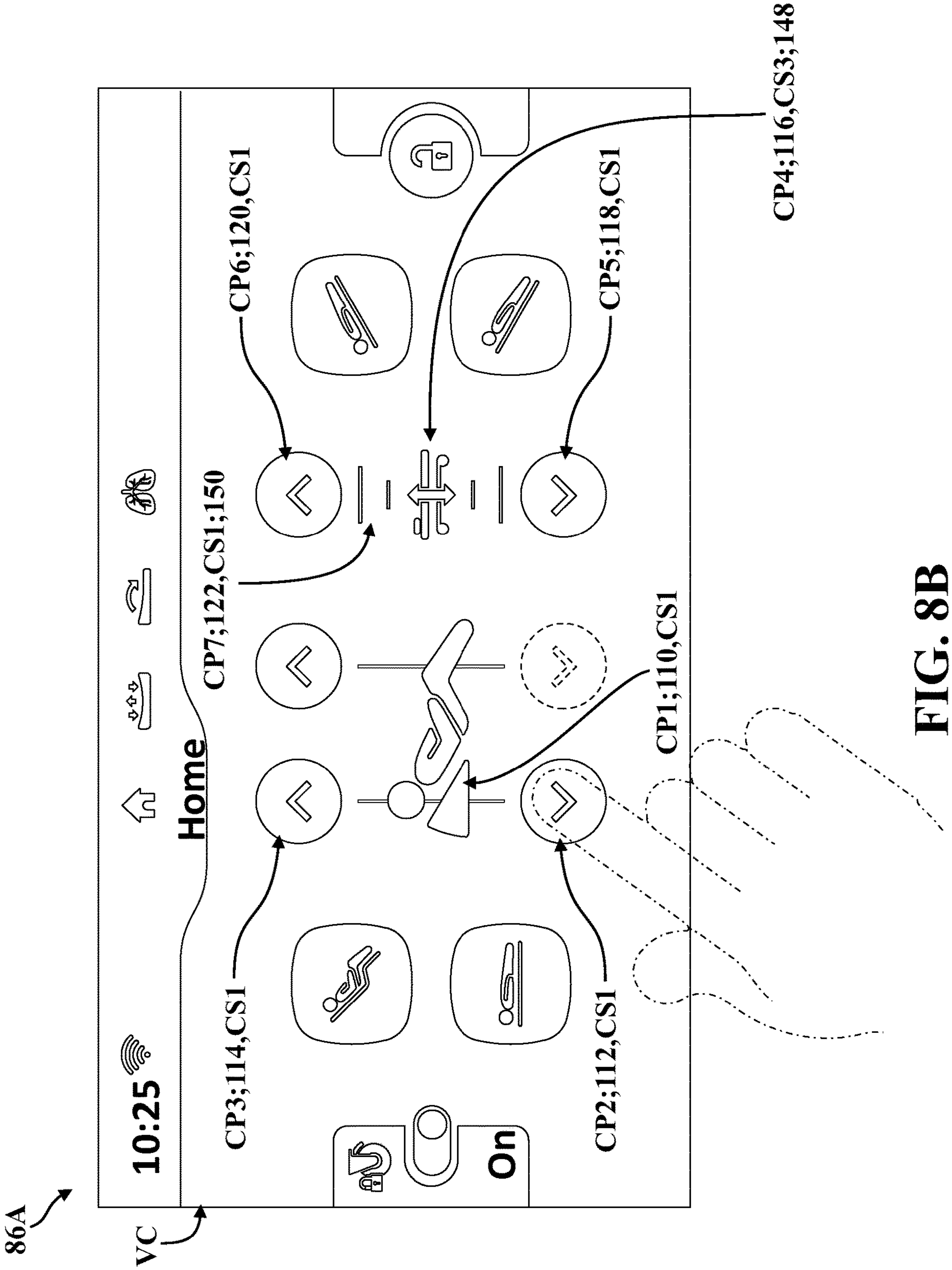
FIG. 8B is another partial plan view of the first user interface of FIG. 8A, with the content portions shown in content states corresponding to the configuration of the patient support apparatus as depicted in FIG. 7B, and with the virtual button shown in the button enabled state being engaged by the user.
Figure 9A:
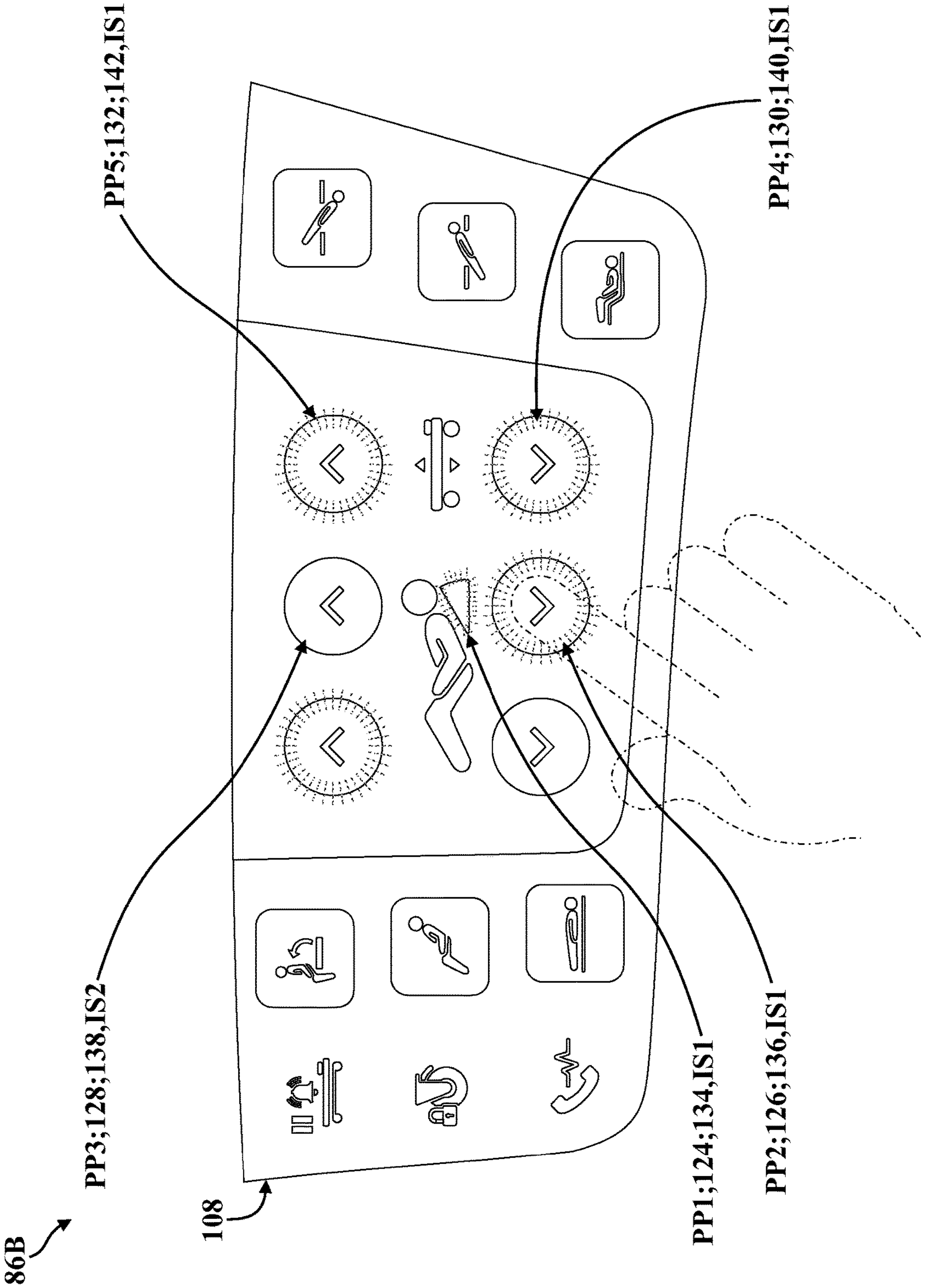
FIG. 9A is a partial plan view of the second user interface of the patient support apparatus of FIGS. 5-7C, shown depicting an access panel having panel portions with buttons and light modules shown in illumination states corresponding to the configuration of the patient support apparatus as depicted in FIG. 7A, and with a button being engaged by a user shown adjacent to a light module operating in a first illumination state.
Figure 9B:
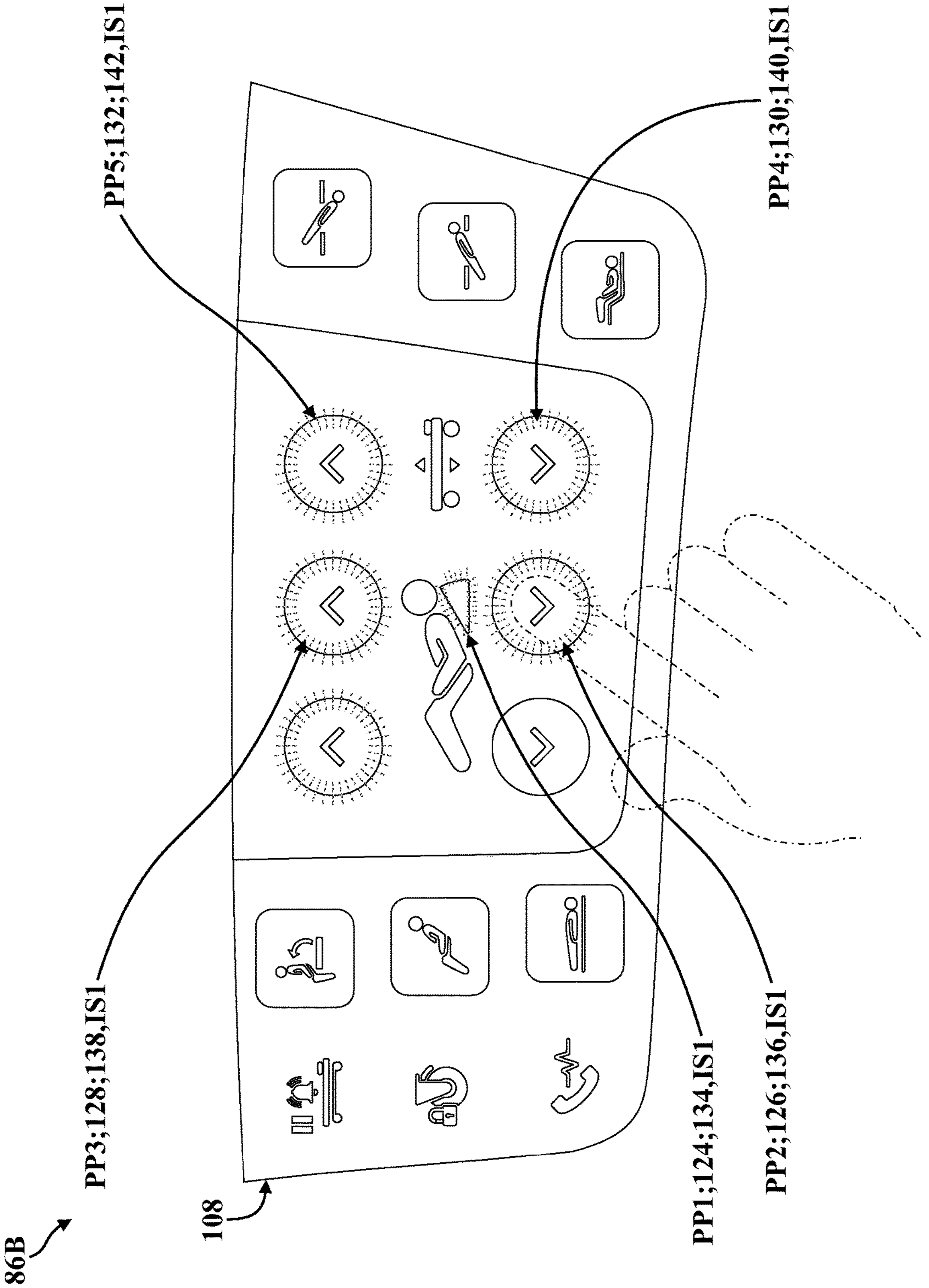
FIG. 9B is another partial plan view of the second user interface of FIG. 9A, with the light modules shown in illumination states corresponding to the configuration of the patient support apparatus as depicted in FIG. 7B, and with the button being engaged by the user shown adjacent to the light module operating in the first illumination state.

Furthermore, in the illustrated embodiment, when the deck sensor 106 determines that the deck section 40 is in the intermediate section position 40C (see FIG. 7B), is between the first section position 40A (see FIG. 7A) and the intermediate section position 40C, or is in the first section position 40A, the controller 84 is configured to display the first content portion CP1 of the visual content VC on the screen in the first content state CS1 (see FIG. 8B), and to control the first light module 134 in the first illumination state IS1 (see FIG. 9B). In the representative embodiment illustrated herein, the intermediate section position 40C corresponds to the back section 40 being arranged at a "fowler's position" defined by an angle of approximately 30-deg relative to the base 34. While not illustrated throughout the drawings, the definition of the intermediate section position 40C could be adjustable by the user in some embodiments (e.g., via the first user interface 86A), such as between a predetermined range of values (e.g., between 30-deg and 45-deg). Other configurations are contemplated.

As noted above, in the illustrated embodiment, the first content portion CP1 comprises the first virtual icon 110, and the first panel portion PP1 comprises the first symbol 124. Here, the first virtual icon 110 of the first user interface 86A is displayed on the screen 94 or otherwise forms a part of the visual content VC in the first content state CS1 of the first content portion CP1, and is hidden from the visual content VC displayed on the screen 94 in the second content state CS2 of the first content portion CP1. Moreover, the first symbol 124 of the first panel portion PP1 of the second user interface 86B is illuminated in the first illumination state IS1 of the first light module 134, and is not illuminated in the second illumination state IS2 of the first light module 134.

Put differently, the user will be able to observe the first virtual icon 110 displayed on the screen 94 and the first symbol 124 illuminated by the first light module 134 whenever the deck section 40 (e.g., the back section 44) is in the "fowler's position" defined by the intermediate section position 40C (see FIG. 7B), is between the "fowler's position" and a "maximum raised position" defined by the first section position 40A (see FIG. 7A), or is in the "maximum raised position" (see FIG. 7A). Conversely, whenever the deck section 40 (e.g., the back section 44) is below (but not in) the "fowler's position," including when the deck section 40 (e.g., the back section 44) is in a "maximum lowered position" defined by the second section position 40B (see FIG. 7C), the user will not be able to observe the first virtual icon 110 because it is hidden from the visual content VC on the screen 94, nor will the user be readily able to observe the first symbol 124 because it is not illuminated by the first light module 134. It will be appreciated that the back section 44 being at or above the "fowler's position" can be a clinical requirement that is often utilized in patient P care, and the configuration of the patient support apparatus 30 in this embodiment allows the user (e.g., the caregiver) to quickly and efficiently verify that the deck section 40 is raised to or above the "fowler's position" by either checking the first user interface 86A for the presence of the first virtual icon 110 or by checking the second user interface 86B for illumination of the first symbol 124.

In the illustrated embodiments, both the first virtual icon 110 and the first symbol 124 have a generally rounded-triangular profile defining a "pillow" that is associated with control of the deck actuator 80 coupled to the back section 40 of the patient support deck 38 via the first and second virtual buttons 112, 114 and/or the first and second buttons 126, 128, as described in greater detail below. While the "pillow" shape utilized for the first virtual icon 110 appears in the visual content VC presented on the screen 94 in the first content state CS1 of the first content portion CP1, and is hidden from the visual content VC presented on the screen 94 in the second content state CS2 of the first content portion CP1, it will be appreciated that the first and second content states CS1, CS2 of the first content portion CP1 could be defined in other ways sufficient to differentiate from each other. By way of non-limiting example, different graphics, images, symbols, and the like could be used to define the first and second content states CS1, CS2 of the visual content VC. In some embodiments, rather than being hidden from the visual content VC on the screen 94, the "pillow" could change color (e.g., so as to appear "greyed out") in the second content state CS2 of the first content portion CP1. Moreover, it will be appreciated that the first and second content states CS1, CS2 of the visual content VC could also be defined based on different content layouts CL1, CL2, different scaling factors X1, X2, X3, X4, different text TX font sizes FS1, FS2, and the like. Other configurations are contemplated.

Furthermore, while the "pillow" shape utilized for the first symbol 124 is illuminated in the first illumination state IS1 of the first light module 134, and is not illuminated in the second illumination state IS2 of the first light module 134, it will be appreciated that the first and second illumination states IS1, IS2 of the first light module 134 could be defined in other ways sufficient to differentiate from each other. By way of non-limiting example, the first and second illumination states IS1, IS2 could be defined by emission of light at different brightness levels (e.g., dimmed or changing between dimmed and brightened), in different colors, and the like. Other configurations are contemplated. Furthermore, while the access panel 108 may advantageously be configured such that the first symbol 124 of the first panel portion PP1 is "blacked out" when the first light module 134 operates in the second illumination state IS2 (e.g., such as with an automotive dashboard "check engine light"), it will be appreciated that different shapes, arrangements, and the like could be utilized. By way of non-limiting example, instead of a "pillow," shape, the first symbol 124 could comprise text TX. Other configurations are contemplated. Moreover, while the first virtual icon 110 and the first symbol 124 are associated with the position of the back section 44 determined by the deck sensor 106 in the illustrated embodiment, it will be appreciated that other sensors 88 and/or movable or adjustable portions of the patient support apparatus 30 could be employed, such as to change between content states CS1, CS2 of visual content VC and/or illumination states IS1, IS2 of light modules associated with leg section 48, the foot section 50, and the like. Other configurations are contemplated.

Referring again to FIGS. 5-12E, as noted above, the first user interface 86A comprises visual content VC realized as a graphical user interface displayed on the screen 94 with first, second, third, and fourth virtual buttons 112, 114, 118, 120 associated, respectively, with the second, third, fifth, and sixth content portions CP2, CP3, CP5, CP6. Similarly, the second user interface 86B comprises the access panel 108 with first, second, third, and fourth buttons 126, 128, 130, 140 associated, respectively, with the second, third, fourth, and fifth panel portions PP2, PP3, PP4, PP5 arranged adjacent, respectively, to the second, third, fourth, and fifth light modules 136, 138, 140, 142. In the illustrated embodiment, the first virtual button 112 and the first button 126 serve as "fowler down buttons" that generate a first input signal ISA in response to engagement by the user, and the controller 84 is configured to drive the deck actuator 80 coupled to the deck section 40 (e.g., the back section 44) toward the second section position 40B (see FIG. 7C) in response to receiving the first input signal ISA. Conversely, the second virtual button 114 and the second button 128 serve as "fowler up buttons" that generate a second input signal ISB in response to engagement by the user, and the controller 84 is configured to drive the deck actuator 80 coupled to the deck section 40 (e.g., the back section 44) toward the first section position 40A (see FIG. 7A) in response to receiving the second input signal ISB. Furthermore, the third virtual button 118 and the third button 130 serve as "bed down buttons" that generate a third input signal ISC in response to engagement by the user, and the controller 84 is configured to drive the one or more lift actuators 78 to move the patient support deck 38 toward the first vertical configuration 38A (see FIG. 10D) in response to receiving the third input signal ISC. Conversely, the fourth virtual button 120 and the fourth button 132 serve as "bed up buttons" that generate a fourth input signal ISD in response to engagement by the user, and the controller 84 is configured to drive the one or more lift actuators 78 to move the patient support deck 38 toward the second vertical configuration 38B (see FIG. 10A) in response to receiving the fourth input signal ISD.

As shown in FIGS. 8A-9D and 11A-12E and as noted above, the first and second user interfaces 86A, 86B include additional content portions and panel portions, respectively, that can be used to control or provide information about other aspects of the patient support apparatus 30 beyond those described in connection with the illustrated embodiments. While not described or illustrated in detail herein, the first user interface 86A also includes: virtual buttons associated with raising/lowering the leg section 48 via another deck actuator 80; virtual buttons associated with arranging the patient support deck 38 in present patient positions such as a contour position, a flat position, a Trendelenburg position, and a reverse Trendelenburg position; a virtual button associated with locking or disabling access to the first user interface 86A; virtual buttons and/or virtual icons associated with a brake alarm function for the wheels 68; and virtual buttons and/or virtual icons associated with navigating other menus associated with other features of the patient support apparatus 30, such as a low air loss mattress 52 menu, a turn assist menu, and a menu associated with pulmonary systems. Other configurations are contemplated. Furthermore, while note described or illustrated in detail herein, the second user interface 86B also includes: buttons associated with raising/lowering the leg section 48 via another deck actuator 80; buttons associated with arranging the patient support deck 38 in present patient positions such as a contour position, a flat position, a raised leg position, a stand-assist position, a Trendelenburg position, and a reverse Trendelenburg position; and buttons and/or symbols associated with a brake alarm function for the wheels 68, a bed exit alarm system, and/or a nurse call system. It will be appreciated that the forgoing examples are illustrative and non-limiting, and other configurations are contemplated.

In the illustrated embodiment, the second, third, fifth, and sixth content portions CP2, CP3, CP5, CP6 of the visual content VC are each associated with virtual buttons 112, 114, 118, 120. For the purposes of clarity and consistency, the first and second content states CS1, CS2 of each of the second, third, fifth, and sixth content portions CP2, CP3, CP5, CP6 associated with the first, second, third, and fourth virtual buttons 112, 114, 118, 120 are further defined as button enabled and disabled states CS1, CS2, respectively. Here, any of the virtual buttons 112, 114, 118, 120 that are shown on the screen 94 in the button enabled state CS1 can be engaged by the user to generate the respective input signals ISA, ISB, ISC, ISD, while any of the virtual buttons 112, 114, 118, 120 that are shown on the screen 94 in the button disabled state CS2 can not be engaged by the user and are displayed as "greyed-out" on the screen 94. Similarly, for the purposes of clarity and consistency, the first and second illumination states IS1, IS2 of the second, third, fourth, and fifth light modules 136, 138, 140, 142 adjacent to the second, third, fourth, and fifth panel portions PP2, PP3, PP4, PP5 associated with the first, second, third, and fourth buttons 126, 128, 130, 132 are further defined as illumination enabled and disabled states IS1, IS2, respectively. Here, any of the buttons 126, 128, 130, 132 that are illuminated by their respective light modules 136, 138, 140, 142 in the illumination enabled state IS1 can be engaged by the user to generate the respective input signals ISA, ISB, ISC, ISD, while any of the buttons 126, 128, 130, 132 that are not illuminated by their respective light modules 136, 138, 140, 142 (e.g., when in the illumination disabled state IS2) can not be engaged by the user and will not generate the respective input signals ISA, ISB, ISC, ISD.

Figure 9C:
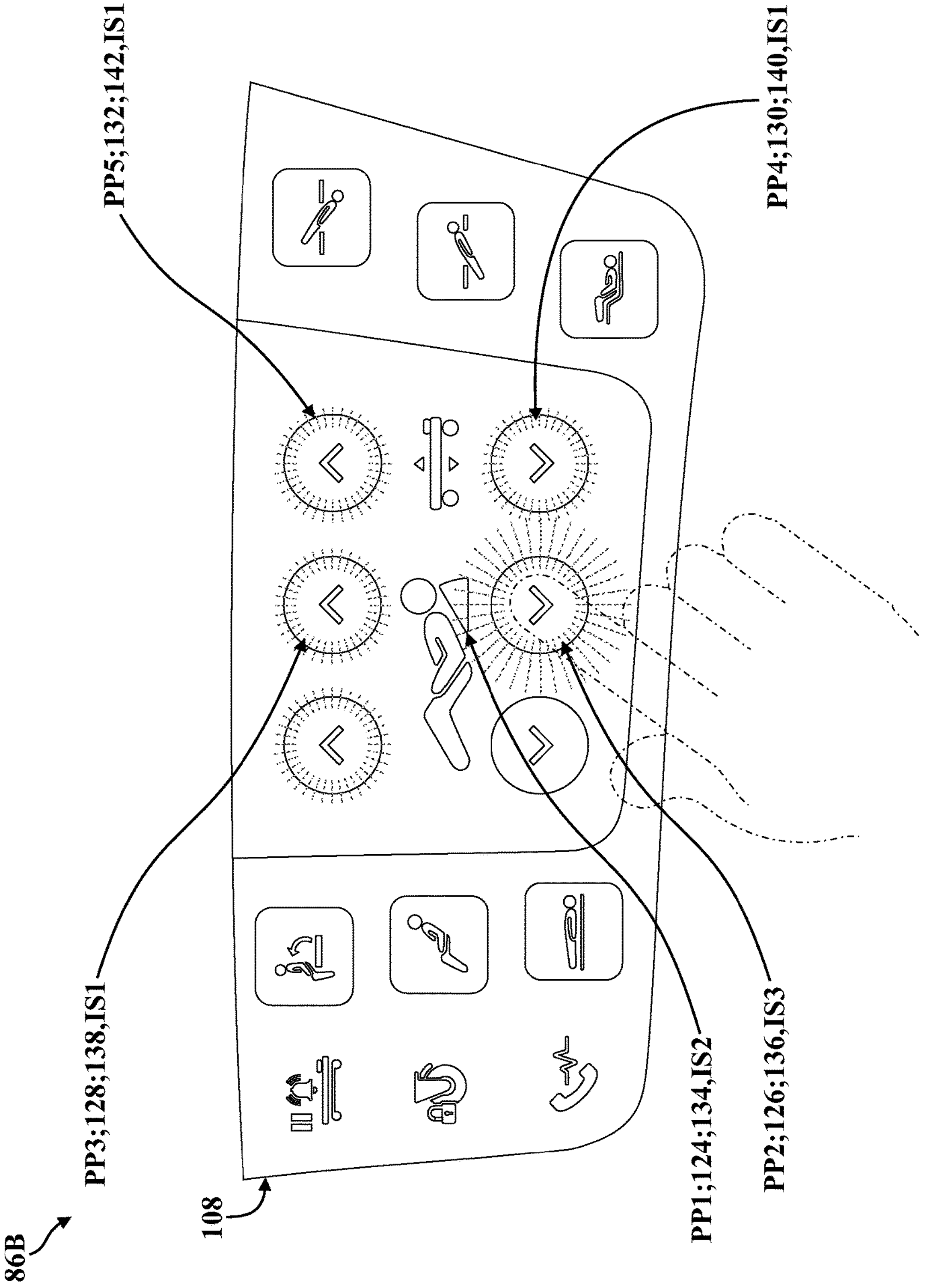
FIG. 9C is another partial plan view of the second user interface of FIGS. 9A-9B, with the light modules shown in illumination states corresponding to the configuration of the patient support apparatus as depicted in FIG. 7C, and with the button being engaged by the user shown adjacent to the light module operating in a third illumination state.
Figure 9D:
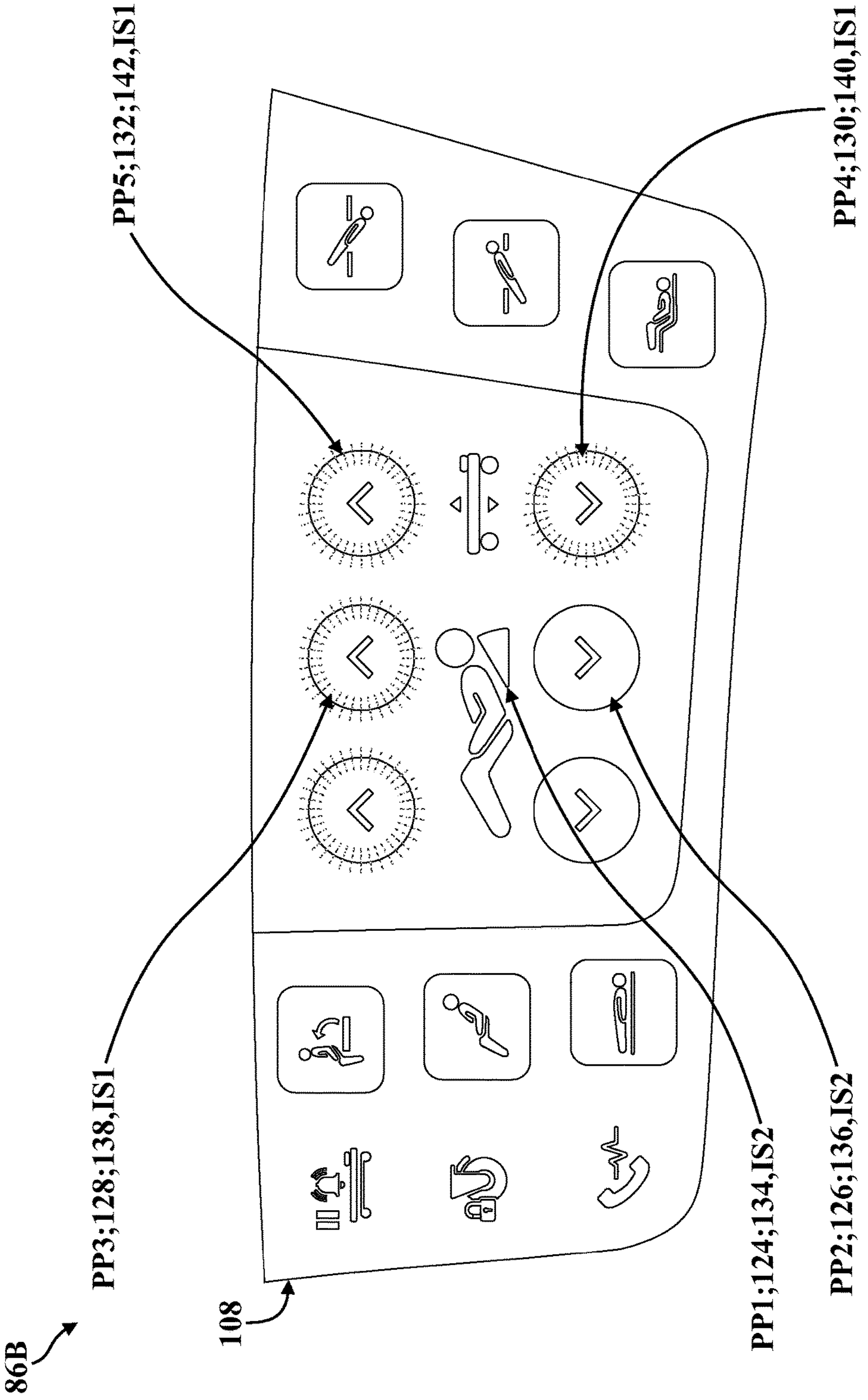
FIG. 9D is another partial plan view of the second user interface of FIGS. 9A-9C, with the light modules shown in illumination states corresponding to the configuration of the patient support apparatus as depicted in FIG. 7C, and with the button shown adjacent to the light module operating in a second illumination state
Figure 10A:
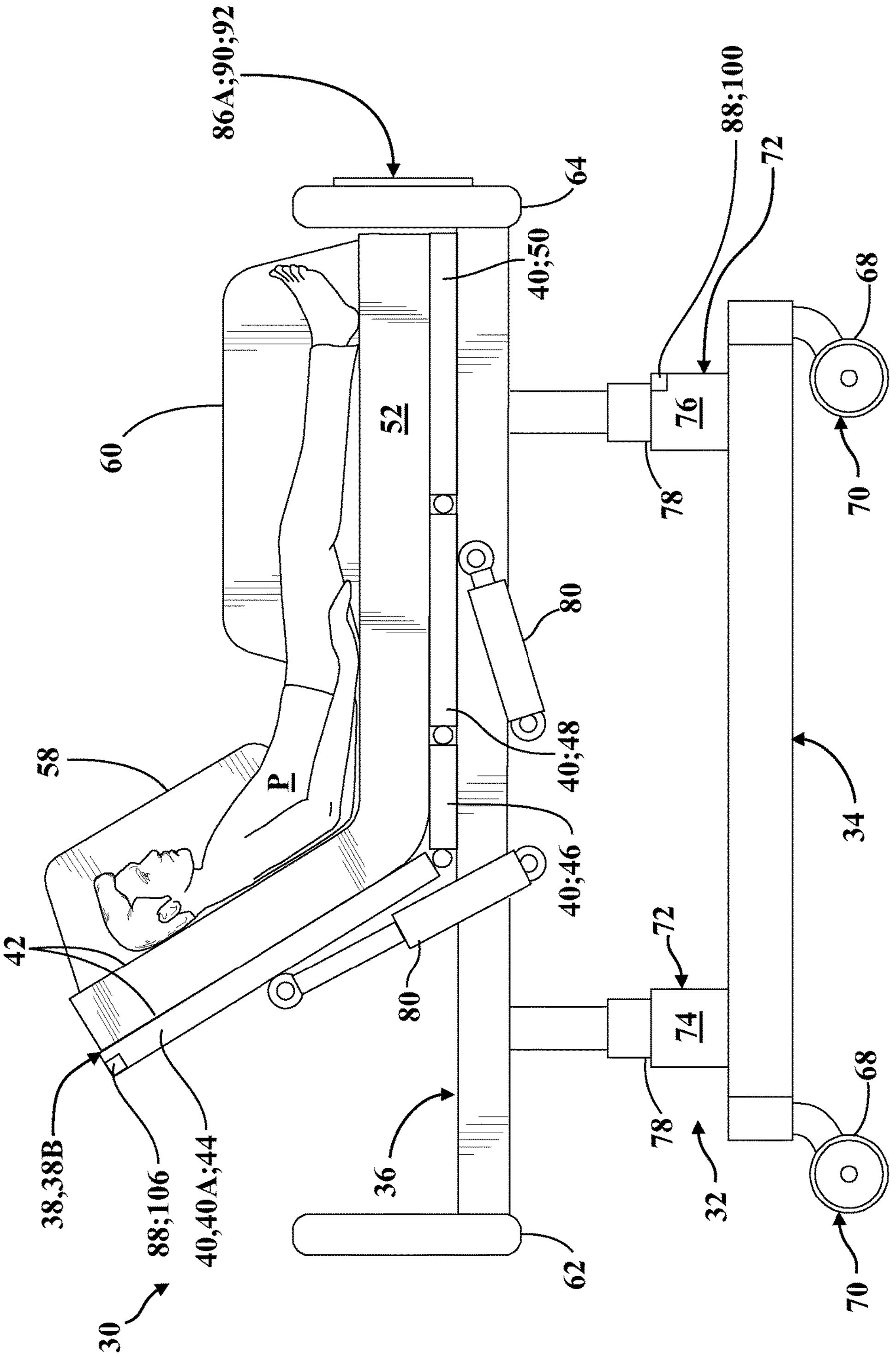
FIG. 10A is a partial right-side view of the patient support apparatus of FIG. 5, shown with the patient support deck arranged in a second vertical configuration relative to the base.
Figure 10B:
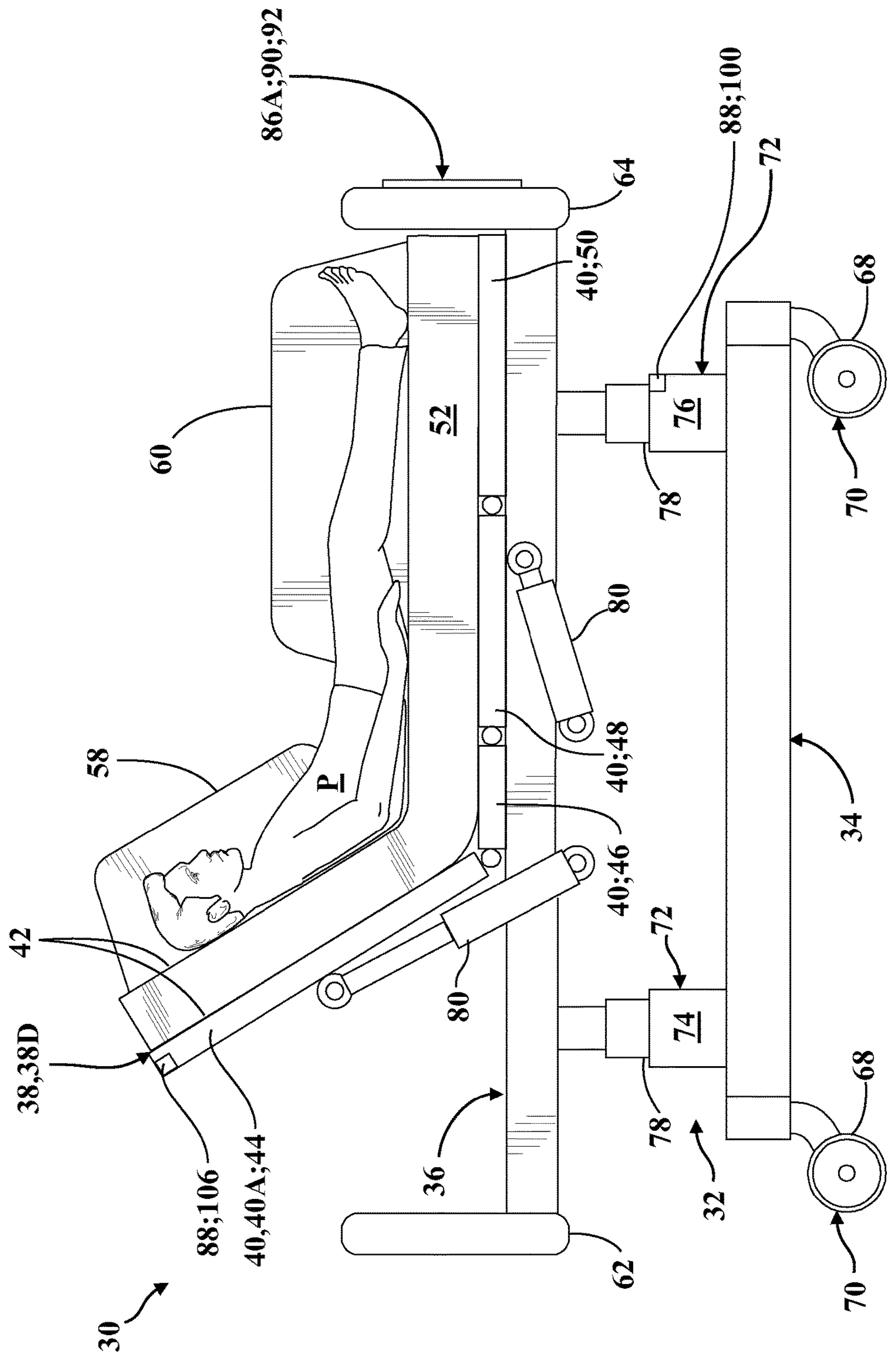
FIG. 10B is another partial right-side view of the patient support apparatus of FIG. 10A, shown with the patient support deck arranged in a second intermediate vertical configuration relative to the base.
Figure 10C:
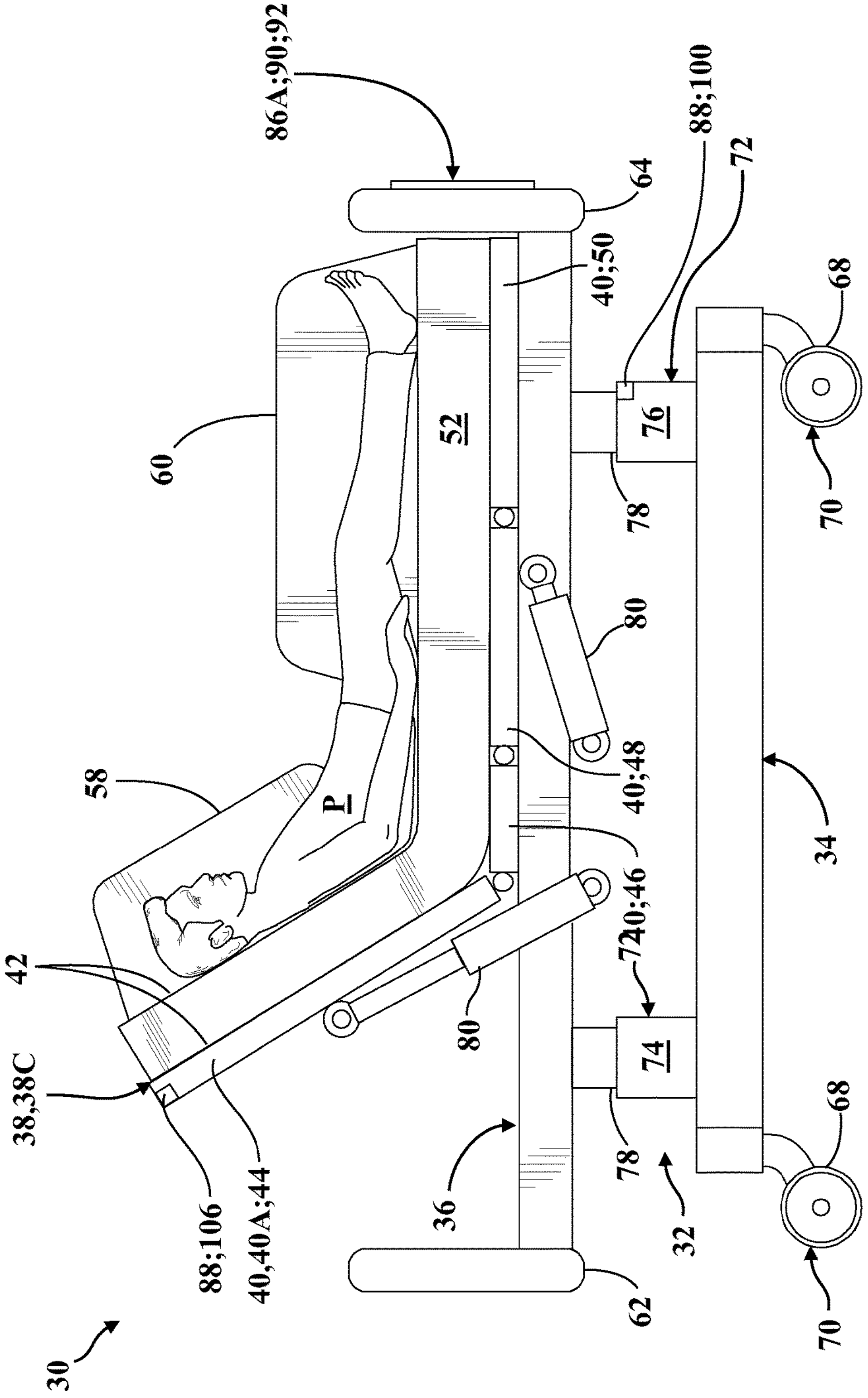
FIG. 10C is another partial right-side view of the patient support apparatus of FIGS. 10A-B, shown with the patient support deck arranged in a first intermediate vertical configuration relative to the base.
Figure 10D:
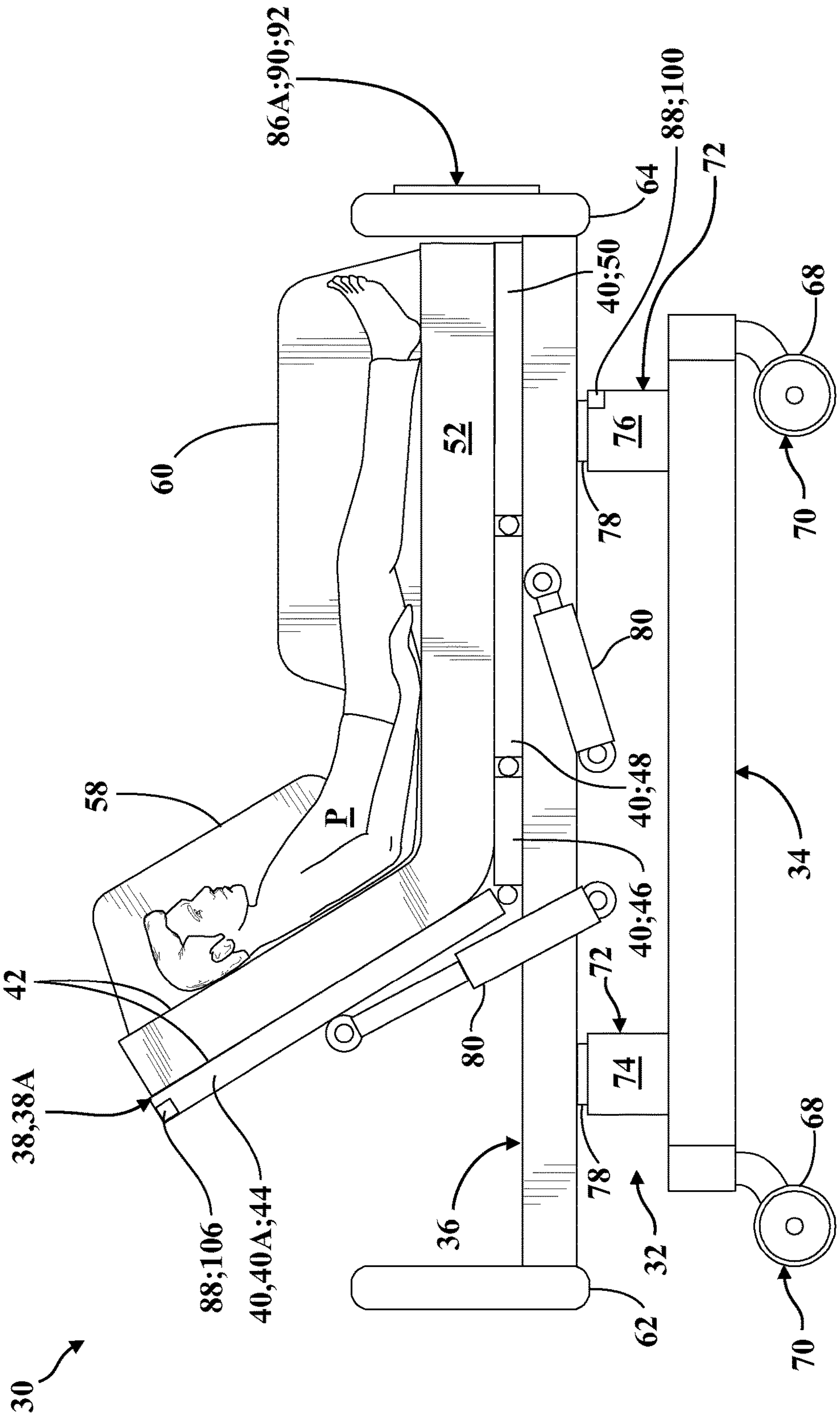
FIG. 10D is another partial right-side view of the patient support apparatus of FIGS. 10A-C, shown with the patient support deck arranged in a first vertical configuration relative to the base.

Referring again to FIGS. 7A-9D, operation of the deck actuator 80 coupled to the deck section 40 (e.g., the back section 44) via the first and second user interfaces 86A, 86B is shown. the controller 84 is also configured to display the second content portion CP2 (defined by the first virtual button 112) on the screen 94 in the first content state CS1 when the lift sensor 100 determines that the patient support deck 38 is in the second vertical configuration 38B (see FIG. 10A), and to display the second content portion CP2 (defined by the first virtual button 112) on the screen 94 in the second content state CS2 when the lift sensor 100 determines that the patient support deck 38 is in the first vertical configuration 38A (see FIG. 10D).

Figure 8A:
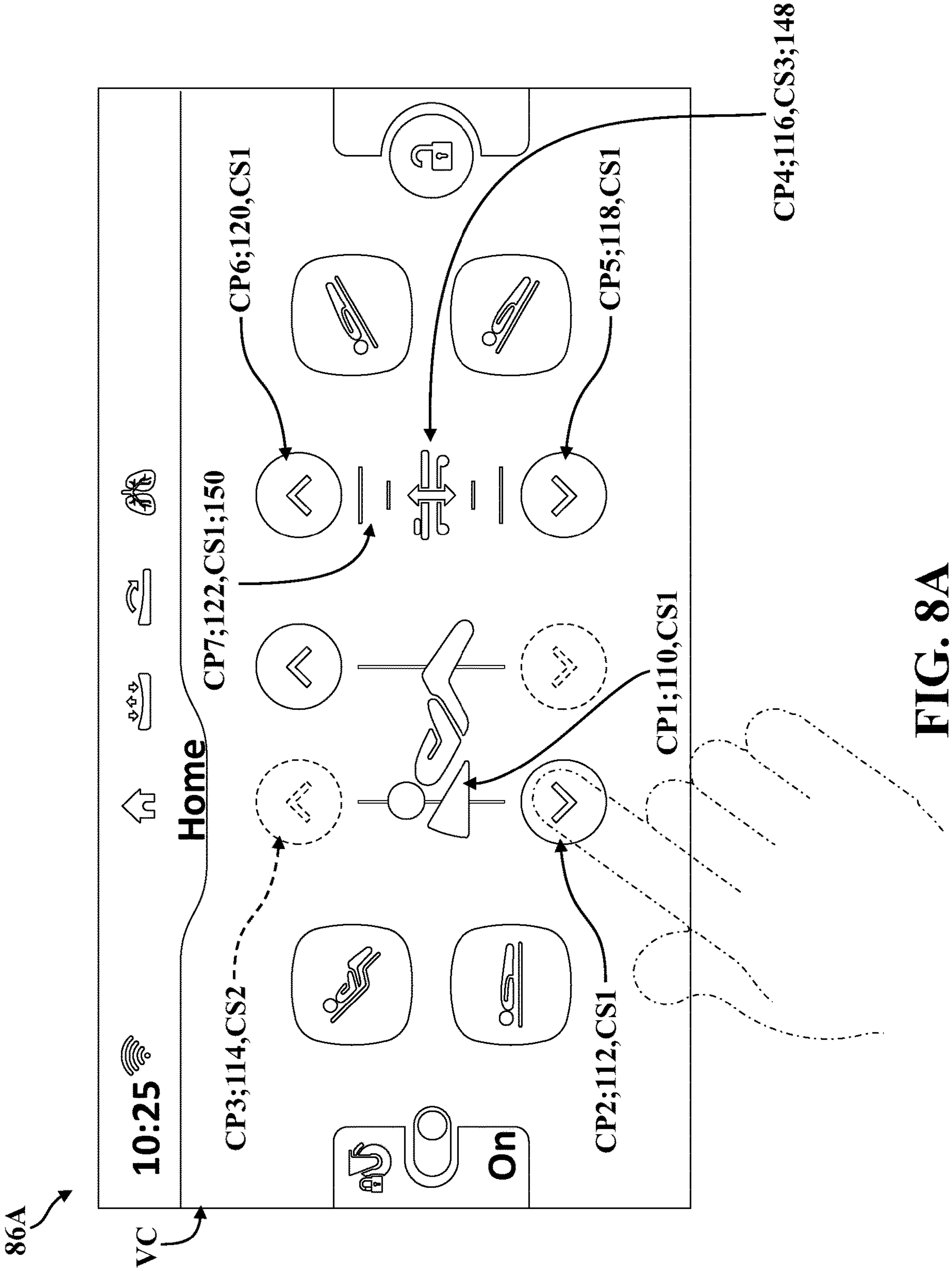
FIG. 8A is a partial plan view of the first user interface of the patient support apparatus of FIG. 5, shown depicting a screen displaying visual content with content portions shown in content states corresponding to the configuration of the patient support apparatus as depicted in FIG. 7A, and with the visual content including a virtual button shown in a button enabled state being engaged by a user.

FIG. 7A shows the deck section 40 arranged in the first section position 40A, FIG. 8A shows the first virtual button 112 about to be engaged by the user, and FIG. 9A shows the first button 126 about to be engaged by the user. In FIG. 8A, the first virtual button 112 serves as the second content portion CP2 and is shown displayed on the screen 94 in the first content state CS1 (e.g., the button enabled state CS1) to indicated that it is available for engagement. Here, the second virtual button 114 serves as the third content portion CP3 and is shown displayed on the screen in the second content state CS2 (e.g., the button disabled state CS2) to indicated that it is not available for engagement. In FIG. 9A, the first button 126 serves as the second panel portion PP2 and is shown illuminated by the second light module 136 controlled in the first illumination state IS1 (e.g., the illumination enabled state IS1) to indicated that it is available for engagement. Here, the second button 128 serves as the third panel position PP3 and is shown not illuminated, with the third light module 138 controlled in the second illumination state IS2 (e.g., the illumination disabled state IS2) to indicate that it is not available for engagement.

FIG. 7B shows the deck section 40 arranged in the intermediate section position 40C after having been moved away from the first section position 40A (see FIG. 7A) via the deck actuator 80 driven by the controller 84 in response to receiving the first input signal ISA generated by user engagement with either the first virtual button 112 or the first button 126. FIG. 8B shows the user engaging the first virtual button 112 (which is shown in the button enabled state CS1) to continue to move the deck section 40 toward the second section position 40B. Here, the second virtual button 114 is also shown in the button enabled state CS1 to indicate that it is available for engagement if desired. FIG. 9B shows the user engaging the first button 126 (which is shown with the second light module 136 in the illumination enabled state IS1) to continue to move the deck section 40 toward the second section position 40B. Here, the second button 128 is also shown with the third light module 138 in the illumination enabled state IS1 to indicate that it is available for engagement if desired.

Figure 8C:
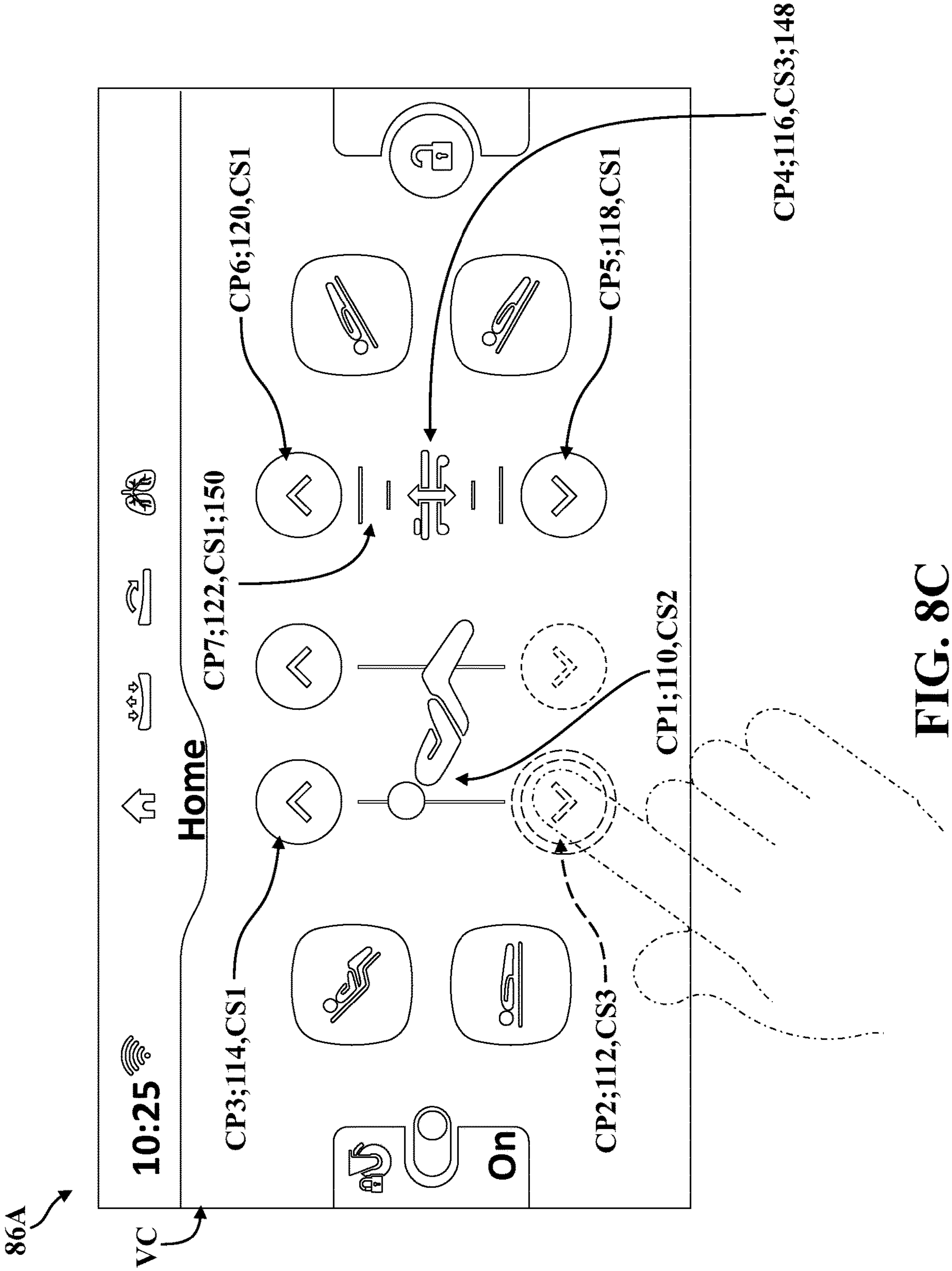
FIG. 8C is another partial plan view of the first user interface of FIGS. 8A-8B, with the content portions shown in content states corresponding to the configuration of the patient support apparatus as depicted in FIG. 7C, and with the button shown in a button feedback state being engaged by the user.

FIG. 7C shows the deck section 40 arranged in the second section position 40B after having been moved away from the intermediate section position 40C (see FIG. 7B) via the deck actuator 80 driven by the controller 84 in response to receiving the first input signal ISA generated by user engagement with either the first virtual button 112 or the first button 126. FIG. 8C shows the user continuing to engage the first virtual button 112. Here, the second content portion CP2 that defines the first virtual button 112 is displayed on the screen 94 in a third content state CS3, which may be further defined as a button feedback state CS3 that is different from the button enabled state CS1 and the button disabled state CS2. Similarly, FIG. 9C shows the user continuing to engage the first button 126, and the second light module 136 is controlled in a third illumination state IS3, which may be further defined as a feedback illumination state IS3. Here, the controller 84 is configured to display the first virtual button 112 in the button feedback state CS3 and to control the second light module 136 in the feedback illumination state IS3 in response to receiving the first input signal ISA when the deck sensor 106 determines that the deck section 40 is in the second section position 40B.

Put differently, the button feedback state CS3 and the feedback illumination state IS3 are intended to alert the user that continued engagement with the first virtual button 112 or the first button 126 will not result in further movement because the deck actuator 80 is at "end of stroke" or has otherwise moved the deck section 40 fully to the second section position 40B. As will be appreciated from the subsequent description below, depending on the specific configuration of the virtual buttons of the first user interface 86A and/or the buttons of the second user interface 86B, the user's finger may conceal or otherwise make differentiating between the button enabled and disabled states CS1, CS2 and/or the illumination enabled and disabled states IS1, IS2 difficult during continued engagement. Accordingly, the button feedback state CS3 and the feedback illumination state IS3 are each intended to draw the user's attention during continued engagement. To this end, the button feedback state CS3 may be a graphic that appears larger, in a different color, and the like when compared to the button enabled and disabled states CS1, CS2. In some embodiments, the button feedback state CS3 may comprise an animation, such as an icon, graphic, or symbol that moves, grows and shrinks, or otherwise changes during continued user engagement. Similarly, the feedback illumination state IS3 may be brighter, in a different color, and the like when compared to the illumination enabled and disabled states IS1, IS2. In the illustrated embodiment, the feedback illumination state IS3 is similarly intended to draw the user's attention during continued engagement by increasing the brightness of light emission. While illustrated and described herein in connection with the first virtual button 112 and the first button 126 that each serve as "fowler down buttons," it will be appreciated that any of the virtual buttons could utilize a button feedback state CS3, and any of the light modules associated with buttons could utilize a feedback illumination state IS3 to communicate to the user that continued engagement will not result in further actuation, movement, and the like.

Figure 8D:
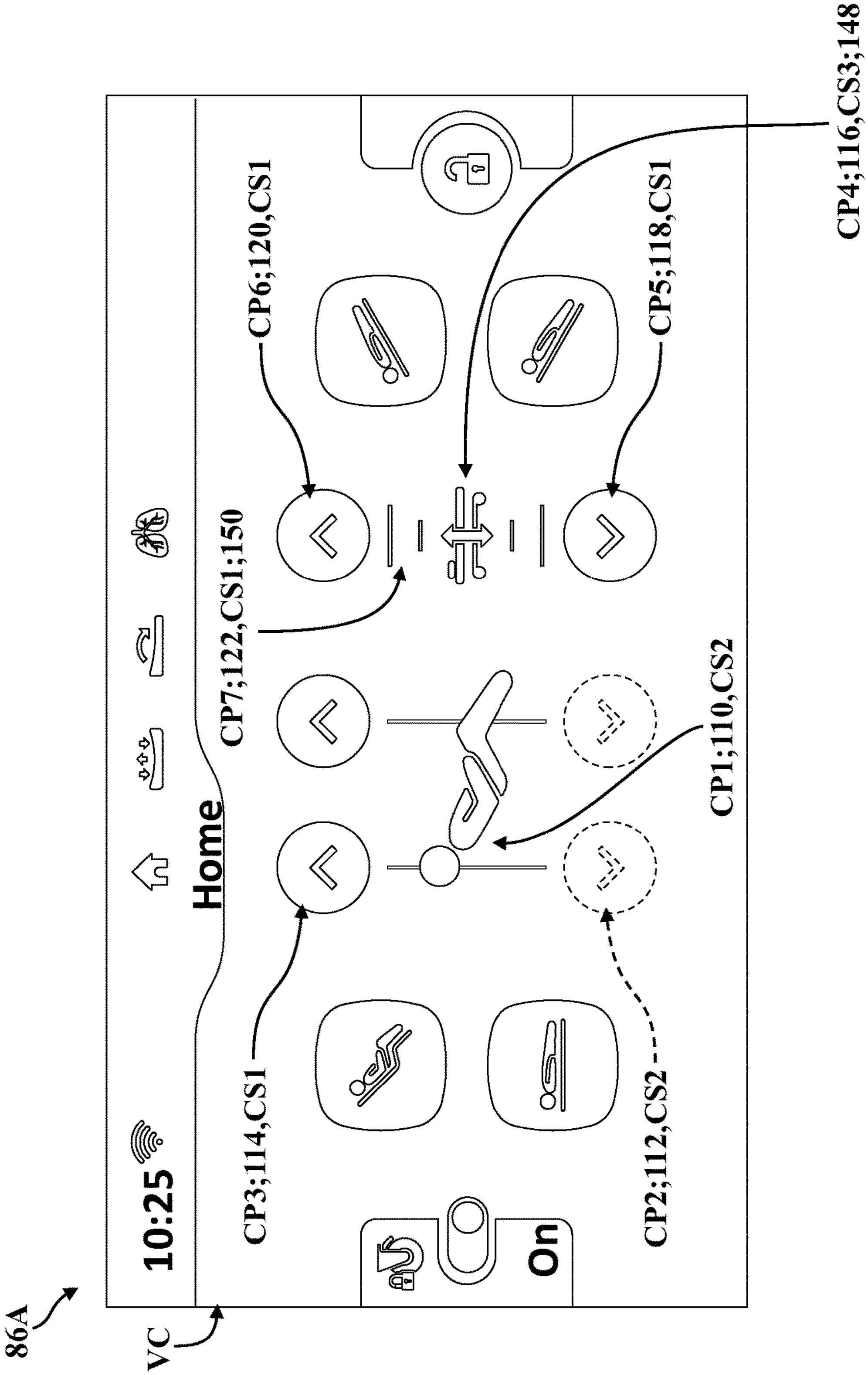
FIG. 8D is another partial plan view of the first user interface of FIGS. 8A-8C, with the content portions shown in content states corresponding to the configuration of the patient support apparatus as depicted in FIG. 7C.

As noted above, FIG. 7C shows the deck section 40 arranged in the second section position 40B after having been moved away from the intermediate section position 40C (see FIG. 7B) via the deck actuator 80 driven by the controller 84 in response to receiving the first input signal ISA generated by user engagement with either the first virtual button 112 or the first button 126. FIG. 8D shows the first user interface 86A after the user has disengaged the first virtual button 112 (e.g., in response to observing the feedback content state CS3 described above). Here, the second content portion CP2 that defines the first virtual button 112 is displayed on the screen 94 in the button disabled state CS2, with the first virtual button 112 "greyed-out" to indicate that the deck section 40 is in the second section position 40B and cannot be lowered further, and that the first virtual button 112 is not otherwise available for engagement. Similarly, FIG. 9D shows the second user interface 86B after the user has disengaged the first button 126 (e.g., in response to observing the illumination feedback state IS3 described above). Here, the first button 126 that serves as the second panel portion PP2 is not illuminated because the second light module 136 is controlled in the illumination disabled state IS2 to indicated that the first button 126 is not otherwise available for engagement.

While the controller 84 is configured to facilitate changing certain aspects of the first and second user interfaces 86A, 86B simultaneously in some embodiments (e.g., simultaneously displaying the first virtual icon 110 on the screen 94 of the first user interface 86A and illuminating the first symbol 124 of the second user interface 86B when the deck sensor 106 determines that the deck section 40 is in the intermediate section position 40C), it will be appreciated that in other embodiments certain aspects may not change simultaneously and/or in the same way, and/or may only change on the user interface 86A, 86B that is actually using. By way of non-limiting example, the controller 84 could be configured in certain embodiments to display the first virtual button 112 in the button feedback state CS3 during continued user engagement when the deck sensor 106 determines that the deck actuator 80 is at "end of stroke" or has otherwise moved the deck section 40 fully to the second section position 40B, and controlling the second light module 136 in the illumination disabled state IS2 to indicated that the first button 126 is not otherwise available for engagement (e.g., as opposed to also controlling the second light module 136 in the feedback illumination state IS3). Other configurations are contemplated.

Referring now to FIGS. 10A-12E, operation of the one or more lift actuators 78 of the lift mechanism 72 via the first and second user interfaces 86A, 86B is shown. Here, FIG. 10A shows the patient support deck 38 arranged in the second vertical configuration 38B, FIG. 11A shows the third virtual button 118 about to be engaged by the user, and FIG. 12A shows the third button 130 about to be engaged by the user. In FIG. 11A, the third virtual button 118 serves as the fifth content portion CP5 and is shown displayed on the screen 94 in the first content state CS1 (e.g., the button enabled state CS1) to indicated that it is available for engagement. Here, the fourth virtual button 120 serves as the sixth content portion CP6 and is shown displayed on the screen in the second content state CS2 (e.g., the button disabled state CS2) to indicated that it is not available for engagement. In FIG. 12A, the third button 130 serves as the fourth panel portion PP4 and is shown illuminated by the fourth light module 140 controlled in the first illumination state IS1 (e.g., the illumination enabled state IS1) to indicated that it is available for engagement. Here, the fourth button 132 serves as the fifth panel position PP5 and is shown not illuminated, with the fifth light module 142 controlled in the second illumination state IS2 (e.g., the illumination disabled state IS2) to indicate that it is not available for engagement.

FIG. 10B shows the patient support deck 38 arranged in the second intermediate vertical configuration 38D after having been moved away from the second vertical configuration 38B (see FIG. 10A) via the one or more lift actuators 78 driven by the controller 84 in response to receiving the third input signal ISC generated by user engagement with either the third virtual button 118 or the third button 130. FIG. 11B shows the user engaging the third virtual button 118 (which is shown in the button enabled state CS1) to continue to move the patient support deck 38 toward the first vertical configuration 38A. Here, the fourth virtual button 120 is also shown in the button enabled state CS1 to indicate that it is available for engagement if desired. FIG. 12B shows the user engaging the third button 130 (which is shown with the fourth light module 140 in the illumination enabled state IS1) to continue to move the patient support deck 38 toward the first vertical configuration 38A. Here, the fourth button 132 is also shown with the fifth light module 142 in the illumination enabled state IS1 to indicate that it is available for engagement if desired.

FIG. 10C shows the patient support deck 38 arranged in the first intermediate vertical configuration 38C after having been moved away from the second intermediate vertical configuration 38D (see FIG. 10B) via the one or more lift actuators 78 driven by the controller 84 in response to continued receipt of the third input signal ISC generated by user engagement with either the third virtual button 118 or the third button 130. FIG. 11C shows the user still engaging the third virtual button 118 (which is shown in the button enabled state CS1) to continue to move the patient support deck 38 toward the first vertical configuration 38A. Here, the fourth virtual button 120 is also shown in the button enabled state CS1 to indicate that it is available for engagement if desired. FIG. 12B shows the user still engaging the third button 130 (which is shown with the fourth light module 140 in the illumination enabled state IS1) to continue to move the patient support deck 38 toward the first vertical configuration 38A. Here, the fourth button 132 is also shown with the fifth light module 142 in the illumination enabled state IS1 to indicate that it is available for engagement if desired.

Figure 11D:
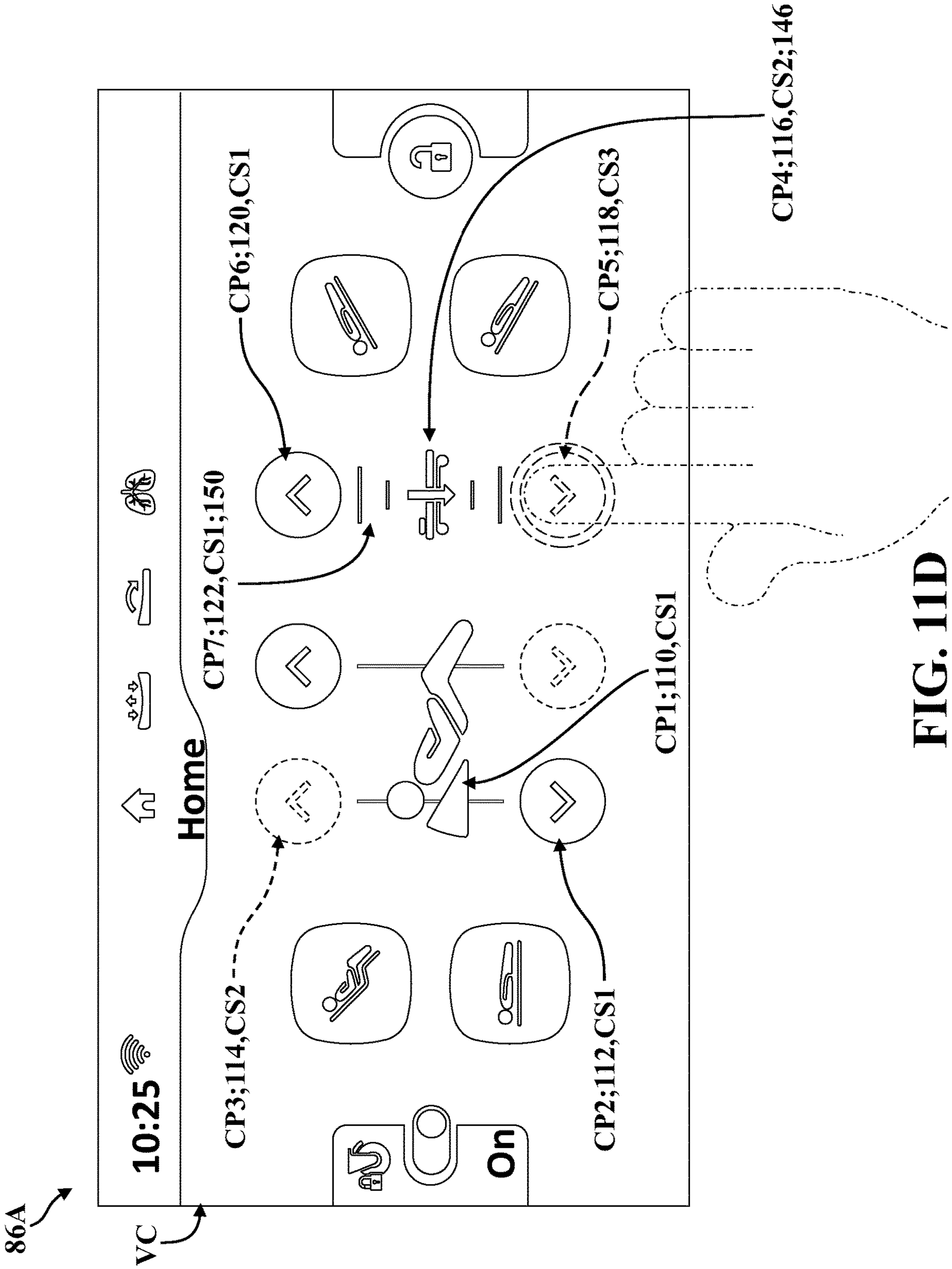
FIG. 11D is another partial plan view of the first user interface of FIGS. 11A-11C, with the content portions shown in content states corresponding to the configuration of the patient support apparatus as depicted in FIG. 10D, and with the button shown in a button feedback state being engaged by the user.
Figure 12A:
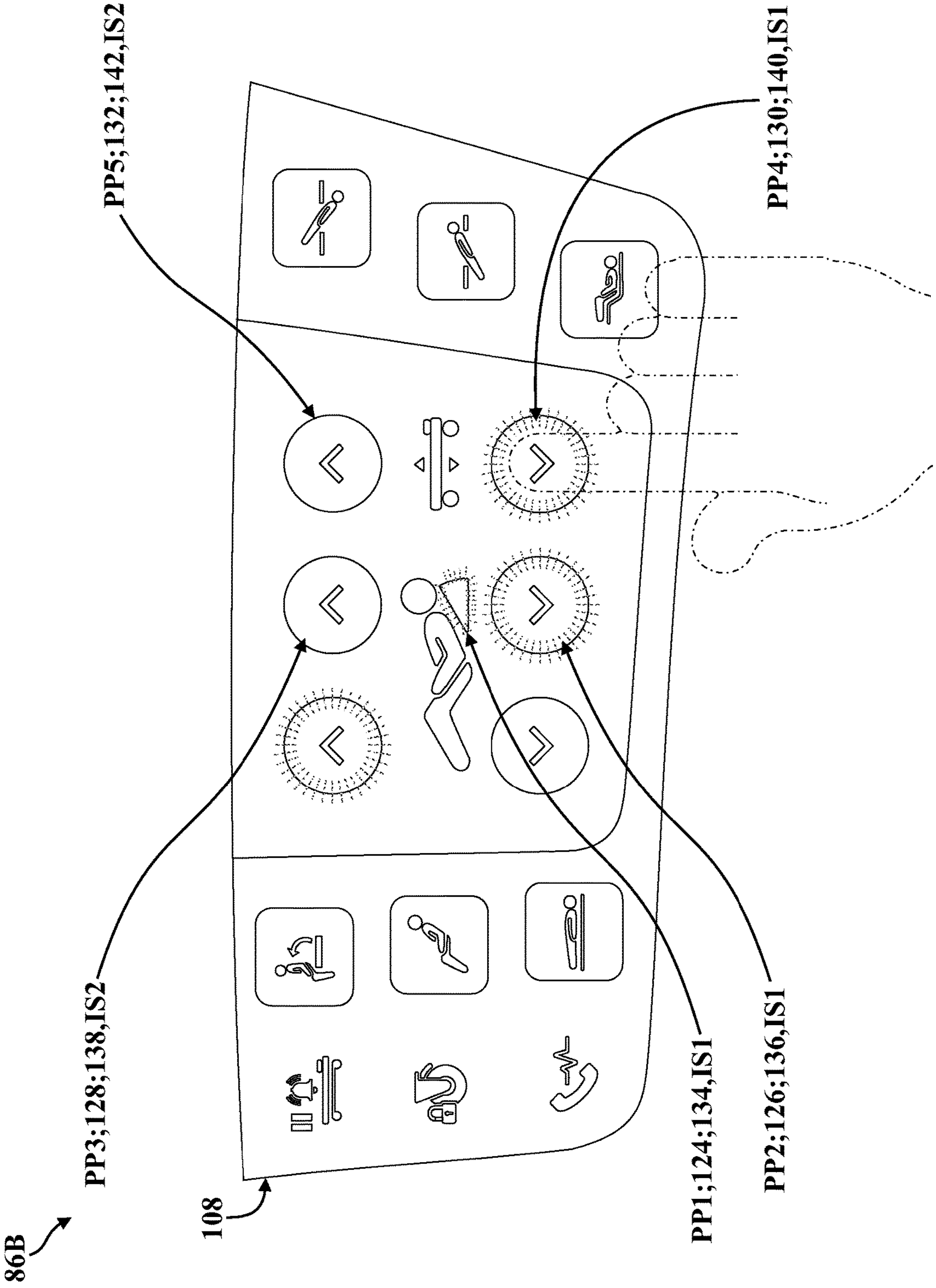
FIG. 12A is a partial plan view of the second user interface of the patient support apparatus of FIGS. 5 and 10A-10D, shown depicting an access panel having panel portions with buttons and light modules shown in illumination states corresponding to the configuration of the patient support apparatus as depicted in FIG. 10A, and with a button being engaged by a user shown adjacent to a light module operating in a first illumination state.
Figure 12B:
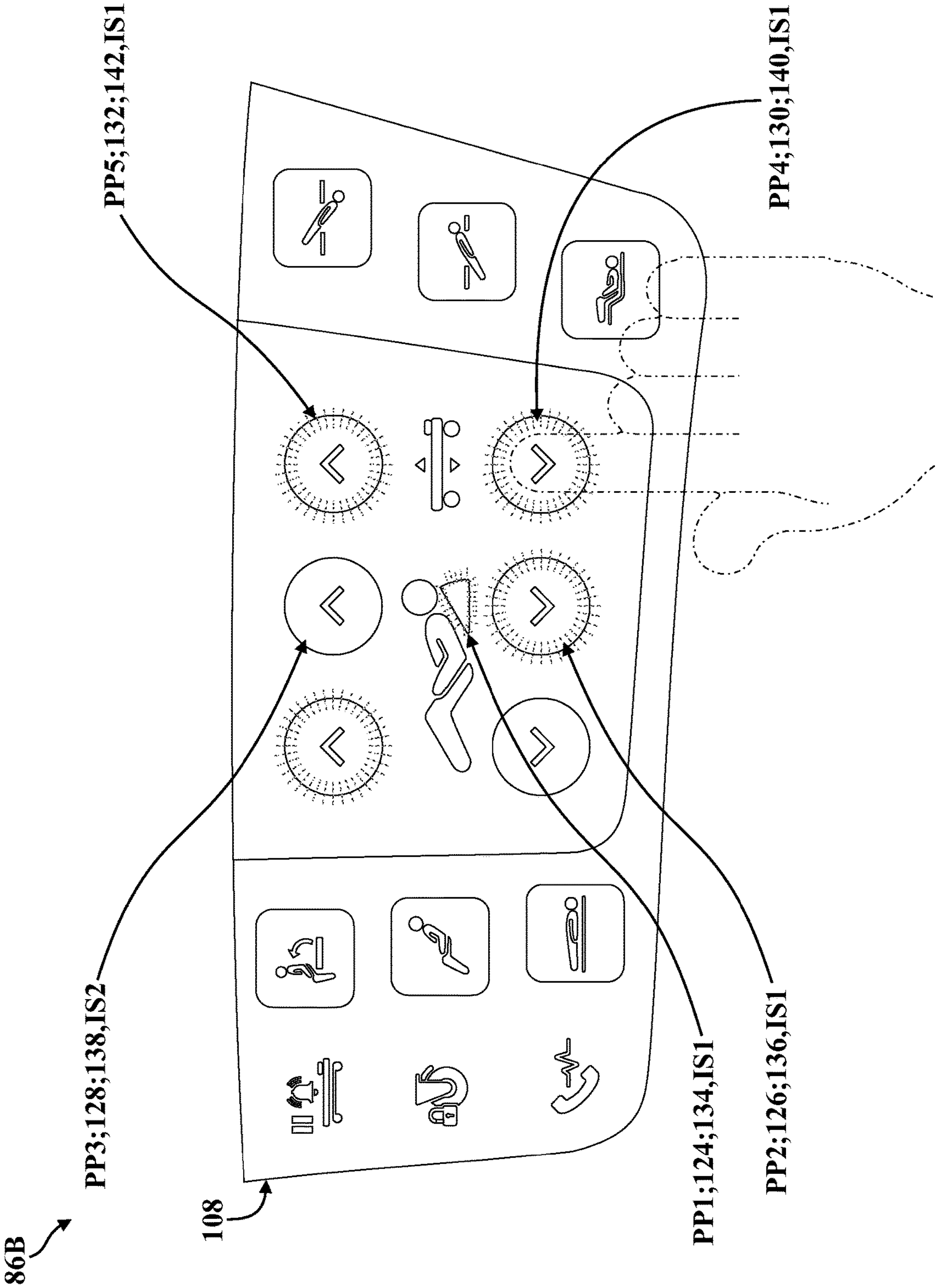
FIG. 12B is another partial plan view of the second user interface of FIG. 12A, with the light modules shown in illumination states corresponding to the configuration of the patient support apparatus as depicted in FIG. 10B, and with the button being engaged by the user shown adjacent to the light module operating in the first illumination state.
Figure 12C:
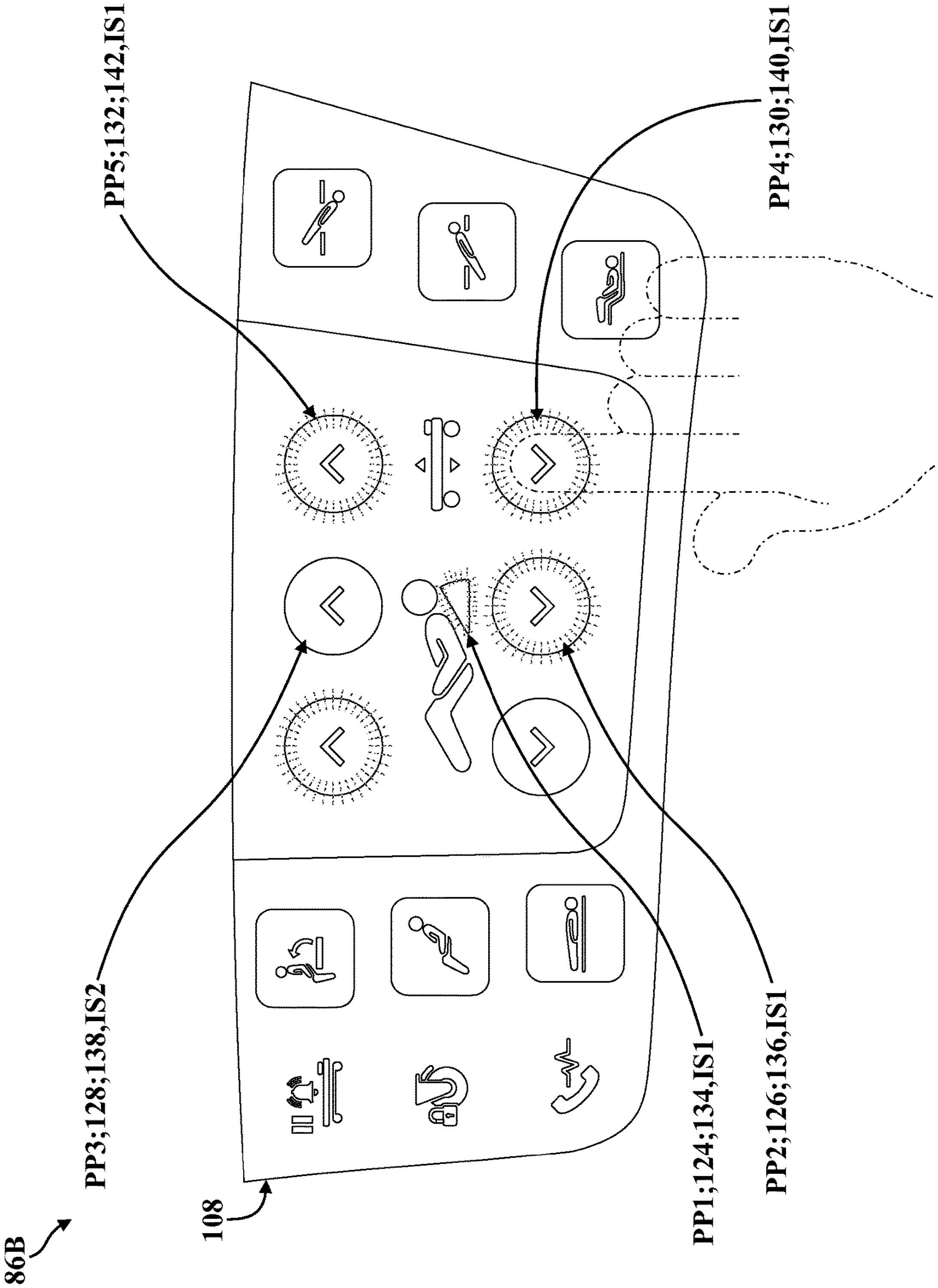
FIG. 12C is another partial plan view of the second user interface of FIGS. 12A-12B, with the light modules shown in illumination states corresponding to the configuration of the patient support apparatus as depicted in FIG. 10C, and with the button being engaged by the user shown adjacent to the light module operating in the first illumination state.
Figure 12D:
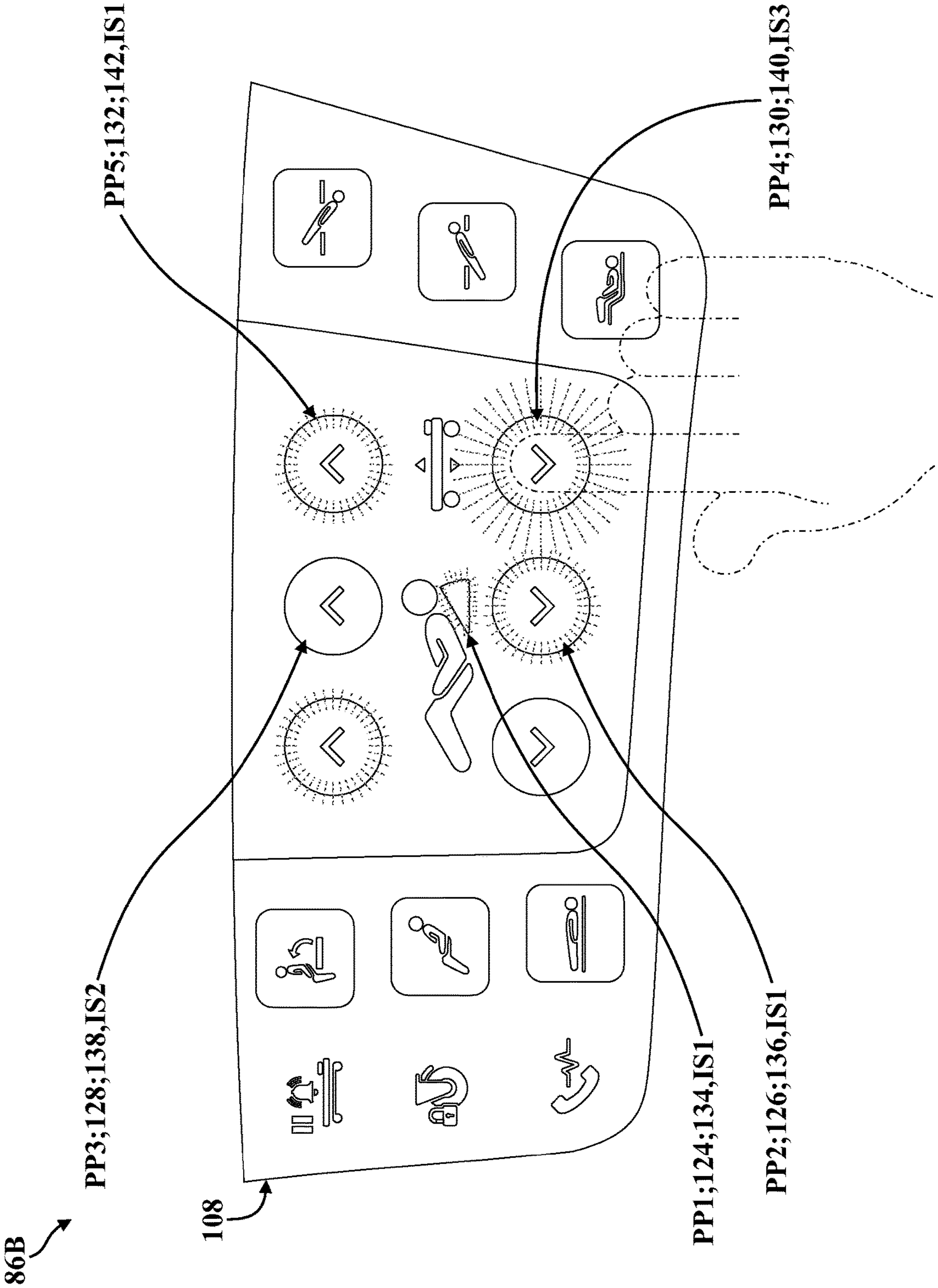
FIG. 12D is another partial plan view of the second user interface of FIGS. 12A-12C, with the light modules shown in illumination states corresponding to the configuration of the patient support apparatus as depicted in FIG. 10D, and with the button being engaged by the user shown adjacent to the light module operating in a third illumination state.

FIG. 10D shows the patient support deck 38 arranged in the first vertical configuration 38A after having been moved away from the first intermediate vertical configuration 38C (see FIG. 10C) via the one or more lift actuators 78 driven by the controller 84 in response to receiving the third input signal ISC generated by user engagement with either the third virtual button 118 or the third button 130. FIG. 11D shows the user continuing to engage the third virtual button 118. Here, the fifth content portion CP5 that defines the third virtual button 118 is displayed on the screen 94 in the third content state CS3 (e.g., the button feedback state CS3). Similarly, FIG. 12D shows the user continuing to engage the third button 130, and the fourth light module 140 is controlled in the third illumination state IS3 (e.g., the feedback illumination state IS3). Here, the controller 84 is configured to display the third virtual button 118 in the button feedback state CS3 and to control the fourth light module 140 in the feedback illumination state IS3 in response to receiving the third input signal ISC when the lift sensor 100 determines that the patient support deck 38 is in the first vertical configuration 38A. Put differently, the button feedback state CS3 and the feedback illumination state IS3 are intended to alert the user that continued engagement with the third virtual button 118 or the third button 130 will not result in further movement because the one or more lift actuators 78 is at "end of stroke" or has otherwise moved the patient support deck 38 fully to the first vertical configuration 38A.

Figure 11E:
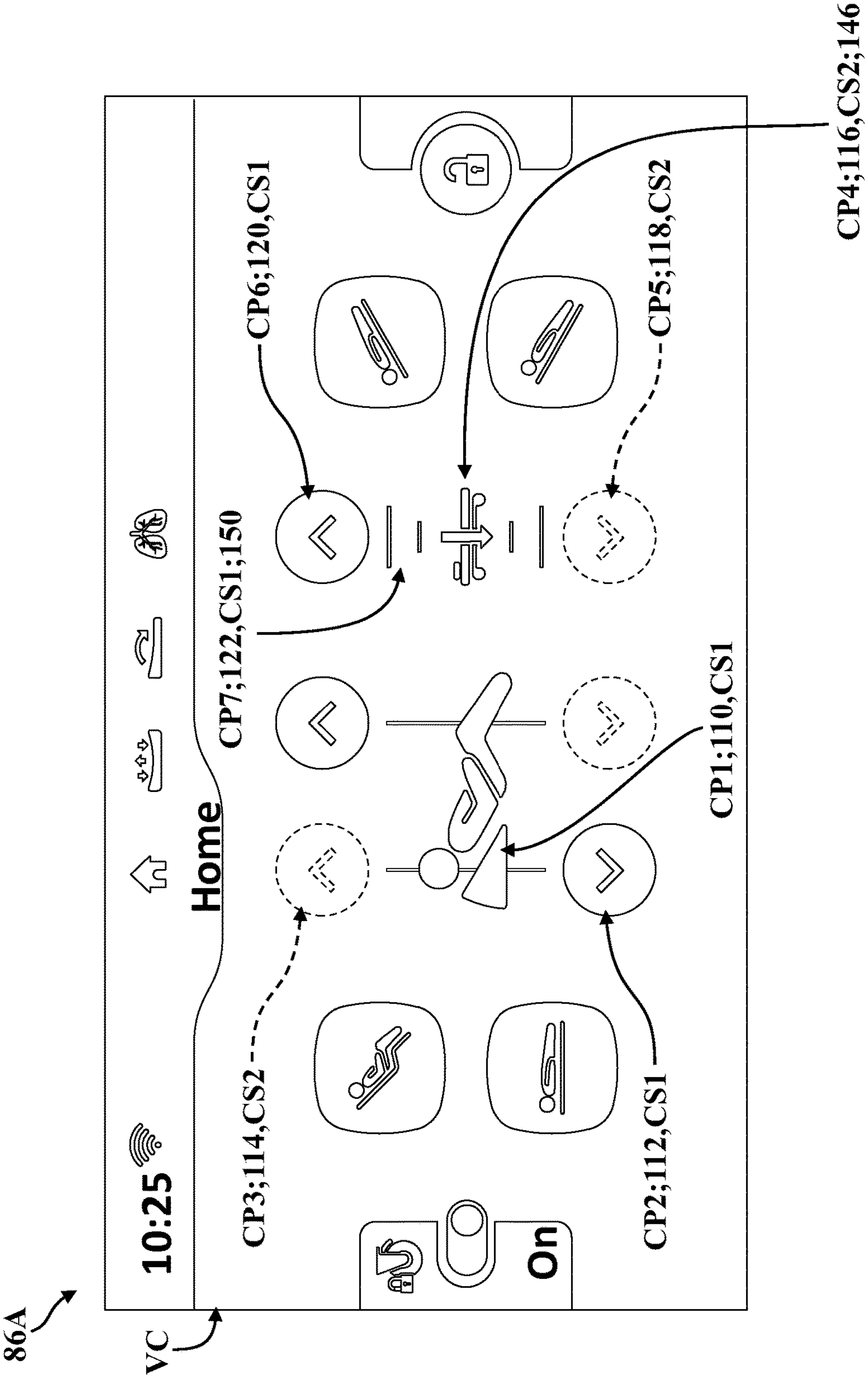
FIG. 11E is another partial plan view of the first user interface of FIGS. 11A-11D, with the content portions shown in content states corresponding to the configuration of the patient support apparatus as depicted in FIG. 10D, and with the button shown in a button feedback state being engaged by the user.
Figure 12E:
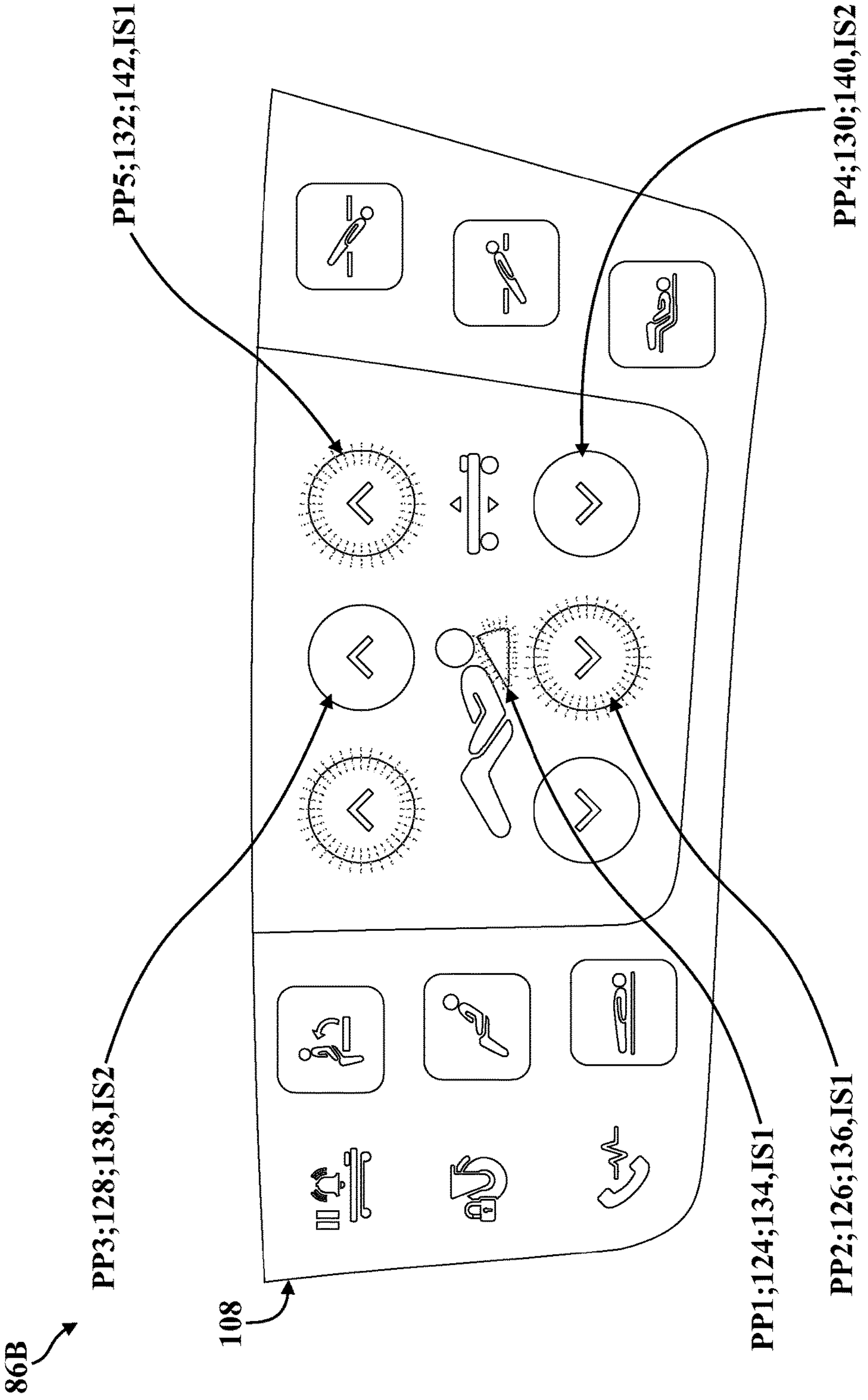
FIG. 12E is another partial plan view of the second user interface of FIGS. 12A-12D, with the light modules shown in illumination states corresponding to the configuration of the patient support apparatus as depicted in FIG. 10D, and with the button being engaged by the user shown adjacent to the light module operating in a second illumination state.

As noted above, FIG. 10D shows the patient support deck 38 arranged in the first vertical configuration 38A after having been moved away from the first intermediate vertical configuration 38C (see FIG. 10C) via the one or more lift actuators 78 driven by the controller 84 in response to receiving the third input signal ISC generated by user engagement with either the third virtual button 118 or the third button 130. FIG. 11E shows the first user interface 86A after the user has disengaged the third virtual button 118 (e.g., in response to observing the feedback content state CS3 described above). Here, the fifth content portion CP5 that defines the third virtual button 118 is displayed on the screen 94 in the button disabled state CS2, with the third virtual button 118 "greyed-out" to indicate that the patient support deck 38 is in the first vertical configuration 38A and cannot be lowered further, and that the third virtual button 118 is not otherwise available for engagement. Similarly, FIG. 12E shows the second user interface 86B after the user has disengaged the third button 130 (e.g., in response to observing the illumination feedback state IS3 described above). Here, the third button 130 that serves as the fourth panel portion PP4 is not illuminated because the fourth light module 140 is controlled in the illumination disabled state IS2 to indicated that the third button 130 is not otherwise available for engagement.

Referring now to FIGS. 10A-11E, in the illustrated embodiment, the controller 84 is configured to display the fourth content portion CP4 (defined by the second virtual icon 116) on the screen 94 in the first content state CS1 when the lift sensor 100 determines that the patient support deck 38 is in the second vertical configuration 38B (see FIG. 10A), and to display the fourth content portion CP4 (defined by the second virtual icon 116) on the screen 94 in the second content state CS2 when the lift sensor 100 determines that the patient support deck 38 is in the first vertical configuration 38A (see FIG. 10D). Furthermore, the controller 84 is also configured to display the fourth content portion CP4 (defined by the second virtual icon 116) on the screen 94 in the third content state CS3 when the lift sensor 100 determines that the patient support deck 38 is between (but not in) the first and second vertical configurations 38A, 38B, such as in or between either of the first and second intermediate vertical configurations 38C, 38D (see FIGS. 10B-10C).

In the illustrated embodiment, the fourth content portion CP4 defined by the second virtual icon 116 comprises a first deck icon 144 that is displayed on the screen 94 in the first content state CS1 (see FIG. 11A) to indicate that the patient support deck 38 is in the second vertical configuration 38B (see FIG. 10A). In addition, the fourth content portion CP4 defined by the second virtual icon 116 comprises a second deck icon 146 that is displayed on the screen 94 in the second content state CS2 (see FIGS. 11D-11E) to indicate that the patient support deck 38 is in the first vertical configuration 38A (see FIG. 10D). Moreover, the fourth content portion CP4 defined by the second virtual icon 116 comprises a third deck icon 148 that is displayed on the screen 94 in the third content state CS3 (see FIGS. 11B-11C) to indicate that the patient support deck 38 is in one or more of the intermediate vertical configurations 38C, 38D (see FIGS. 10B-10C), or is otherwise between (but not in) the first and second vertical configurations 38A, 38B.

The first, second, and third deck icons 144, 146, 146 are each different from one another and, in the illustrated embodiment, comprise graphics that represent, suggest, or otherwise indicate respective positions of the patient support deck 38 relative to the base 34. Here, the first deck icon 144 is associated with the second vertical configuration 38B (see FIG. 10A) and comprises a graphic representing a “bed fully raised” condition. Conversely, the second deck icon 146 is associated with the first vertical configuration 38A (see FIG. 10D) and comprises a graphic representing a “bed fully lowered” (or a “low height mode”) condition. Further, the third deck icon 148 is associated with intermediate vertical configurations (e.g., the first and second intermediate vertical configurations 38C, 38D) and comprises a graphic representing a “bed partially raised” (or a “bed partially lowered”) condition. Depending on the specific configuration of the patient support apparatus 30, the first vertical configuration 38A (see FIG. 10D) that represents the “bed fully lowered” condition in the illustrated embodiment may place the patient support deck 38 in such close proximity to the floor that patient egress could potentially become difficult in certain scenarios (e.g., for relatively tall patients). Here, it is contemplated that one or more relatively “low” intermediate vertical configurations (e.g., the first intermediate vertical configuration 38C) may be more suitable to facilitate patient egress than the “bed fully lowered” condition defined by the first vertical configuration 38A. Accordingly, in some embodiments, the second deck icon 146 could be associated with a “low height range” of vertical configurations defined, for example, between the first vertical configuration 38A (see FIG. 10D) and one or more relatively “low” intermediate vertical configurations, such as the first intermediate vertical configuration (see FIG. 10C). Put differently, the second deck icon 146 could be used to indicate when the patient support deck 38 is in a “bed fully lowered” condition (e.g., in the first vertical configuration 38A) and/or when the patient support deck 38 is in the “low height range” defined as when the patient support deck 38 is in the “bed fully lowered” condition (e.g., in the first vertical configuration 38A), a “bed at low height threshold” condition (e.g., in the first intermediate vertical configuration 38C), or in the “low height range” between the “bed fully lowered” condition and the “bed at low height threshold” condition (e.g., between the first vertical configuration 38A and the first intermediate vertical configuration 38C). It will be appreciated that the “bed at low height threshold” condition could be defined other than by the first intermediate vertical configuration 38C, and could be predetermined (e.g., based on the specific configuration of the patient support apparatus 30) and/or could be user adjustable (e.g., via one or more settings accessible via the user interface 86). Other configurations are contemplated.

While the first, second, and third deck icons 144, 146, 148 each comprise graphics representing conditions of the patient support apparatus 30 in the illustrated embodiment, it will be appreciated that other types of visual content VC, symbols, icons, text TX, with different or similar colors, scaling, and the like, could be utilized in other embodiments. Furthermore, while the illustrated embodiment employs the controller 84 to change the fourth content portion CP4 between the first, second, and third content states CS1, CS2, CS3 corresponding to the first, second, and third deck icons 148 of the second virtual icon 116 as noted above, it will be appreciated that the third content state CS3 could be omitted for certain applications. In some embodiments, when the controller 84 changes between the first, second, and third deck icons 144, 146, 148 the controller 84 may be configured to “fade out” an icon displayed on the screen 94 (e.g., the first deck icon 144) and/or to “face in” the next icon to be displayed on the screen 94 (e.g., the third deck icon 148). In some embodiments, the controller 84 may be configured to show different graphics, animations, and the like during movement of the one or more lift actuators 78 (e.g., as the user engages the first user interface 86A). Other configurations are contemplated.

With continued reference to FIGS. 10A-11E, in the illustrated embodiment, the controller 84 is configured to display the seventh content portion CP7 (defined by the third virtual icon 122) on the screen 94 in the first content state CS1 during an absence of driving the one or more lift actuators 78, and to display the seventh content portion CP7 (defined by the third virtual icon 122) on the screen 94 in a first loop sequence CS1→CS2→CS3 (defined by the first content state CS1 followed by the second content state CS2 followed by the third content state CS3) while driving the one or more lift actuators 78 to move the patient support deck 38 from and between the vertical configurations 38A, 38B, 38C, 38D. Here, the seventh content portion CP7 defined by the third virtual icon 122 comprises a first animation icon 150 that is displayed on the screen 94 in the first content state CS1 (see FIGS. 11A and 11D-11E). In addition, the seventh content portion CP7 defined by the third virtual icon 122 comprises a second animation icon 152 that is displayed on the screen 94 in the second content state CS2 (see FIG. 11B). Moreover, the seventh content portion CP7 defined by the third virtual icon 122 comprises a third animation icon 154 that is displayed on the screen 94 in the third content state CS3 (see FIG. 11C). It will be appreciated that the controller 84 could be configured to display visual content VC in the first loop sequence CS1→CS2→CS3 any suitable number of times during movement of the patient support deck 38 (e.g., a single time, multiple times in repetition, and the like).

The first, second, and third animation icons 150, 152, 154 are different from each other and are shaped and arranged to simulate movement in a first direction (e.g., downward vertical movement) when the controller 84 displays the seventh content portion CP7 (defined by the third virtual icon 122) on the screen 94 in the first loop sequence CS1→CS2→CS3 during movement of the patient support deck 38 away from the second vertical configuration 38B (see FIG. 10A) and toward the first vertical configuration 38A (see FIG. 10D). Here too, the first, second, and third animation icons 150, 152, 154 are shaped and arranged to simulate movement in a second direction (e.g., upward vertical movement) when the controller 84 displays the seventh content portion CP7 (defined by the third virtual icon 122) on the screen 94 in a second loop sequence CS3→CS2→CS1 (defined by the third content state CS3 followed by the second content state CS2 followed by the first content state CS1) during movement of the patient support deck 38 away from the first vertical configuration 38A (see FIG. 10D) and toward the second vertical configuration 38B (see FIG. 10A). Here too, it will be appreciated that the controller 84 could be configured to display visual content VC in the second loop sequence CS3→CS2→CS1 any suitable number of times during movement of the patient support deck 38 (e.g., a single time, multiple times in repetition, and the like).

Figure 11A:
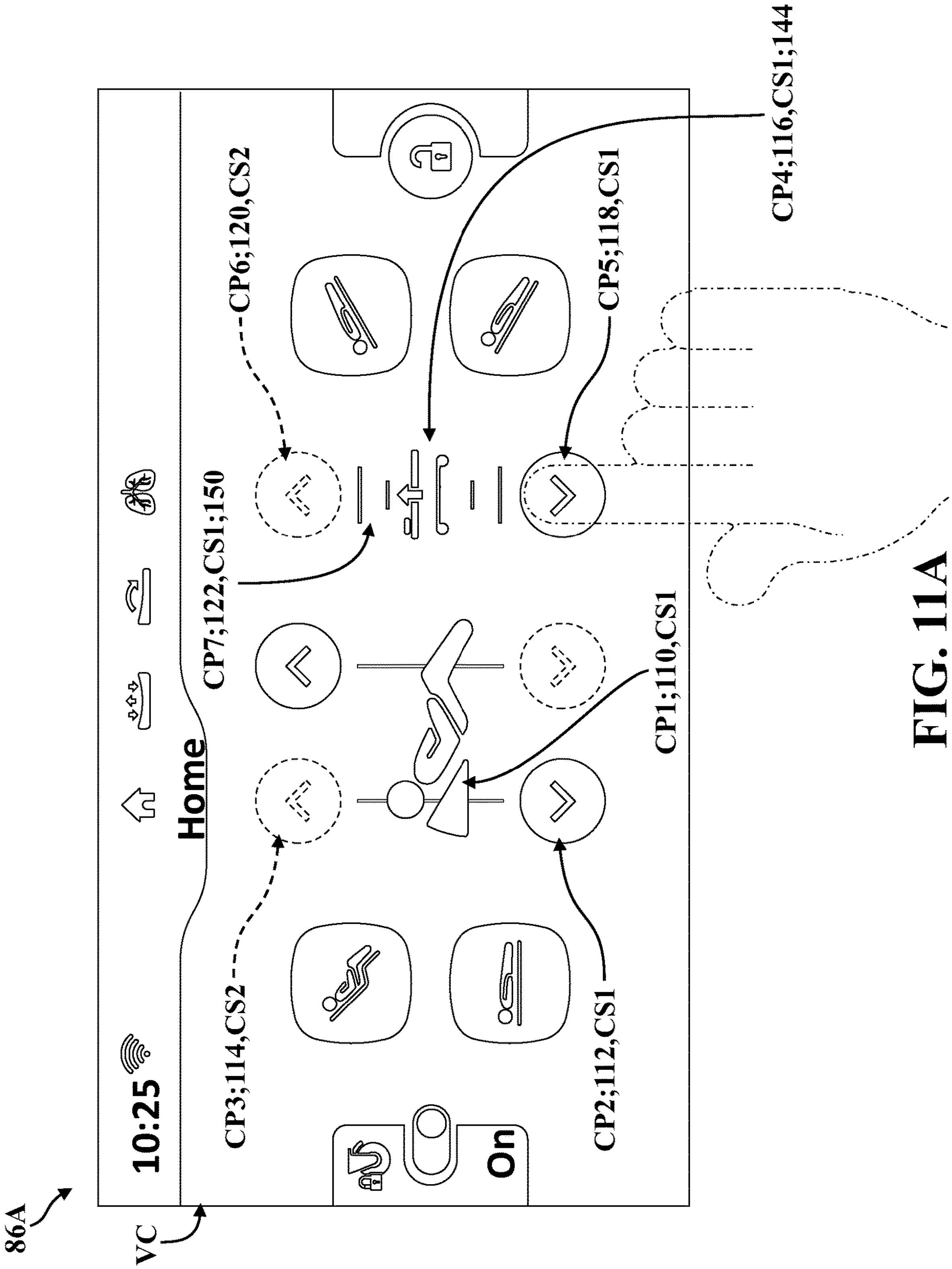
FIG. 11A is a partial plan view of the first user interface of the patient support apparatus of FIGS. 5 and 10A-10D, shown depicting a screen displaying visual content with content portions shown in content states corresponding to the configuration of the patient support apparatus as depicted in FIG. 10A, and with the visual content including a virtual button shown in a button enabled state being engaged by a user.
Figure 11B:
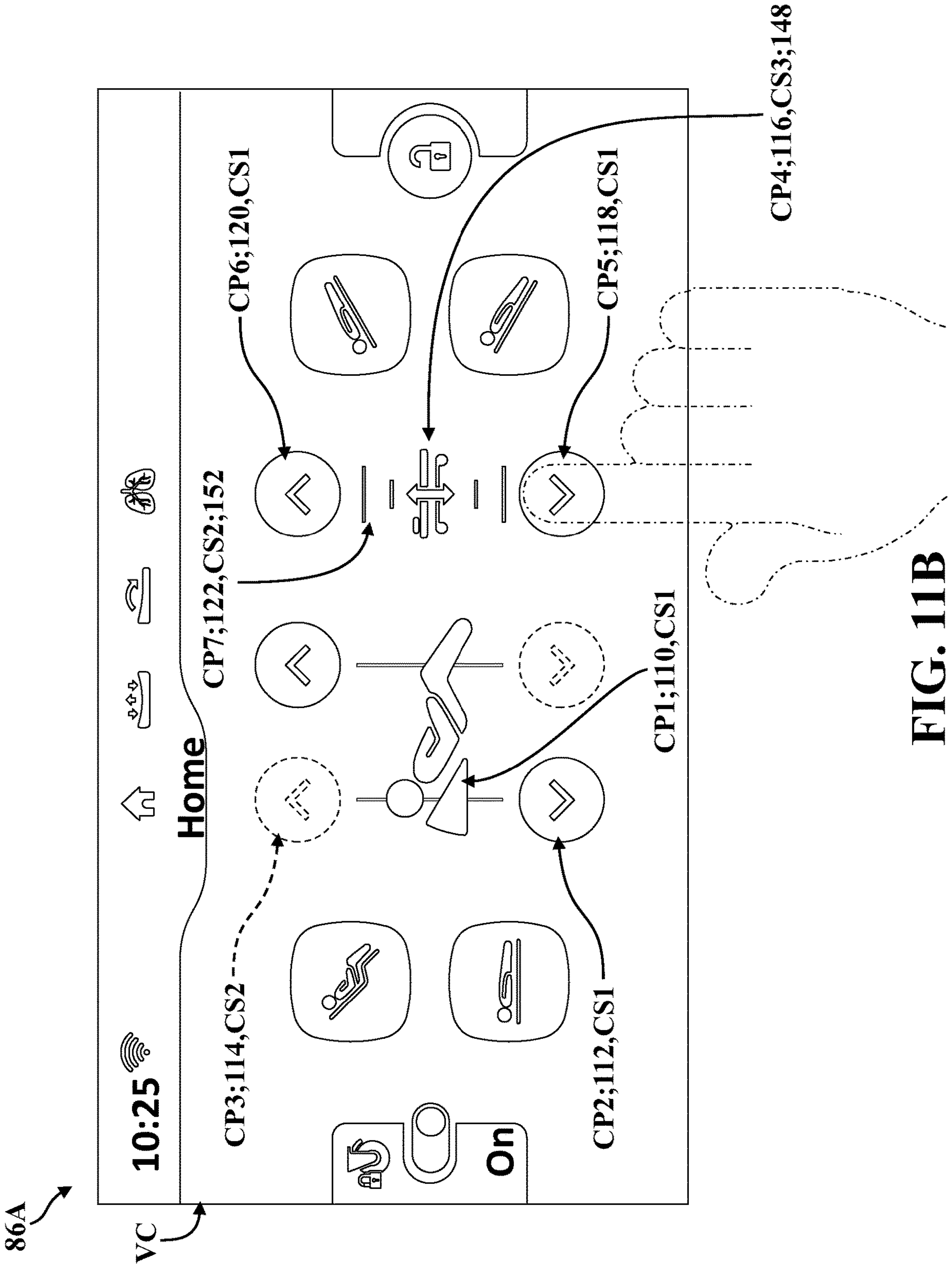
FIG. 11B is another partial plan view of the first user interface of FIG. 11B, with the content portions shown in content states corresponding to the configuration of the patient support apparatus as depicted in FIG. 10B, and with the virtual button shown in the button enabled state being engaged by the user.
Figure 11C:
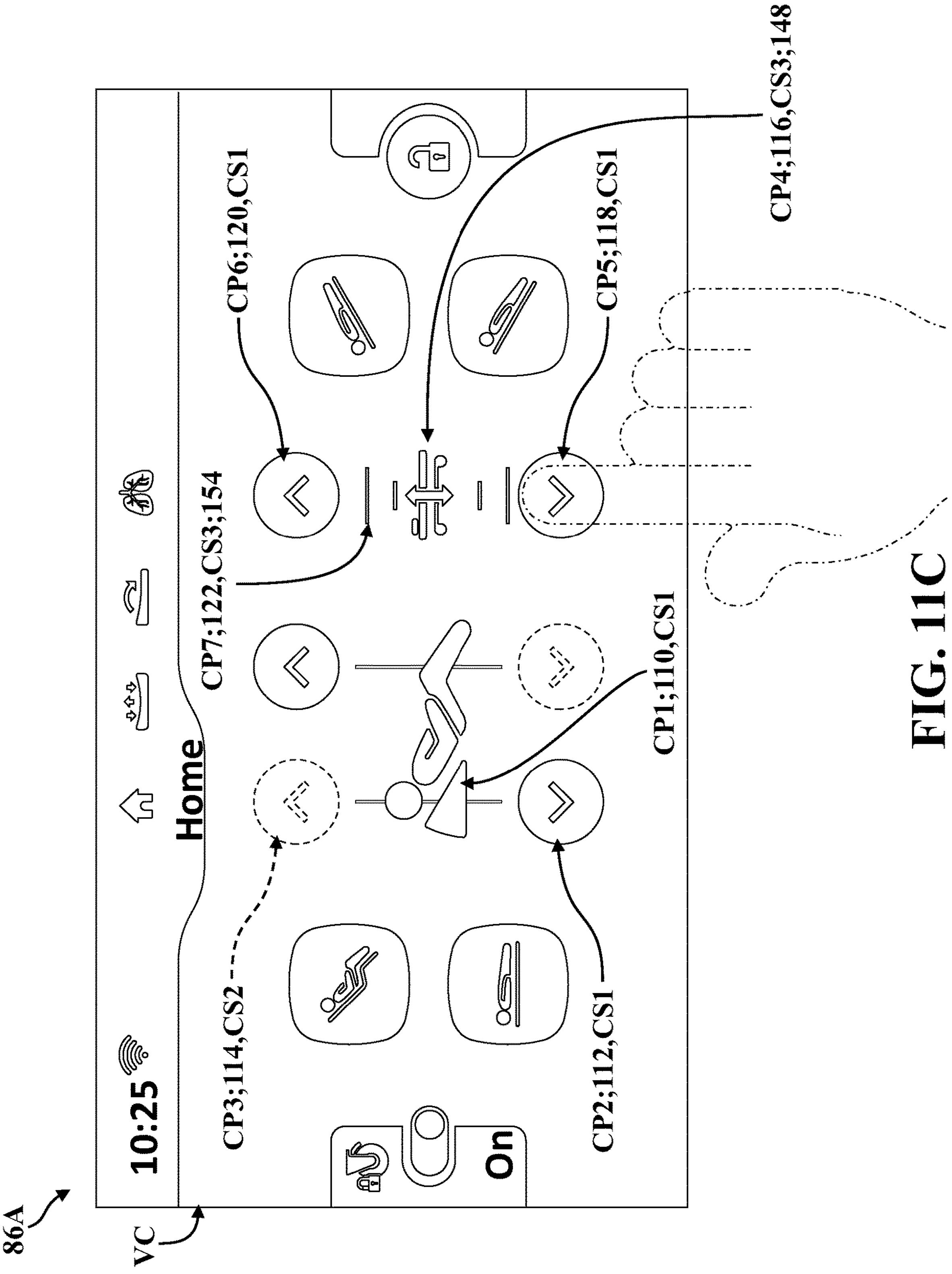
FIG. 11C is another partial plan view of the first user interface of FIGS. 11A-11B, with the content portions shown in content states corresponding to the configuration of the patient support apparatus as depicted in FIG. 10C, and with the virtual button shown in the button enabled state being engaged by the user.

In the illustrated embodiment, the first, second, and third animation icons 150, 152, 154 each comprise "horizontal bars" of the same relative size but which are slightly offset in the vertical direction when presented on the screen 94 (compare FIGS. 11A, 11B, and 11C sequentially) in order to simulate movement in the first direction when the controller 84 displays the seventh content portion CP7 (defined by the third virtual icon 122) on the screen 94 in the first loop sequence CS1→CS2→CS3 (successively compare FIGS. 11A, 11B, and 11C), and to simulate movement in the second direction when the controller 84 displays the seventh content portion CP7 (defined by the third virtual icon 122) on the screen 94 in a second loop sequence CS3→CS2→CS1 (successively compare FIGS. 11C, 11B, and 11A). However, it will be appreciate that the first, second, and third animation icons 150, 152, 154 could be of a number of different types, styles, configurations, arrangements, and the like sufficient to simulate movement. In some embodiments, the controller 84 is configured to display the first loop sequence CS1→CS2→CS3 and/or the second loop sequence CS3→CS2→CS1 such that each of the first, second, and third animation icons 150, 152, 154 are displayed on the screen 94 for a substantially equivalent period of time, and may "fade in" and/or "fade out" on the screen 94. However, other configurations are contemplated. Moreover, while the first loop sequence CS1→CS2→CS3 and the second loop sequence CS3→CS2→CS1 each involve three content states CS1, CS2, CS3, additional content states (and, thus, additional animation icons) could be utilized in other embodiments. Furthermore, it is contemplated that only two content states (and, thus, fewer animation icons) could be utilized in certain embodiments, such as where one animation icon is displayed on the screen 94 for a longer period of time than the other animation icon, and/or where a pause is implemented at the end of the loop sequence.

Irrespective of how many content states CS1, CS2, CS3 and/or animation icons 150, 152, 154 are utilized in either of the loop sequences CS1→CS2→CS3, CS3→CS2→CS1, it will be appreciated that the time period that each respective animation icon 150, 152, 154 is displayed on the screen 94 may vary or may be the same. In some embodiments, each animation icon 150, 152, 154 is displayed on the screen 94 sequentially by showing one icon and then hiding that icon before or simultaneous with showing another icon. Here, each respective icon may be displayed on the screen 94 for the same period of time or for a different period of time, and any "pause" between displaying successive icons (if present) may be of the same duration between each successive icon or may be of different durations between certain icons. Other configurations are contemplated. Moreover, it will be appreciated that the "transition" between each respective animation icon 150, 152, 154 may be realized by "fading-out" one icon while "fading-in" another icon where "fading" may be realized by simultaneously "cross-fading" the icons with a predetermined amount of overlap, by "fading-out" one icon completely and subsequently "fading-in" another icon, with or without a pause therebetween. Here too, the time period period that each respective animation icon 150, 152, 154 is "faded-in" and/or "faded-out," as well as the timing associated with beginning to "fade-out" and/or "fade-in" the icons relative to each other, including any pauses therebetween if present, may be of a number of different configurations, over differing or similar relative time periods, and the like. Other configurations are contemplated.

In this way, the embodiments of the present disclosure afford significant opportunities for enhancing the functionality and operation of user interfaces 86, 86A, 86B employed by patient support apparatuses 30. Specifically, visual content VC can be displayed and viewed in a number of different ways which contribute to improved usability of the patient support apparatus 30 without necessitating the use of overtly expensive hardware. Moreover, visual content can be displayed and in ways that provide caregivers C with convenient, easy-to-use, and intuitive features. Furthermore, different types of user interfaces 86A, 86B can be utilized to facilitate operation of the same patient support apparatus 30, with or without the use of screens 94, while affording similar feedback to the user (e.g., the caregiver C) based on the status, condition, position, arrangement, and the like of various components of the patient support apparatus 30. Thus, the patient support apparatus 30 can be manufactured in a cost-effective manner while, at the same time, affording opportunities for improved functionality, features, and usability.

As noted above, the subject patent application is related to U.S. Provisional Patent Application No. 62/525,373 filed on Jun. 27, 2017 and its corresponding Non-Provisional patent application Ser. No. 16/020,003 filed on Jun. 27, 2018. In addition, the subject patent application is also related to: U.S. Provisional Patent Application No. 62/525,353 filed on Jun. 27, 2017 and its corresponding Non-Provisional patent application Ser. No. 16/020,068 filed on Jun. 27, 2018; U.S. Provisional Patent Application No. 62/525,359 filed on Jun. 27, 2017 and its corresponding Non-Provisional patent application Ser. No. 16/020,052 filed on Jun. 27, 2018; U.S. Provisional Patent Application No. 62/525,363 filed on Jun. 27, 2017 and its corresponding Non-Provisional patent application Ser. No. 16/020,085 filed on Jun. 27, 2018; U.S. Provisional Patent Application No. 62/525,368 filed on Jun. 27, 2017 and its corresponding Non-Provisional patent application Ser. No. 16/019,973 filed on Jun. 27, 2018; and U.S. Provisional Patent Application No. 62/525,377 filed on Jun. 27, 2017 and its corresponding Non-Provisional patent application Ser. No. 16/019,986 filed on Jun. 27, 2018. In addition, the subject patent application is also related to U.S. Provisional Patent Application No. 62/783,442 filed on Dec. 21, 2018, and U.S. Provisional Patent Application No. 62/783,445 filed on Dec. 21, 2018. The disclosures of each of the above-identified Patent Applications are each hereby incorporated by reference in their entirety.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient support apparatus comprising:

a support structure including a base and a patient support deck operatively attached to the base and comprising a deck section arranged for movement between a plurality of section positions including a first section position and a second section position;

a deck sensor to determine movement of the deck section between the plurality of section positions;

a first user interface configured to operate the patient support apparatus, the first user interface comprising a screen configured to display visual content including a content portion having a first content state and a second content state;

a second user interface, different from the first user interface, configured to operate the patient support apparatus, the second user interface comprising an access panel including a panel portion with a light module having a first illumination state and a second illumination state; and a controller in communication with the deck sensor, the first user interface, and the second user interface, with the controller configured to display the content portion of the visual content on the screen in the first content state and to control the light module in the first illumination state when the deck sensor determines the deck section is in the first section position, and with the controller further configured to display the content portion of the visual content on the screen in the second content state and to control the light module in the second illumination state when the deck sensor determines the deck section is in the second section position.

2. The patient support apparatus as set forth in claim 1, wherein the plurality of section positions further includes an intermediate section position between the first section position and the second section position; and wherein the content portion of the visual content comprises a virtual icon displayed on the screen in the first content state to indicate that the deck section is in the intermediate section position or is between the first section position and the intermediate section position.

3. The patient support apparatus as set forth in claim 2, wherein the virtual icon is hidden from the visual content displayed on the screen in the second content state.

4. The patient support apparatus as set forth in claim 2, wherein the panel portion of the access panel comprises a symbol illuminated by the light module in the first illumination state to indicate that the deck section is in the intermediate section position or is between the first section position and the intermediate section position.

5. The patient support apparatus as set forth in claim 1, wherein the first illumination state is further defined as light emission and the second illumination state is further defined as an absence of light emission.

6. The patient support apparatus as set forth in claim 1, further comprising a deck actuator in communication with the controller and interposed between the deck section and the base to move the deck section between the plurality of section positions;

wherein the content portion of the visual content comprises a virtual button arranged for engagement by a user, with the first content state further defined as a button enabled state and with the second content state further defined as a button disabled state such that the controller is configured to display the virtual button in the button enabled state on the screen when the deck sensor determines the deck section is in the first section position and to display the virtual button in the button disabled state on the screen when the deck sensor determines the deck section is in the second section position;

wherein the first user interface further comprises a touch sensor configured to generate a first input signal in response to engagement of the virtual button in the button enabled state; and wherein the controller is further configured to drive the deck actuator to move the deck section away from the first section position in response to receiving the first input signal.

7. The patient support apparatus as set forth in claim 6, wherein the access panel further comprises a button arranged for engagement by the user adjacent to the light module, with the button configured to generate the first input signal, and with the controller configured to receive the first input signal from the button when the light module is controlled in the first illumination state.

8. The patient support apparatus as set forth in claim 7, wherein the visual content further comprises a second virtual button arranged for engagement by the user, the second virtual button having a respective button enabled state and a button disabled state such that the controller is configured to display the second virtual button in the button enabled state on the screen when the deck sensor determines the deck section is in the second section position and to display the second virtual button in the button disabled state on the screen when the deck sensor determines the deck section is in the first section position;

wherein the touch sensor is further configured to generate a second input signal in response to engagement of the second virtual button in the button enabled state; and wherein the controller is further configured to drive the deck actuator to move the deck section away from the second section position in response to receiving the second input signal.

9. The patient support apparatus as set forth in claim 8, wherein the access panel further comprises:

a second light module having a respective first illumination state and a second illumination state; and a second button arranged for engagement by the user adjacent to the second light module, with the second button configured to generate the second input signal, and with the controller configured to receive the second input signal from the second button when the second light module is controlled in the first illumination state.

10. The patient support apparatus as set forth in claim 6, wherein the virtual button has a button feedback state different from each of the button enabled state and the button disabled state;

wherein the light module has a third illumination state different from each of the first illumination state and the second illumination state; and wherein the controller is further configured to display the virtual button in the button feedback state and to control the light module in the third illumination state in response to receiving the first input signal when the deck sensor determines the deck section is in the second section position.

11. The patient support apparatus as set forth in claim 1, wherein the first user interface and the second user interface are coupled to the support structure.

12. The patient support apparatus as set forth in claim 1, wherein the support structure includes an intermediate frame supporting the patient support deck;

further comprising a footboard operatively attached to the support structure, with the first user interface coupled to the footboard; and further comprising a side rail operatively attached to the support structure, with the second user interface coupled to the side rail.

13. The patient support apparatus as set forth in claim 1, further comprising a deck actuator in communication with the controller and interposed between the deck section and the base to move the deck section between the plurality of section positions.

14. The patient support apparatus as set forth in claim 13, wherein the deck section is further defined as a back section;

wherein the first section position is further defined as a maximum raised position of the back section;

wherein the second section position is further defined as a maximum lowered position of the back section; and wherein the plurality of section positions further includes a fowler's position between the maximum raised position and the maximum lowered position.

15. The patient support apparatus as set forth in claim 14, wherein the content portion of the visual content comprises a virtual icon displayed on the screen in the first content state to indicate that the back section is at or above the fowler's position.

16. The patient support apparatus as set forth in claim 15, wherein the virtual icon is hidden from the visual content displayed on the screen in the second content state.

17. The patient support apparatus as set forth in claim 16, wherein the panel portion of the access panel comprises a symbol illuminated by the light module in the first illumination state to indicate that the back section is at or above the fowler's position.

* * * * *